United States Patent
Atlas

(10) Patent No.: US 9,100,328 B1
(45) Date of Patent: Aug. 4, 2015

(54) FORWARDING MECHANISMS FOR FAST REROUTE USING MAXIMALLY REDUNDANT TREES

(75) Inventor: Alia Atlas, Arlington, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 293 days.

(21) Appl. No.: 13/418,180

(22) Filed: Mar. 12, 2012

(51) Int. Cl.
| | |
|---|---|
| H04J 1/16 | (2006.01) |
| H04L 12/703 | (2013.01) |
| H04L 12/735 | (2013.01) |
| H04J 3/14 | (2006.01) |
| H04L 12/28 | (2006.01) |

(52) U.S. Cl.
CPC .............. H04L 45/28 (2013.01); H04L 45/128 (2013.01)

(58) Field of Classification Search
None
See application file for complete search history.

(56) References Cited

U.S. PATENT DOCUMENTS

| | | | | |
|---|---|---|---|---|
| 7,630,298 | B2 * | 12/2009 | Shand et al. | 370/218 |
| 2005/0135276 | A1 * | 6/2005 | Bouchat et al. | 370/256 |
| 2006/0050690 | A1 * | 3/2006 | Epps et al. | 370/359 |
| 2006/0087965 | A1 * | 4/2006 | Shand et al. | 370/218 |
| 2008/0123533 | A1 | 5/2008 | Vasseur et al. | |
| 2011/0051727 | A1 | 3/2011 | Cai et al. | |
| 2011/0199891 | A1 | 8/2011 | Chen | |
| 2012/0039164 | A1 | 2/2012 | Enyedi et al. | |
| 2012/0281524 | A1 * | 11/2012 | Farkas | 370/221 |
| 2013/0077475 | A1 * | 3/2013 | Enyedi et al. | 370/225 |
| 2013/0121169 | A1 | 5/2013 | Zhao et al. | |
| 2014/0016457 | A1 | 1/2014 | Enyedi et al. | |

FOREIGN PATENT DOCUMENTS

WO    WO 2010/055408    *   5/2010    ............ H04L 12/56

OTHER PUBLICATIONS

Office Action from U.S. Appl. No. 13/418,152, dated Dec. 19, 2013, 7 pp.
Enyedi et al., "On Finding Maximally Redundant Trees in Strictly Linear Time," IEEE Symposium on Computers and Communications (ISCC), 2009, 11 pp.
Atlas et al., "An Architecture for IP/LDP Fast-Reroute Using Maximally Redundant Trees," Routing Area Working Group Internet Draft, draft-atlas-rtgwg-mrt-frr-architecture-01, Oct. 31, 2011, 27 pp.
Karan et al., "Multicast only Fast Re-Route," Network Working Group Internet Draft, draft-karan-mofrr-00, Mar. 2, 2009, 14 pp.
Wei et al., "Tunnel Based Multicast Fast Reroute (TMFRR) Extensions to PIM," Network Working Group Internet-Draft, draft-lwei-pim-tmfrr-00.txt, Oct. 16, 2009, 20 pp.

(Continued)

*Primary Examiner* — Ayaz Sheikh
*Assistant Examiner* — Sori Aga
(74) *Attorney, Agent, or Firm* — Shumaker & Sieffert, P.A.

(57) ABSTRACT

Network devices provide Internet Protocol (IP) and Label Distribution Protocol (LDP) fast reroute for unicast and multicast traffic. The approach described herein for fast reroute for IP and LDP uses maximally redundant trees (MRTs). MRTs are a pair of trees where the path from any node X to the root R along the first tree and the path from the same node X to the root along the second tree share the minimum number of nodes and the minimum number of links. A network device, such as a router, computes a pair of MRTs for each destination and installs one or more MRT alternate next-hops in its forwarding plane for use in forwarding network traffic to a destination in the event a failure occurs that renders a primary next-hop unusable for reaching the destination.

28 Claims, 18 Drawing Sheets

(56) References Cited

OTHER PUBLICATIONS

Lindem et al., "Extensions to IS-IS and OSPF for Advertising Optional Router Capabilities," Network Working Group Internet Draft, draft-raggarwa-igp-cap-01.txt, Nov. 2002, 12 pp.

Shen et al., "Discovering LDP Next-Nexthop Labels," Network Working Group Internet Draft, draft-shen-mpls-ldp-nnhop-label-02.txt, May 2005, 9 pp.

Enyedi et al., "IP Fast ReRoute: Lightweight Not-Via without Additional Addresses," Proceedings of IEEE INFOCOM, 2009, 5 pp.

Lindem et al., "Extensions to OSPF for Advertising Optional Router Capabilities," RFC 4970, Jul. 2007, 13 pp.

Boers et al., "The Protocol Independent Multicast (PIM) Join Attribute Format," RFC 5384, Nov. 2008, 11 pp.

Enyedi, "Novel Algorithms for IP Fast ReRoute," Department of Telecommunications and Media Informatics, Budapest University of Technology and Economics Ph.D. Thesis, Feb. 2011, 114 pp.

Atlas et al., "An Architecture for Multicast Protection Using Maximally Redundant Trees," Routing Area Working Group Internet Draft, draft-atlas-rtgwg-mrt-mc-arch-00, Mar. 2, 2012, 26 pp.

Atlas et al., "Algorithms for computing Maximally Redundant Trees for IP/LDP Fast ReRoute," Routing Area Working Group Internet Draft, Nov. 28, 2011, 39 pp.

Minei et al., "Label Distribution Protocol Extensions for Point-to-Multipoint and Multipoint-to-Multipoint Label Switched Paths," Network Working Group Internet Draft, draft-ietf-mpls-ldp-p2mp-15, Aug. 4, 2011, 40 pp.

Cai et al., "PIM Multi-Topology ID (MT-ID) Join Attribute," draft-ietf-pim-mtid-10.txt, Sep. 27, 2011, 14 pp.

Atlas et al., "Basic Specification for IP Fast ReRoute: Loop-Free Alternates," RFC 5286, Sep. 2008, 32 pp.

Shand et al., "IP Fast ReRoute Framework," RFC 5714, Jan. 2010, 16 pp.

Shand et al., "IP Fast ReRoute Using Not-via Addresses," Network Working Group Internet Draft, draft-ietf-rtgwg-ipfrr-notvia-addresses-07, Apr. 20, 2011, 29 pp.

Filsfils et al., "LFA applicability in SP networks," Network Working Group Internet Draft, draft-ietf-rtgwg-lfa-applicability-03, Aug. 17, 2011, 33 pp.

Francois et al., "Loop-free convergence using oFIB," Network Working Group Internet Draft, draft-ietf-rtgwg-ordered-fib-05, Apr. 20, 2011, 24 pp.

Rétvári et al., "IP Fast ReRoute: Loop Free Alternates Revisited," Proceedings of IEEE INFOCOM, 2011, 9 pp.

Retana et al., "OSPF Stub Router Advertisement," RFC 3137, Jun. 2001, 5 pp.

Bryant et al., "Remote LFA FRR," Network Working Group Internet Draft, draft-shand-remote-lfa-00, Oct. 11, 2011, 12 pp.

Kahn, "Topological sorting of large networks," Communications of the ACM, vol. 5, Issue 11, pp. 558-562, Nov. 1962.

Moy, "OSPF Version 2," RFC 2328, Apr. 1998, 204 pp.

U.S. Appl. No. 12/419,507, by Kireeti Kompella, filed Apr. 7, 2009.

Atlas et al., "An Architecture for IP/LDP Fast-Reroute Using Maximally Redundant Trees," PowerPoint presentation, IETF 81, Quebec City, Canada, Jul. 27, 2011, 28 pp.

Callon, "Use of OSI IS-IS for Routing in TCP/IP and Dual Environments," RFC 1195, Dec. 1990, 80 pp.

Shand et al., "A Framework for Loop-Free Convergence," RFC 5715, Jan. 2010, 23 pp.

Vasseur et al., "Intermediate System to Intermediate System (IS-IS) Extensions for Advertising Router Information," RFC 4971, Jul. 2007, 10 pp.

Atlas et al., Algorithms for computing Maximally Redundant Trees for IP/LDP Fast-Reroute, draft-enyedi-rtgwg-mrt-frr-algorithm-00, Oct. 24, 2011, 36 pp.

Atlas et al., An Architecture for IP/LDP Fast-Reroute Using Maximally Redundant Trees, draft-atlas-rtgwg-mrt-frr-architecture-00, Jul. 4, 2011, 22 pp.

Karan et al. "Multicast Only Fast Re-Route," Internet-Draft, draft-karan-mofrr-01, Mar. 13, 2011, 15 pp.

U.S. Appl. No. 13/418,152, by Alia Atlas, filed Mar. 12, 2012.

U.S. Appl. No. 13/418,212, by Alia Atlas, filed Mar. 12, 2012.

Notice of Allowance from U.S. Appl. No. 13/418,152, dated Jul. 10, 2014, 9 pp.

Response to Office Action dated May 22, 2014, from U.S. Appl. No. 13/418,212, filed Aug. 21, 2014, 10 pp.

Aggarwal, "Extensions to Resource Reservation Protocol- Traffic Engineering (RSVP-TE) for Point-to-Multipoint TE Label Switched Paths (LSPs)," Network Working Group, RFC 4875, May 2007, 53 pp.

Andersson et al., "LDP Specification," Network Working Group, RFC 3036, Jan. 2001, 124 pp.

Awduche et al., "RSVP-TE: Extensions to RSVP for LSP Tunnels," Network Working Group, RFC 3209, Dec. 2001, 61 pp.

S. Giacalone et al., "OSPF Traffic Engineering (TE) Express Path," draft-giacalone-ospf-te-express-path-02.txt, Network Working Group, Internet draft, Sep. 21, 2011, 15 pp.

U.S. Appl. No. 13/112,961, by David Ward, filed May 20, 2011.

Office Action from U.S. Appl. No. 13/418,212, dated May 22, 2014, 14 pp.

Notice of Allowance from U.S. Appl. No. 13/418,212, mailed Dec. 9, 2014, 10 pp.

\* cited by examiner

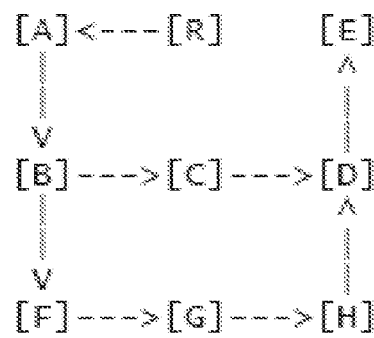
FIG. 13
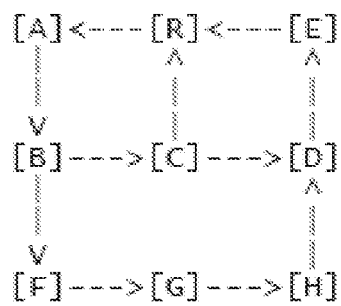
FIG. 14
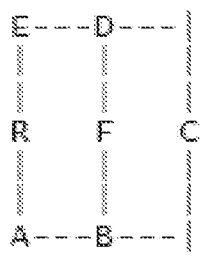     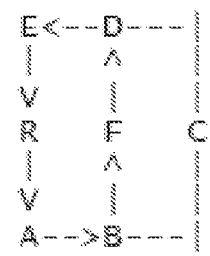     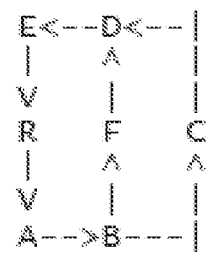
FIG. 15A         FIG. 15B         FIG. 15C

FORWARDING MECHANISMS FOR FAST REROUTE USING MAXIMALLY REDUNDANT TREES

TECHNICAL FIELD

The disclosure relates to computer networks and, more particularly, to forwarding network traffic within computer networks.

BACKGROUND

A routing protocol defines a process by which network devices, referred to as routers in packet-switched networks, communicate with each other to disseminate information that allows the routers to select routes between any two nodes on a computer network. One type of routing protocol, referred to as a link state protocol, allows routers to exchange and accumulate link state information, i.e., information describing the various links within the network. With a typical link state routing protocol, the routers exchange information related to available interfaces, metrics and other variables associated with network links. This allows a router to construct its own topology or map of the network. Some examples of link state protocols include the Open Shortest Path First (OSPF) protocol and the Intermediate-System to Intermediate System (IS-IS) protocol, which are Interior Gateway Protocols (1GP).

The connection between two devices on a network is generally referred to as a link. Connections between devices of different autonomous systems are referred to as external links while connections between devices within the same autonomous system are referred to as internal links. Many conventional computer networks, including the Internet, are designed to dynamically reroute data packets in the event an individual link fails. Upon failure of a link, the routers transmit new connectivity information to neighboring devices, allowing each device to update its local routing table. Links can fail for any number of reasons, such as failure of the physical infrastructure between the devices, or failure of the devices interfacing with the link.

When a link or router in the network fails, routers using traditional link state protocols such as OSPF and IS-IS may take a long time to adapt their forwarding tables in response to the topological change resulting from node and link failures in the network. The process of adapting the forwarding tables is known as convergence. This time delay occurs because recovery from a failure requires each node to re-compute the shortest path algorithm to calculate the next-hop for the affected nodes in the network. Until the next-hops are re-computed, traffic being sent toward the failed links may be dropped. Some deployments take time in the order of 500 milliseconds to several seconds for detection and recovery from failures in the network. These large convergence times may adversely affect the performance of Voice over Internet Protocol (VoIP) and multimedia applications, which are extremely sensitive to traffic loss. Service providers are demanding end-to-end failure detection and recovery times to be less than 50 milliseconds.

One approach to reduce failure recovery time is to select an alternate next-hop in addition to the best next-hop for a destination. Along with the best next-hop, the alternate next-hop is installed in the packet forwarding engine. When a link failure occurs, the router uses the alternate next-hop for packet forwarding until the shortest path algorithm has re-computed the next-hops for the updated network topology and installed the re-computed next-hops in the packet forwarding engine.

SUMMARY

In general, techniques are described for providing Internet Protocol (IP) and Label Distribution Protocol (LDP) fast reroute for unicast and multicast traffic. The approach described herein for fast reroute for IP and LDP uses maximally redundant trees (MRTs). MRTs are a pair of trees where the path from any node X to the root R along the first tree and the path from the same node X to the root along the second tree share the minimum number of nodes and the minimum number of links. A network device, such as a router, computes a pair of MRTs for each destination and installs one or more MRT alternate next-hops in its forwarding plane for use in forwarding network traffic to a destination in the event a failure occurs that renders a primary next-hop unusable for reaching the destination.

In one example aspect, a method includes, with a network device, identifying a first plurality of network devices in a network, wherein each of the first plurality of network devices supports a maximally redundant trees (MRT) fast reroute capability, constructing a network graph in which the network device and each of the first plurality of network devices are represented by a different node in the network graph, and identifying a second plurality of network devices in the network, wherein each of the second plurality of network devices does not support the maximally redundant trees fast reroute capability. The method also includes adding a proxy-node to the network graph, wherein the proxy-node represents all of the second plurality of network devices together as a single node in the network graph, computing a pair of maximally redundant trees on the network graph, wherein each of the pair of maximally redundant trees is rooted at the proxy-node, and identifying a pair of MRT next-hops for reaching a destination network device, wherein each of the pair of MRT next-hops is positioned along one of the pair of maximally redundant trees, and wherein the destination network device is one of the second plurality of network devices that does not support the maximally redundant trees fast reroute capability. The method further includes selecting, as an alternate next-hop for forwarding packets to the destination network device, one of the pair of MRT next-hops that would survive a failure of a network resource associated with a primary next-hop for forwarding packets to the destination network device, and installing the selected MRT next-hop in forwarding information of the network device as the alternate next-hop for forwarding packets to the destination network device.

In another example aspect, a network device includes a hardware-based processor and a routing component executing on the hardware-based processor, wherein the routing component identifies a first plurality of network devices in a network, wherein each of the first plurality of network devices supports a MRT fast reroute capability, and constructs a network graph in which the network device and each of the first plurality of network devices are represented by a different node in the network graph. The routing component identifies a second plurality of network devices in the network, wherein each of the second plurality of network devices does not support the maximally redundant trees fast reroute capability, and adds a proxy-node to the network graph, wherein the proxy-node represents all of the second plurality of network devices together as a single node in the network graph. The routing component computes a pair of maximally redundant trees on the network graph, wherein each of the pair of maximally redundant trees is rooted at the proxy-node, identifies a pair of MRT next-hops for reaching a destination network device, and wherein each of the pair of MRT next-hops is positioned along one of the pair of maximally redundant trees, and wherein the destination network device is one of the second plurality of network devices that does not support the maximally redundant trees fast reroute capability. The routing component selects, as an alternate next-hop for forwarding packets to the destination network device, one of the pair of MRT next-hops that would survive a failure of a network resource associated with a primary next-hop for forwarding packets to the destination network device, and installs the selected MRT next-hop in forwarding information of the network device as the alternate next-hop for forwarding packets to the destination network device.

In another example aspect, a computer-readable storage medium includes instructions for causing a programmable processor of a network device to identify a first plurality of network devices in a network, wherein each of the first plurality of network devices supports a maximally redundant trees (MRT) fast reroute capability, and construct a network graph in which the network device and each of the first plurality of network devices are represented by a different node in the network graph, and identify a second plurality of network devices in the network, wherein each of the second plurality of network devices does not support the maximally redundant trees fast reroute capability. The computer-readable storage medium further includes instructions to add a proxy-node to the network graph, wherein the proxy-node represents all of the second plurality of network devices together as a single node in the network graph, compute a pair of maximally redundant trees on the network graph, wherein each of the pair of maximally redundant trees is rooted at the proxy-node, and identify a pair of MRT next-hops for reaching a destination network device, wherein each of the pair of MRT next-hops is positioned along one of the pair of maximally redundant trees, and wherein the destination network device is one of the second plurality of network devices that does not support the maximally redundant trees fast reroute capability. The computer-readable storage medium further includes instructions to select, as an alternate next-hop for forwarding packets to the destination network device, one of the pair of MRT next-hops that would survive a failure of a network resource associated with a primary next-hop for forwarding packets to the destination network device, and install the selected MRT next-hop in forwarding information of the network device as the alternate next-hop for forwarding packets to the destination network device.

In another example aspect, a method includes receiving a packet with a network device, wherein the packet is destined for a destination network device, upon detecting a failure of a network resource associated with a primary next-hop for forwarding packets to the destination device, marking the packet with an indication of a first maximally redundant tree of a pair of maximally redundant trees rooted at the destination device, wherein the first maximally redundant tree avoids the network resource having the detected failure, and forwarding the marked packet to a next-hop associated with the destination network device, wherein the next-hop is an alternate next-hop positioned on the first maximally redundant tree.

In another example aspect, a network device includes a physical interface to receive a packet with a network device, wherein the packet is destined for the destination network device, and a forwarding component configured to, when a failure has been detected associated with a primary next-hop for the destination device, mark the packet with an indication of a first maximally redundant tree of a pair of maximally redundant trees rooted at the destination device, and forward the marked packet to a next-hop associated with the destination network device, wherein the next-hop is an alternate next-hop positioned on the first maximally redundant tree.

In further example aspect, a computer-readable storage medium comprising instructions for causing a programmable processor to receive a packet with a network device, wherein the packet is destined for the destination network device, and upon detecting a failure of a network resource associated with a primary next-hop for forwarding packets to the destination device, mark the packet with an indication of a first maximally redundant tree of a pair of maximally redundant trees rooted at the destination device, wherein the first maximally redundant tree avoids the network resource having the detected failure. The computer-readable storage medium further includes instructions to forward the marked packet to a next-hop associated with the destination network device, wherein the next-hop is an alternate next-hop positioned on the first maximally redundant tree.

In another example aspect, a method includes, in response to receiving, at a network device, a first request to join a first multicast group, joining the first multicast group for receiving multicast data traffic on a first multicast tree, wherein the first request specifies the first multicast group and a multicast source, and, in response to receiving, at the network device, a second request to join a second multicast group, joining the second multicast group for receiving multicast data traffic on a second multicast tree, wherein the second request specifies the second multicast group and the multicast source, wherein the first multicast tree and the second multicast tree comprise a pair of maximally redundant trees, each rooted at the multicast source. The method also includes receiving a first stream of data packets at the network device on the first multicast tree, receiving a second stream of data packets at the network device on the second multicast tree, and, with the network device, determining whether to accept the first stream of data packets received on the first multicast tree or the second stream of data packets received on the second multicast tree based on at least one of a health of the first stream of data packets and a health of the second stream of data packets.

In another example aspect, a network device includes a hardware-based processor, and a routing component executing on the hardware-based processor, wherein the routing component is configured to, in response to receiving a first request to join a first multicast group, join the first multicast group for receiving multicast data traffic on a first multicast tree, wherein the first request specifies the first multicast group and a multicast source. The routing component is configured to, in response to receiving a second request to join a second multicast group, join the second multicast group for receiving multicast data traffic on a second multicast tree, wherein the second request specifies the second multicast group and the multicast source. The first multicast tree and the second multicast tree comprise a pair of maximally redundant trees, each rooted at the multicast source. The network device further includes a forwarding component that receives a first stream of data packets on the first multicast tree, receives a second stream of data packets at the network device on the second multicast tree and determines whether to accept the first stream of data packets received on the first multicast tree or the second stream of data packets received on the second multicast tree based on at least one of a health of the first stream of data packets and a health of the second stream of data packets.

In further example aspect, a computer-readable storage medium includes instructions for causing a programmable processor to, in response to receiving, at a network device, a first request to join a first multicast group, join the first multicast group for receiving multicast data traffic on a first multicast tree, wherein the first request specifies the first multicast group and a multicast source, and in response to receiving, at the network device, a second request to join a second multicast group, join the second multicast group for receiving multicast data traffic on a second multicast tree, wherein the second request specifies the second multicast group and the multicast source, wherein the first multicast tree and the second multicast tree comprise a pair of maximally redundant trees, each rooted at the multicast source. The computer-readable storage medium further includes instructions to receive a first stream of data packets at the network device on the first multicast tree, receive a second stream of data packets at the network device on the second multicast tree, and determine whether to accept the first stream of data packets received on the first multicast tree or the second stream of data packets received on the second multicast tree based on at least one of a health of the first stream of data packets and a health of the second stream of data packets.

In a further example aspect, a method includes in response to receiving, at a network device, a request to join a multicast group, joining the multicast group for receiving multicast data traffic on an alternate multicast tree, wherein the request specifies the multicast group and a multicast source, wherein the alternate multicast tree comprises a maximally redundant tree rooted at a point of local repair network device, and wherein the alternate multicast tree avoids a protected resource that is positioned along a primary multicast tree, and wherein the network device comprises a merge point for the protected resource that merges multicast traffic received on the alternate multicast tree back onto a primary multicast tree that extends between the multicast source and a multicast receiver. The method also includes receiving a data packet at an upstream interface of the network device on the alternate multicast tree, and determining whether to accept or discard the data packet received on the alternate multicast tree based on a state of one or more primary upstream multicast interfaces of the network device.

In another example aspect, a network device includes a hardware-based processor, and a routing component executing on the hardware-based processor, wherein the routing component is configured to, in response to receiving a request to join a multicast group, join the multicast group for receiving multicast data traffic on an alternate multicast tree, wherein the request specifies the multicast group and a multicast source, wherein the alternate multicast tree comprises a maximally redundant tree rooted at a point of local repair network device, and wherein the alternate multicast tree avoids a protected resource that is positioned along a primary multicast tree, and wherein the network device comprises a merge point for the protected resource that merges multicast traffic received on the alternate multicast tree back onto a primary multicast tree that extends between the multicast source and a multicast receiver. The network device also includes a forwarding component that receives a data packet at an upstream interface of the network device on the alternate multicast tree, and determines whether to accept or discard the data packet received on the alternate multicast tree based on a state of one or more primary upstream multicast interfaces.

In yet another example aspect, a method includes receiving alternate multicast traffic associated with a multicast source and a multicast group at an upstream interface of a network device, and when the state of each of the primary upstream multicast interfaces of the network device is down, forwarding the alternate multicast traffic to a next hop along a primary multicast tree as primary multicast traffic for the multicast source and the multicast group.

The techniques of this disclosure may provide one or more advantages. For example, the techniques may provide improved coverage of a network such that failure protection still exists even after a maintenance event occurs, such as link or node failure. The MRT fast reroute techniques below generally provide link and node disjointness to the extent physically feasible, regardless of topology, and automatically compute backup next-hops based on the topology information distributed by a link-state Interior Gateway Protocol (IGP). These MRT fast reroute techniques do not require any signaling in the case of failure, and use pre-programmed backup next-hops for forwarding. The techniques set forth herein provide mechanisms for handling real networks, which may not be fully 2-connected, due to previous failure or design. A 2-connected graph is a graph that requires two nodes to be removed before the network is partitioned.

The techniques of this disclosure also provide MRT fast reroute link protection and node protection, and include approaches for unicast, multicast, and multicast live-live situations. The techniques of this disclosure include phased deployment options for gradual introduction of the MRT fast reroute techniques. The MRT fast reroute techniques of this disclosure allow for backward compatibility.

The MRT fast reroute techniques described herein do not require introducing a large amount of additional addressing and state on routers that implement the techniques. For example, the techniques described herein do not require failure-specific paths, which if used can result in reduced state requirements compared to other approaches to fast reroute. The techniques of this disclosure also do not impose requirements for external computation.

The MRT fast reroute techniques for multicast described herein provide a mechanism for locally repairing multicast traffic after a single failure using pre-programmed alternates so that repair times can be around 50 ms. This also provides a mechanism for sending live-live multicast streams across an arbitrary network topology so that the disjoint trees can be dynamically recalculated as the network topology changes.

The details of one or more examples are set forth in the accompanying drawings and the description below. Other features, objects, and advantages will be apparent from the description and drawings, and from the claims.

BRIEF DESCRIPTION OF DRAWINGS

FIG. 13 is a block diagram illustrating a directed graph showing a partial order.

FIG. 14 is a block diagram illustrating an ADAG showing a partial order with R lowest and highest.

FIG. 15A is a block diagram illustrating an example 2-connected graph.

FIG. 15B is a block diagram illustrating an example partial ADAG.

FIG. 15C is a block diagram illustrating a resulting ADAG after adding a path.

DETAILED DESCRIPTION

Figure 1:
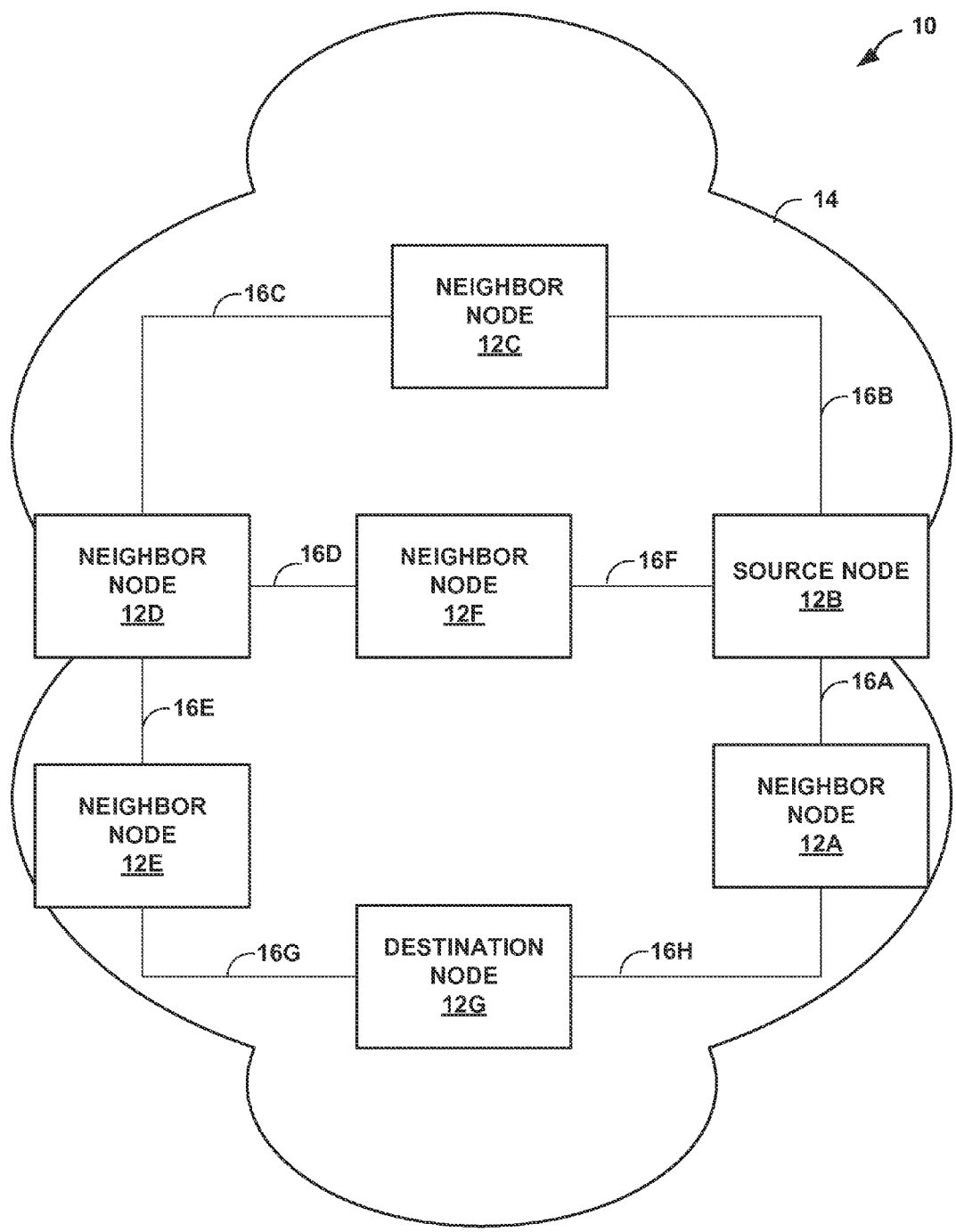
FIG. 1 is a block diagram illustrating a system that includes an example network 14 having network devices configured to employ the techniques of this disclosure

FIG. 1 is a block diagram illustrating a system 10 that includes an example network 14 having network devices 12A-12G (network devices or "nodes" 12) configured to employ the techniques of this disclosure. Network devices 12 may be configured for selecting a maximally redundant tree (MRT) next-hop for use in Internet Protocol (IP) or LDP fast reroute of network traffic upon a primary next-hop becoming unavailable. Network devices 12 may use the techniques described herein to provide alternate next-hops for rerouting packets after a network fault while the network converges based on the new topology.

In some examples, network devices 12 may be routers, or may be other devices that include routing capabilities. Network devices 12 may use a link-state routing protocol, such as the Open Shortest Path First (OSPF) protocol or the Intermediate-System to Intermediate System (IS-IS) protocol, to exchange link-state routing information to learn the topology of network 14. Network devices are connected to one another by links 16A-16H (links 16). Although shown for simplicity and purposes of example as including network devices 12A-12G, network 14 may include additional network devices (not shown). Further details regarding OSPF are found in Moy, J., "OSPF Version 2," RFC 2328, April 1998, the entire contents of which are incorporated by reference herein. Further details regarding IS-IS are found in Callon, R., "Use of OSI IS-IS for Routing in TCP/IP and Dual Environments," RFC 1195, December 1990, the entire contents of which are incorporated by reference herein.

Each of network devices 12 may calculate next-hops to be used to reach other network devices 12 in network 14 based on the link-state routing information, and may install the calculated next-hops in stored forwarding information for forwarding network traffic destined for the other nodes. These next-hops may be referred to as "primary next-hops." In normal IGP routing, each router has its shortest-path-tree to all destinations. From the perspective of a particular destination, D, this looks like a reverse SPT (rSPT). In accordance with the principles of this disclosure, each of network devices 12 may also be configured to calculate a pair of maximally redundant trees (MRTs) from itself to each destination node. By convention, these will be called the blue and red MRTs. In some example aspects, the network devices 12 may calculate only the relevant MRT next-hops rather than calculating the full MRTs. This may reduce the amount of computation required such that it can be done in O(e) or O(n log n), where e is the number of edges in the network graph and n is the number of nodes in the network graph. The network devices 12 may install one or more MRT alternate next-hops for each destination node. In some examples, network devices 12 may also make use of loop free alternate (LFA) next-hops or other types of alternate next-hops, such as next-hops compatible with using Resource Reservation Protocol with Traffic Engineering extensions (RSVP-TE) tunnels and Not-Via, for example.

Redundant Trees (RT) are a pair of trees where the path from any node X to the root R along the first tree is node-disjoint with the path from the same node X to the root along the second tree. These can be computed in 2-connected graphs. Maximally Redundant Trees (MRT) are a pair of trees where the path from any node X to the root R along the first tree and the path from the same node X to the root along the second tree share the minimum number of nodes and the minimum number of links. Each such shared node is a cut-vertex. Any shared links are cut-links. Any RT is an MRT but many MRTs are not RTs. MRTs are practical to maintain redundancy even after a single link or node failure. If a pair of MRTs is computed rooted at each destination, all the destinations remain reachable along one of the MRTs in the case of a single link or node failure.

A network graph is a graph that reflects the network topology where all links connect exactly two nodes and broadcast links have been transformed into the standard pseudo-node representation. FIG. 1 illustrates an example arrangement of nodes 12 in a network graph that is a 2-connected graph. The term "2-connected," as used herein, refers to a graph that has no cut-vertices, i.e., a graph that requires two nodes to be removed before the network is partitioned. A "cut-vertex" is a vertex whose removal partitions the network. A "cut-link" is a link whose removal partitions the network. A cut-link by definition must be connected between two cut-vertices. If there are multiple parallel links, then they are referred to as cut-links in this document if removing the set of parallel links would partition the network.

For each pair of destination-rooted MRTs, there is a path from every node X to the destination D on the Blue MRT that is as disjoint as possible from the path on the Red MRT. The two paths along the two MRTs to a given destination-root of a 2-connected graph are node-disjoint, while in any non-2-connected graph, only the cut-vertices and cut-edges can be contained by both of the paths.

Figure 2B:
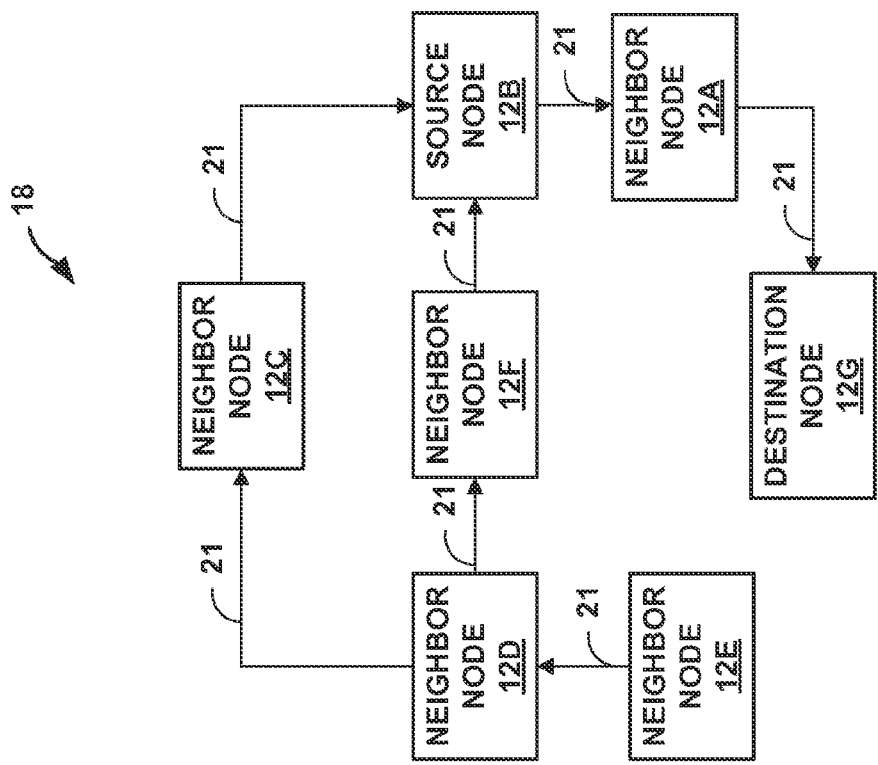
FIGS. 2A-2B are block diagrams illustrating example MRTs associated with the network graph of FIG. 1.
Figure 2A:
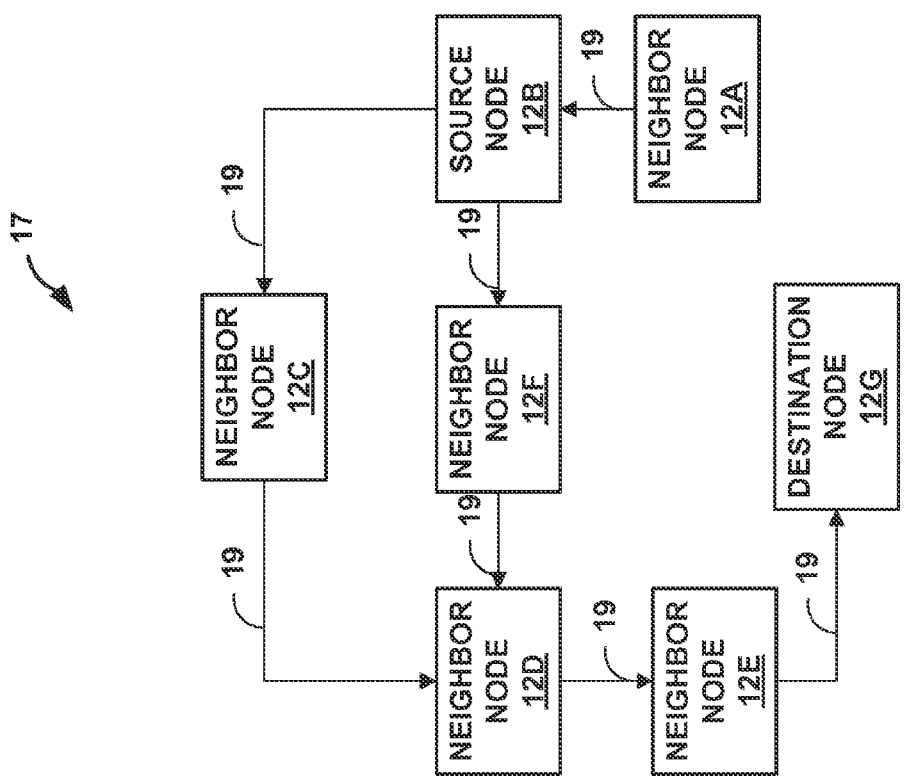

FIG. 2A is a block diagram illustrating a first example MRT 17 associated with the network graph of FIG. 1, and FIG. 2B is a block diagram illustrating a second example MRT 18 associated with the network graph of FIG. 1. MRT 17 is referred to as the Blue MRT, and MRT 18 of FIG. 2B is referred to as the Red MRT. One can consider the paths from source node 12B to destination node 12G; on the Blue MRT, the paths are 12B→12F→12D→12E→12G or 12B→12F→12C→12E→12G. On the Red MRT, the path is 12B→12A→12G. Blue MRT 17 and Red MRT 18 are link-disjoint and node-disjoint. Blue MRT 17 and Red MRT 18 are redundant trees because the paths are disjoint for all sources to the destination node 12G.

Each of nodes 12 of FIG. 1 may compute the pair of Blue MRT 17 and Red MRT 18 for destination node 12G. The nodes 12 may then select one or more MRT next-hops based on the Blue MRT 17 or Red MRT 18, and install the selected next-hop(s) in forwarding information as alternate next-hops for sending network traffic destined for destination node 12G. For example, Nodes 12 may likewise compute other pairs of Blue and Red MRTs with respect to other nodes 12 in the network graph as destinations, and select and install next-hops as alternate next-hops for the other destinations. Example techniques for determining which of nodes 12 to include in the network graph, and for computing the Blue MRT 17 and Red MRT 18, are described in further detail below.

After the primary and alternate next-hops are installed in forwarding information of source node 12B, upon receiving packets destined for destination node 12G, source node 12B will forward the packets on one of links 16 to the primary next-hop, in accordance with the forwarding information. Upon detecting that a failure condition has occurred for the primary next-hop, in some example aspects source node 12B may immediately start forwarding the received packets destined for destination node 12G using the selected MRT alternate next-hop associated with destination node 12G without then needing to perform route resolution or alternate next-hop selection at that time. The determination of whether to use an LFA next-hop or an MRT next-hop in a given case is performed locally by source node 12B. Also upon detecting the failure condition, source node 12B may initiate calculation of a new primary next-hop, new MRT next-hops, and the associated new MRT alternate next-hops based on the changed network topology. In some examples, source node 12B may also calculate a LFA next-hop and/or other next-hops. After the new primary and alternate next-hops are calculated, source node 12B selects the appropriate alternate next-hop set to use and then installs the primary next-hop, the associated selected alternate next-hop set in forwarding information, and begins forwarding subsequently received packets using the new primary next-hop. There may be a delay before installing the new Blue MRT next-hop set and the Red MRT next-hop set into forwarding information until the network is considered to be converged, either determined by signaling or by waiting a configured time period, so that traffic has a chance to drain from the current MRT next-hops.

Some additional terminology includes the following. A "2-connected cluster" is a maximal set of nodes that are 2-connected. The term "2-edge-connected" refers to a network graph where at least two links must be removed to partition the network. The term "block" refers to either a 2-connected cluster, a cut-edge, or an isolated vertex. A Directed Acyclic Graph (DAG) is a graph where all links are directed and there are no cycles in it. An Almost Directed Acyclic Graph (ADAG) is a graph that, if all links incoming to the root were removed, would be a DAG. A Generalized ADAG (GADAG) is a graph that is the combination of the ADAGs of all blocks. Further information on MRTs may be found at A. Atlas, "An Architecture for IP/LDP Fast-Reroute Using Maximally Redundant Trees," Internet-Draft, draft-atlas-rtgwg-mrt-frr-architecture-01, October, 2011; A. Atlas, "Algorithms for Computing Maximally Redundant Trees for IP/LDP Fast-Reroute, Internet-Draft, draft-enyedi-rtgwg-mrt-frr-algorithm-01, November, 2011; A. Atlas, "An Architecture for Multicast Protection Using Maximally Redundant Trees," Internet-Draft, draft-atlas-rtgwg-mrt-mc-arch-00, March 2012; the entire contents of each of which are incorporated by reference herein.

Figure 3:
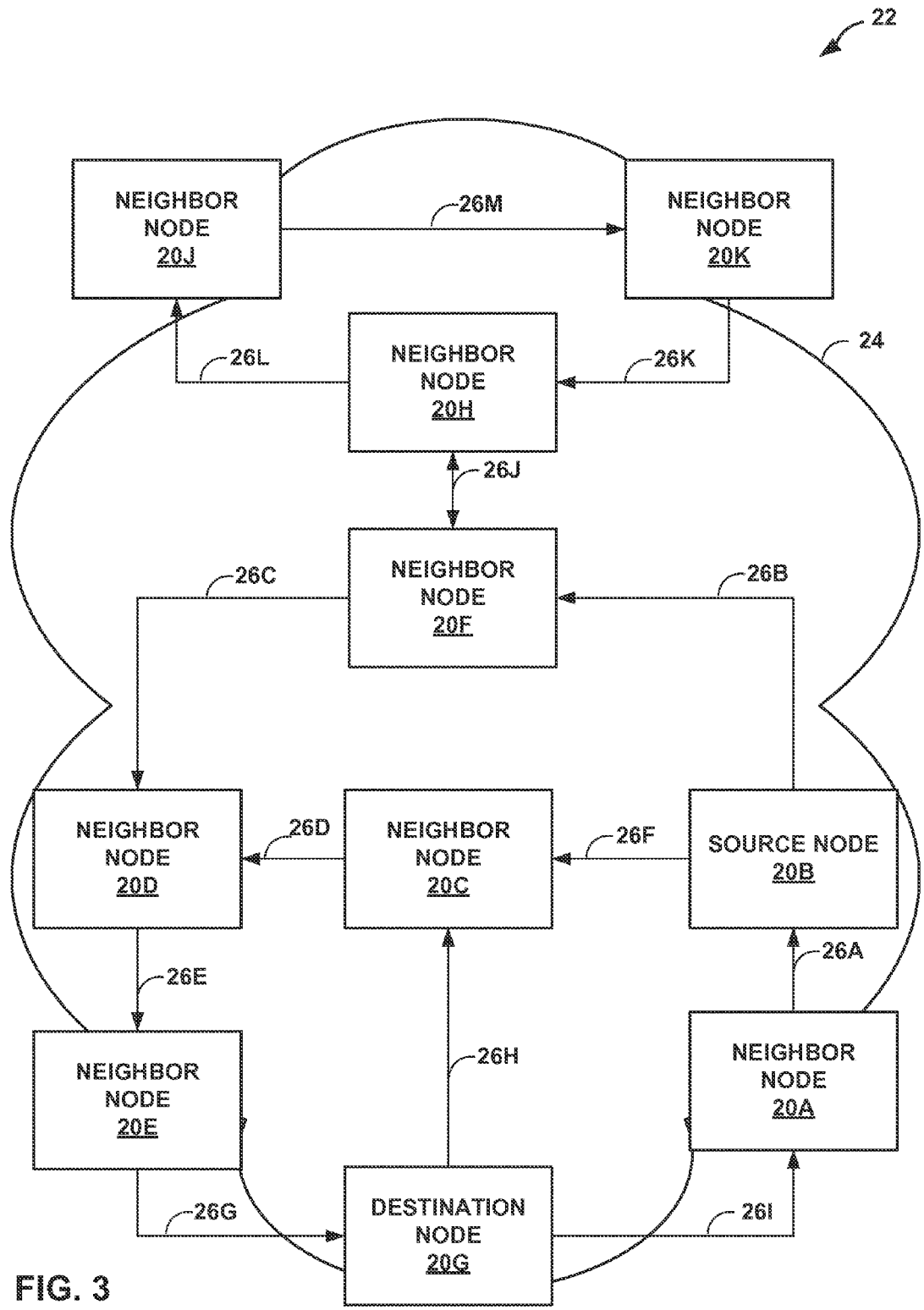
FIG. 3 illustrates an example system that includes a network having nodes that implement the techniques of this disclosure.

FIG. 3 illustrates an example system 22 that includes a network 24 having nodes 20A-20K ("nodes 20"), which may be network devices, that implement the techniques of this disclosure. Nodes 20 are connected by links 26A-26M ("links 26"). The directions of links 26 shown in the example of FIG. 3 are the direction of the GADAG. In the original topology of system 22, the links 26 are undirected. FIG. 3 illustrates an example network graph that is not 2-connected. That is, if node 20C, node 20H or the link 26J failed, then the network would be partitioned.

Figure 4B:
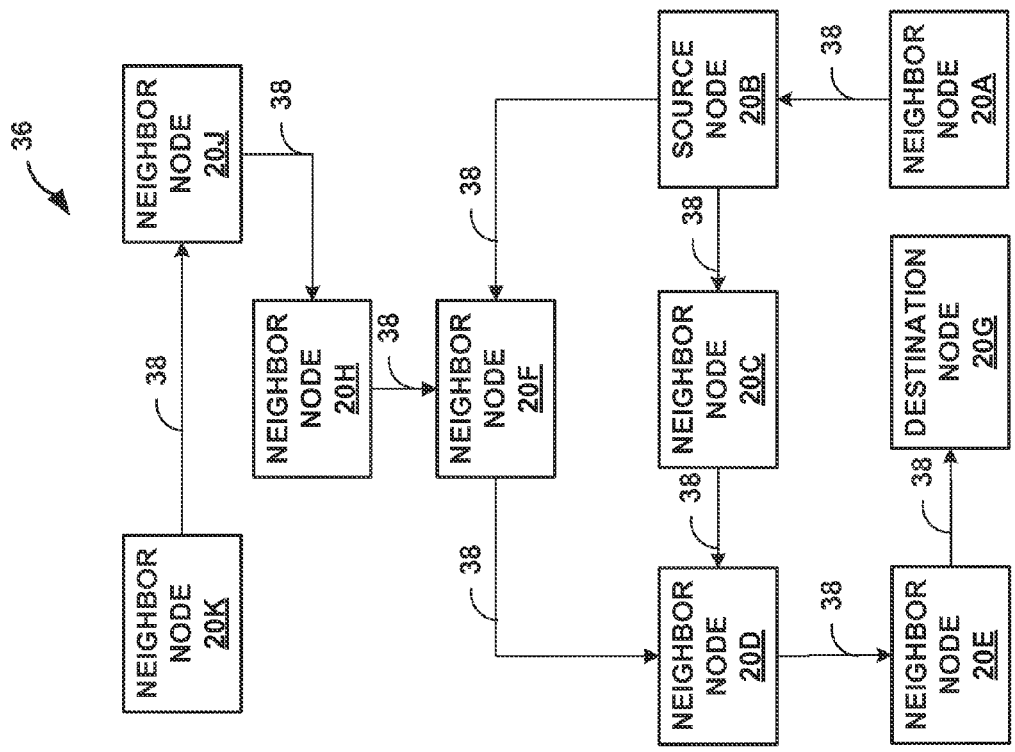
FIGS. 4A-4B are block diagrams illustrating example MRTs computed on the graph of FIG. 3.
Figure 4A:
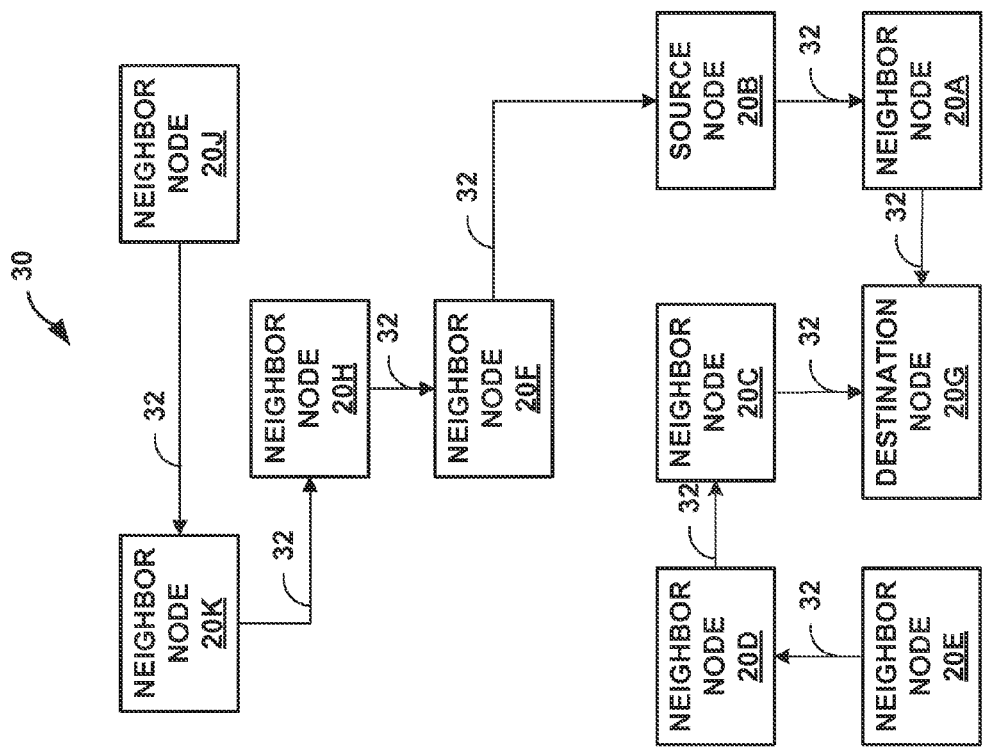

FIG. 4A is a block diagram illustrating an example first MRT 30 computed on the graph of FIG. 3. The MRT 30 illustrated in FIG. 4A may be designated as the Red MRT, for example. FIG. 4B is a block diagram illustrating an example second MRT 36 computed on the graph of FIG. 3, and may, for example, be designated as the Blue MRT. The MRTs of FIGS. 4A-4B are merely examples, and network devices 20 may compute different MRTs depending on what algorithm is used for MRT computation or depending on which neighbor node the computing node selects to do a first cycle. FIG. 4A illustrates next-hops 32 to the destination node 20G (root node). The next-hops 32 are shown on a decreasing/reverse path along the GADAG. FIG. 4B illustrates next-hops 38 to the destination node 20G. Next-hops 38 are shown on an increasing/forward path along the GADAG.

In the graph of FIG. 3, it is not possible to have two link-disjoint or node-disjoint paths from node 20H to node 20K, or node 20J to node 20G. The MRTs given in FIGS. 4A-4B offer paths that are as disjoint as possible. For instance, the paths from source node 20B to destination node 20G on the Blue MRT 36 of FIG. 4B are 20B→20C→20D→20E→20G and 20B→20F→20D→20E→20G, and the path from source node 20B to destination node 20G on the Red MRT 30 of FIG. 4A is 20B→20A→20G. As another example, the path from neighbor node 20H to destination node 20G on the Blue MRT 36 of FIG. 4B is 20H→20F→20D→20E→20G and on the Red MRT 30 of FIG. 4A is 20H→20F→20B→20A→20G.

When there is a link or node failure affecting the rSPT and that link is not a cut-link and the node is not a cut-vertex, each node 20 will still have at least one path via one of the MRTs to reach the destination node 20G. For example, in the network graph illustrated in system 22 of FIG. 3, node 20C would normally forward traffic to destination node 20G across the link 26H between nodes 20C and 20G. If that link 26H fails, then node 20C could use the Blue MRT path 20C→20D→20E→20G.

As is the case with fast-reroute technologies, forwarding does not change until a local failure is detected. Packets are forwarded along the shortest path. The appropriate alternate to use is pre-computed. An algorithm is described below for how to determine whether the Blue MRT next-hops or the Red MRT next-hops should be the installed MRT alternate next-hops for a particular primary next-hop N to a particular destination D. MRT alternates are available to use, unless the network has been partitioned. It is a local decision whether to use an MRT alternate, a Loop-Free Alternate or some other type of alternate.

When a network needs to use a micro-loop prevention mechanism such as Ordered FIB or Farside Tunneling, then the whole IGP area may need to have alternates available so that the micro-loop prevention mechanism, which requires slower network convergence, can take the necessary time without impacting traffic badly. When a worse failure than is anticipated happens, using LFAs that are not downstream neighbors can cause micro-looping. Even if a worse failure than anticipated happened, the use of MRT alternates will not cause looping. Therefore, while node-protecting LFAs may be preferred, there may be advantages to using MRT alternates when such a node-protecting LFA is not a downstream path. Since MRTs provide an alternate topology through which traffic can be sent and which can be manipulated separately from the SPT, it is possible that MRTs could be used to support Farside Tunneling. Farside tunneling is described in further detail at Shand, M. and S. Bryant, "A Framework for Loop-Free Convergence", RFC 5715, January 2010, the entire content of which is incorporated by reference.

Redundant trees are directed spanning trees that provide disjoint paths towards their common root. These redundant trees only exist and provide link protection if the network is 2-edge-connected and node protection if the network is 2-connected. Such connectiveness may not be the case in real networks, either due to architecture or due to a previous failure. Maximally redundant trees are useful in a real network because they may be computable regardless of network topology. The maximally redundant trees are computed so that only the cut-edges or cut-vertices are shared between the multiple trees. Computationally practical algorithms for computing MRTs may be based on a common network topology database. Algorithm variants can compute in O(e) or O(e+n log n), where e is the number of edges in the network graph and n is the number of nodes in the network graph, the appropriate MRT next-hops as described in further detail herein.

The formulation of the Maximally Redundant Trees (MRT) algorithm may make it very well suited to use in routers. One aspect of MRT, and of redundant trees in general, is that the trees do not necessarily provide shortest detour paths. The use of the shortest-path-first algorithm in tree-building and including all links in the network as possibilities for one path or another may improve this. Providing shortest detour paths would require failure-specific detour paths to the destinations, but the state-reduction advantage of MRT lies in the detour being established per destination (root) instead of per destination and per failure.

A variety of algorithms may be used to calculate MRTs for any network topology. These may result in trade-offs between computation speed and path length. An algorithm can compute complete MRTs or just next-hops. Router computation of its next-hops on each pair of MRTs for each node in the network can be completed in O(e) time, where e is the number of edges in the network graph. Many algorithms are designed to work in real networks. For example, just as with SPF, an algorithm is based on a common network topology database, with no messaging required. Nodes in the network may be configured to apply consistent tie-breakers to ensure that identical destination-rooted MRTs are computed by all routers in an IGP area. In one example aspect, IP or LDP Fast-Reroute might use a computation-optimized algorithm. In another example aspect, multicast Live-Live may use a path-optimized algorithm based on heuristics.

Figure 5:
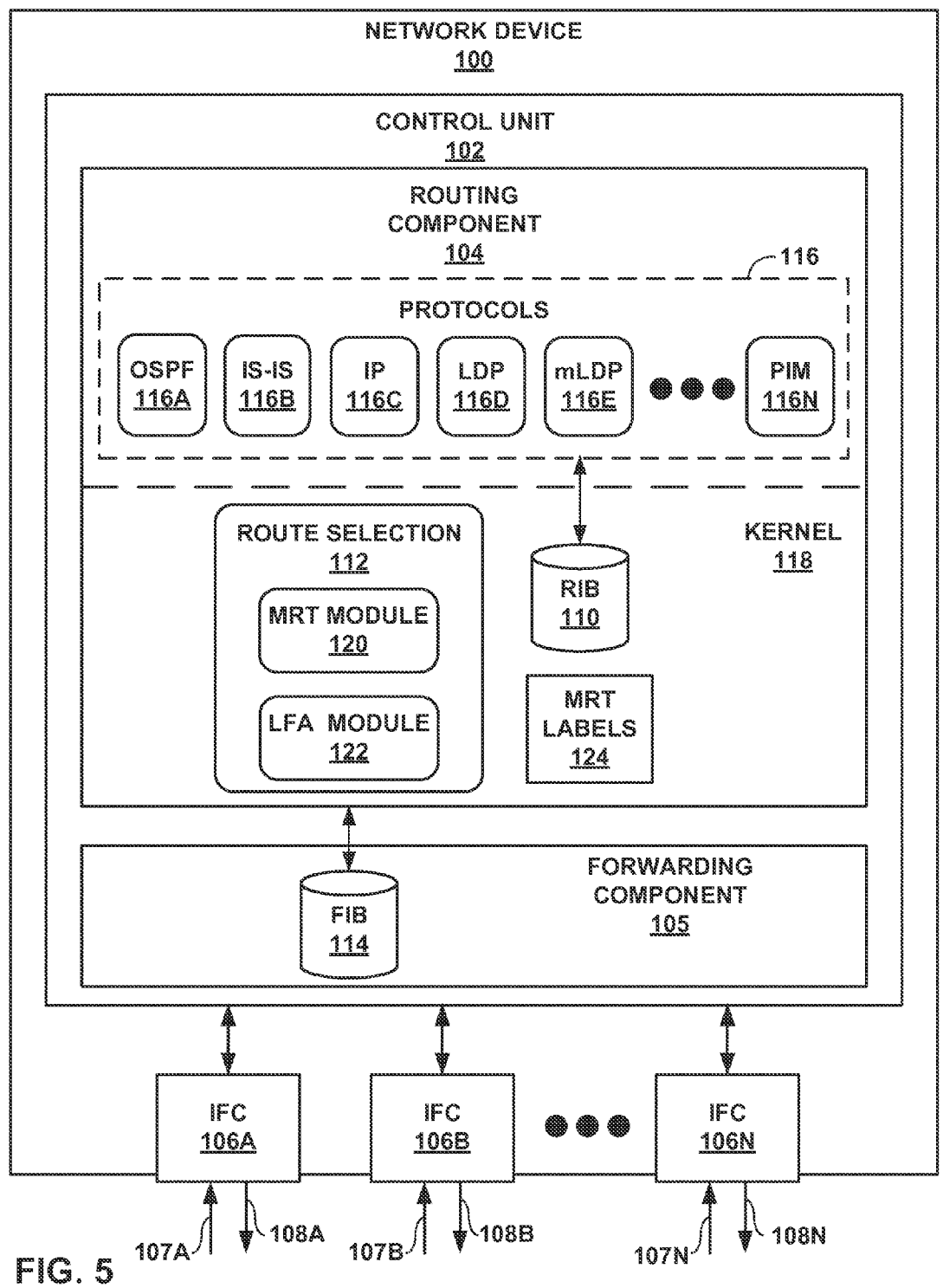
FIG. 5 is a block diagram illustrating an example network device capable of performing the disclosed techniques for MRT fast reroute.

FIG. 5 is a block diagram illustrating an example network device 100 capable of performing the disclosed techniques for MRT fast reroute. In general, network device 100 may operate in a manner substantially similar to any of the network devices, routers, or nodes illustrated in the previous figures. Network device 100 includes a control unit 102 that includes a routing component 104 coupled to a forwarding component 105. Network device 100 includes interface cards 106A-106N ("IFCs 106") that receive packets via inbound links 108A-107N ("inbound links 107") and send packets via outbound links 108A-108N ("outbound links 108"). IFCs 106 may be coupled to links 107, 108 via a number of interface ports (not shown).

Routing component 104 operates as the control plane for network device 100 and includes an operating system that provides a multi-tasking operating environment for execution of a number of concurrent processes. Routing component 104 provides an operating environment for routing protocols to execute routing processes. Routing component 104 is responsible for the maintenance of a routing information base (RIB) 110 to reflect the current topology of a network and other network entities to which it is connected. In particular, routing component 104 periodically updates RIB 110 to accurately reflect the topology of the network and other entities. RIB 110 may describe a topology of the computer network in which network device 100 resides, and may also include routes through the shared trees in the computer network. RIB 110 describes various routes within the computer network, and the appropriate next-hops for each route, i.e., the neighboring routing devices along each of the routes. RIB 110 may simultaneously include routes and associated next-hops for multiple topologies, such as the default topology, the Blue MRT topology and the Red MRT topology.

In accordance with RIB 110, forwarding component 105 maintains forwarding information base (FIB) 114 that associates network destinations with specific next-hops and corresponding IFCs 106 and physical output ports for output links 108. For example, route selection module 112 analyzes RIB 110 and generates FIB 114 in accordance with RIB 110. Routing component 104 includes high-level, control plane routing protocols 116A-116N ("routing protocols 116"). Routing protocols 116 may be software processes executing on one or more processors, such as hardware-based processors. In the example of FIG. 2, routing protocols 116 include OSPF 116A, IS-IS 116B, Internet Protocol (IP) 116C, and Label Distribution Protocol (LDP) 116D, for exchanging routing information with other routing devices and for updating RIB 110. In addition, routing protocols 116 include Multicast Label Distribution Protocol (mLDP) 116E and Protocol Independent Multicast (PIM) 116N for routing traffic through a computer network with other routing devices conceptually formed into shared multicast trees. Routing component 104 may include other routing protocols not shown in FIG. 5, such as the Border Gateway Protocol (BGP), for example. Routing protocols 116 interact with kernel 118 to update RIB 110 based on routing protocol messages received by network device 100. In response, route selection module 112 of kernel 118 generates forwarding information based on the network topology represented in RIB 110. Kernel 118 then programs forwarding component 105 to install the forwarding information as FIB 114.

Forwarding component 105 represents hardware and logic functions that provide high-speed forwarding of network traffic. Forwarding component 105 may include a set of one or more forwarding chips programmed with FIB 114 that maps network destinations and/or MPLS labels with specific next-hops and the corresponding output interface ports. In general, when network device 100 receives a packet via one of inbound links 107, forwarding component 105 identifies an associated next-hop for the data packet by traversing FIB 114 based on information within the packet. Forwarding component 105 forwards the packet on one of outbound links 108 mapped to the corresponding next-hop in accordance with FIB 114.

FIB 114 may be a radix tree programmed into dedicated forwarding chips, a series of tables, a complex database, a link list, a radix tree, a database, a flat file, or various other data structures. FIB 114 may include specific routes to forward multicast traffic for a given multicast group to neighboring routing devices. In general, when network device 100 receives a multicast packet via one of inbound links 107, control unit 102 determines a next-hop for the packet in accordance with FIB 114, and forwards the packet according to the next-hop.

Route selection module 112 selects primary next-hops. Route selection module 112 may, for example, run a Shortest Path First (SPF) calculation on the graph G representing network 14 with respect network device 100 as the source S to compute a primary next-hop to a given destination node in graph G. This SPF calculation is denoted SPF(S, G). Route selection module 112 may obtain information that makes up graph G from RIB 110. Calculating SPF(S, G) allows route selection module 112 to obtain the optimal distance from source node 12B to all nodes 12 in the network 14 represented by graph G. In some examples, route selection module 112 may select the next-hop having the optimal (e.g., lowest cost) distance as the primary next-hop, and install the selected primary next-hop to FIB 114.

LFA module 122 may compute and select loop-free alternate (LFA) next-hops. In some examples, network device 100 may not compute LFA next-hops. MRT module 120 computes blue and red MRTs and selects alternate next-hops from either an LFA or one of the blue or red MRTs. In some examples, MRT module 120 may not compute the full MRTs, but may calculate only the relevant MRT next-hops. Route selection module 112 installs the primary next-hops, associated selected alternate next-hops, and both blue and red MRT next-hops to FIB 114. For example, router selection module 112 may install to FIB 112 a set of selected alternate next-hops for use in load-balancing.

In some aspects, MRT module 120 can compute a pair of disjoint MRTs (i.e., blue and red) per IGP-area destination. For example, the IGP-area destinations for which MRT module 120 computes the pair of disjoint MRTs may be a destination associated with a routing device, or a multi-homed prefix, where the prefix is a unicast destination.

With LFA, there is no need to tunnel unicast traffic, whether IP or LDP. The traffic is simply sent to an alternate. The behavior with MRT Fast-Reroute is different depending upon whether IP or LDP unicast traffic is considered. Logically, one could use the same IP address or LDP forwarding equivalence class (FEC), and then also use two bits to express the topology to use. The topology options are (00) IGP/SPT, (01) blue MRT, (10) red MRT. Unfortunately, two spare bits are not available in the Internet Protocol version Four (IPv4) or Internet Protocol version Six (IPv6) header. This may have different consequences for IP and LDP, because LDP can just add a topology label on top or take two spare bits from the label space.

Once MRT module 120 computes the MRTs, the two sets of MRTs may be seen by the forwarding plane as essentially two additional topologies. Thus, the same considerations apply for forwarding along the MRTs as for handling multiple topologies. For LDP, it may be desirable to avoid tunneling because, for at least node protection, tunneling requires knowledge of remote LDP label mappings and thus requires targeted LDP sessions and the associated management complexity. Two different example mechanisms that can be used for handling the multiple topologies in MRT fast reroute, and marking packets being sent onto the MRT topologies, are described below.

A first option, referred to as Option A, is to encode MRT topology in labels. For example, in addition to sending a single label for a FEC, LDP module 116D of network device 100 would provide two additional labels with their associated MRT colors. Each additional label specifies an MRT topology (blue or red) associated with one of the maximally redundant trees. The two additional labels may be stored in MRT labels 124. This approach may be simple, but can reduce the label space for other uses. This approach may also increase the memory needed to store the labels and the communication required by LDP.

A second option, referred to as Option B, is to create topology-identification labels (topology-id labels"). The topology-id labels may be stored in MRT labels 124, and may be LDP labels. In this approach, LDP module 116D uses the label-stacking ability of multi-protocol label switching (MPLS) and specifies only two additional labels, one for each associated MRT color, by a new FEC type. When sending a packet onto an MRT, LDP module 116D first swaps the LDP label and then pushes the topology-id label for that MRT color. When receiving a packet with a topology-id label, LDP module 116D pops the topology-id label and uses the topology-id label to guide the next-hop selection in combination with the next label in the stack. For example, LDP module 116D does a lookup within FIB 114 on the next inner label or the IP address of the packet (in the case of IP), and that lookup returns a set of sets of next-hops. LDP module 116 then uses the topology-id label to select among the sets. For example, if the topology-id label indicates the blue MRT should be used, LDP module 116 uses the next-hop (or stack of next-hops) for the blue MRT. Similarly, if the topology-id label indicates the red MRT should be used, LDP module 116 uses the next-hop (or stack of next-hops) for the red MRT. If there is no topology-id label, then LDP module 116 may just use the shortest path tree (SPT) next-hop (primary next-hop). LDP module 116D then swaps the remaining label, if appropriate, and pushes the topology-id label if needed for use the next-hop, and outputs the labeled packet on the outbound interface associated with the next-hop.

The topology-id label approach has minimal usage of additional labels, memory, and LDP communication. The topology-id label approach does increase the size of packets and the complexity of the required label operations and look-ups. The topology-id label approach can, for example, use the same mechanisms as are needed for context-aware label spaces. For example, the top-level topology-id label may give context, and the next label may give next-hops. Further details on context-aware label spaces can be found within U.S. application Ser. No. 12/419,507, entitled TRANSMITTING PACKET LABEL CONTEXTS WITHIN COMPUTER NETWORKS, filed Apr. 9, 2009, the entire content of which is incorporated by reference herein.

Note that with LDP unicast forwarding, regardless of whether topology-identification label or encoding topology in label is used, no additional loopbacks per router are required as are required in the IP unicast forwarding case. This is because LDP labels are used on a hop-by-hop basis to identify MRT-blue and MRT-red forwarding trees.

LDP module 116D may be configured with extensions to LDP in various ways. For example, LDP module 116D may be configured to specify the topology in the label. That is, when sending a Label Mapping in a label mapping message that maps a FEC to a label, LDP module 116D may have the ability to include a topology identifier in the FEC TLV and send an associated Label TLV. The FEC TLV would include a multi-topology identifier (MT-ID) that is assigned to specify MRT and the associated MRT color. In the example of Topology-Identification Labels, LDP would be extended to define a new FEC type that describes the topology for MRT and the associated MRT color. Another example option may be for LDP module 116 to advertise, per interface, a label indicating what the original incoming interface would have been.

For IP unicast traffic, tunneling may be used. The tunnel egress could be the original destination in the area, the next-next-hop, etc. If the tunnel egress is the original destination router, then the traffic remains on the redundant tree with sub-optimal routing. If the tunnel egress is the next-next-hop, then protection of multi-homed prefixes and node-failure for ABRs is not available. Selection of the tunnel egress is a router-local decision.

The following are a few options for marking IP packets with which MRT the receiving device should use for forwarding the received IP packets. First, a network device 100 may tunnel IP packets via an LDP LSP. This has the advantage that more installed routers can do line-rate encapsulation and decapsulation. Also, no additional IP addresses would need to be allocated or signaled. Option A within this approach is to use a LDP Destination-Topology Label. MRT module 120 may use a label that indicates both the destination and the MRT. This method allows easy tunneling to the next-next-hop as well as to the IGP-area destination. For multi-homed prefixes, this requires that additional labels be advertised for each proxy-node. Option B within this approach is to use a LDP Topology Label. MRT module 120 may use a Topology-Identifier label on top of the IP packet. This is simple and doesn't require additional labels for proxy-nodes. If tunneling to a next-next-hop is desired, then a two-deep label stack can be used with [Topology-ID label, Next-Next-Hop Label].

Another approach is to tunnel IP packets in IP. Each router supporting this option may announce two additional loopback addresses and their associated MRT color. Those addresses are used as destination addresses for MRT-blue and MRT-red IP tunnels, respectively. The announced additional loopback addresses allow the transit nodes to identify the traffic as being forwarded along either MRT-blue or MRT-red tree topology to reach the tunnel destination. The IGP, such as OSPF 116A or IS-IS 116B, may be extended to employ announcements of these two additional loopback addresses per router with the associated MRT color. Another option that might be used is a "pure" IP unicast option that uses a new IP (either IPv4 or IPv6) hop-by-hop option to specify the MRT color. Possibly only some platforms or linecards would be able to support this approach at line rate. A network device 100 that uses the IP option may process the IP option in the fast path, rather than feeding the packet to a line card to process.

For proxy-nodes associated with one or more multi-homed prefixes, the problem is harder because there is no router associated with the proxy-node, so its loopbacks can't be known or used. In this case, each router attached to the proxy-node could announce two common IP addresses with their associated MRT colors. This would require configuration as well as the previously mentioned IGP extensions. Similarly, in the LDP case, two additional FEC bindings could be announced.

In general, when network device 100 receives a packet, forwarding component 105 may do a lookup of FIB 114 using the label of the received packet as a key. FIB 114 may return a set of next-hops, including the primary next-hop and any alternate next-hops (e.g., LFA and MRT next-hops). When a topology-id label is used, forwarding component 105 may do a lookup on the topology-id label to find the correct context and then use the next label of the received packet as a key and FIB 114 may return a set of next-hops associated with that topology-id for the second label; those next-hops would be for either the Blue MRT or the Red MRT topology. In another approach, forwarding component 105 may do a lookup of FIB 114 using the second label of the received packet as a key. FIB 114 may return multiple sets of next-hops and the topology-id label is used to pick the appropriate set of next-hops to use.

OSPF module 116A and IS-IS module 116B may be extended to include the ability to announce additional capabilities to neighboring routers. For example, OSPF module 116A and IS-IS module 116B may be extended to announce capabilities including whether a router supports MRT, whether the router does MRT tunneling with LDP or IP or GRE or another tunneling protocol. OSPF module 116A and IS-IS module 116B may also be extended to advertise a topology association. For example, network device 100 may advertise a loopback address and associate the announced loopback address with an MRT whether blue or red. OSPF module 116A and IS-IS module 116B may also be extended to advertise common addresses with MRT for proxy-nodes of multi-homed prefixes. For example, OSPF module 116A and IS-IS module 116B may also be extended to advertise (MRT-computed order, area/level) for a router that advertises a multi-homed prefix.

A natural concern with new functionality is how to have it be useful when it is not deployed across an entire IGP area. In the case of MRT fast reroute, where it provides alternates when appropriate LFAs are not available, there are also deployment scenarios where it may make sense to only enable some routers in an area with MRT FRR. First, when network device 100 is a computing router S, MRT module 120 can determine its local sub-graph (also referred to as an "island") of compatible MRT fast-reroute routers. A router that has common forwarding mechanisms and common algorithm and is connected to either to network device 100 or to another router already determined to be in the local island of network device 100 can be added to the local island of network device 100.

Destinations inside the local island can use MRT alternates. Destinations outside the local island can be treated like a multi-homed prefix with caveats to avoid looping. For LDP labels including both destination and topology, the routers at the borders of the local island need to originate labels for the original FEC and the associated MRT-specific labels. Packets sent to an LDP label marked as blue or red MRT to a destination outside the local island will have the last router in the local island swap the label to one for the destination and forward the packet along the outgoing interface on the MRT towards a router outside the local island that was represented by the proxy-node.

For IP in IP encapsulations, remote destinations may not be advertising additional IP loopback addresses for the MRTs. In that case, a router attached to a proxy-node, which represents destinations outside the local island, must advertise IP addresses associated with that proxy-node. Packets sent to an address associated with a proxy-node will have their outer IP header removed by the router attached to the proxy-node and be forwarded by the router along the outgoing interface on the MRT towards a router outside the local island that was represented by the proxy-node.

The architecture of network device 100 illustrated in FIG. 2 is shown for exemplary purposes only. The disclosure is not limited to this architecture. In other embodiments, network device 100 may be configured in a variety of ways. In one embodiment, for example, some of the functionally of routing component 104 and forwarding component 105 may be distributed within IFCs 106.

Control unit 102 may be implemented solely in software, or hardware, or may be implemented as combinations of software, hardware, or firmware. For example, control unit 102 may include one or more processors which execute software instructions. In that case, the various software modules of control unit 102 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, magnetic media, optical media, or other computer-readable storage media.

Figure 6:
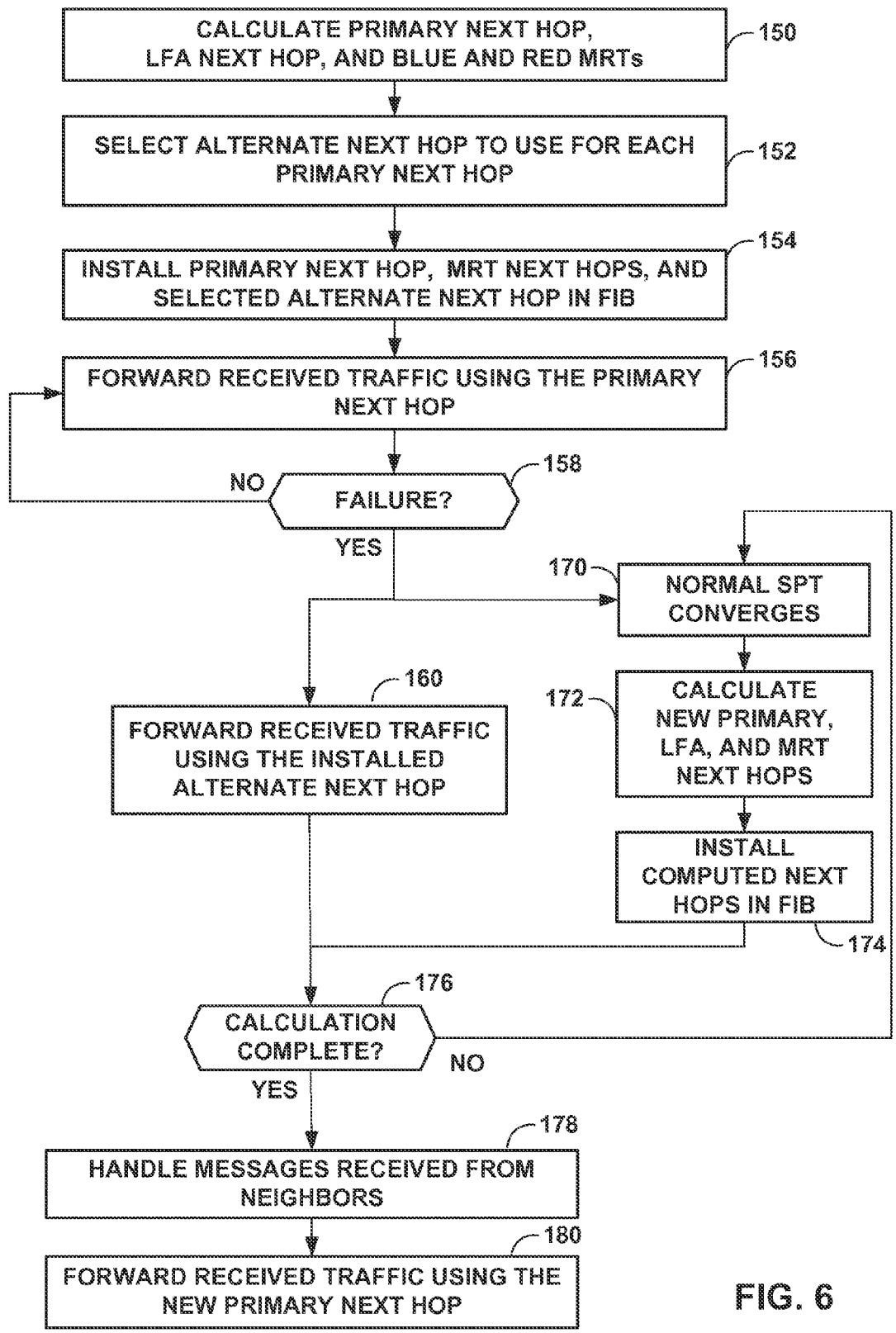
FIG. 6 is a flowchart illustrating example operation of a network device in a network in accordance with the techniques of this disclosure.

FIG. 6 is a flowchart illustrating example operation of a network device in a network in accordance with the techniques of this disclosure. For example, the network device may be a network device such as source node 12B of FIG. 1 or network device 100 of FIG. 5. FIG. 6 will be described for purposes of example with reference to these example devices. Route selection module 112 of network device 12B may calculate primary next-hops to be used to reach other network devices 12 in network 14 based on the link-state routing information in its RIB 110 (150). For example, source node 12B may select neighbor node 12A as the primary next-hop for reaching destination node 12G. LFA module 122 of source node 12B may also select a loop-free alternate (LFA) next-hop to use for reaching destination node 12G, for potential use in the event of a failure associated with neighbor node 12D (150).

In accordance with the techniques of this disclosure, MRT module 120 may compute a blue MRT and a red MRT on the graph of network devices in network 14 (150), such as by using an example algorithm discussed in detail below. MRT module 120 may also pre-compute whether the blue MRT or the red MRT will survive failure of the primary next-hop, and may select the next-hop on whichever of the blue or the red MRT will survive the failure. Route selection module 112 may determine which alternate next-hop to use for each primary next-hop, e.g., whether to use the LFA alternate, if available, or the MRT alternate (152). The alternate next-hop may actually be a set of next-hops (such as for Equal Cost Multipath (ECMP) load-balancing).

Route selection module 112 may install the primary next-hops in FIB 114 for forwarding network traffic destined for destination node 12G, and may install the associated alternate next-hops for the destination node 12G, and may also install the Blue MRT next-hops and Red MRT next-hops for the destination node 12G in FIB 114 (154). Route selection module 112 likewise computes and installs primary next-hops, alternate next-hops, Blue MRT next-hops, and Red MRT next-hops, relative to each of the other nodes 12 in network 14 as the destination node.

After the primary and alternate next-hops are installed in FIB 114 of source node 12B, upon receiving packets destined for destination node 12G, source node 12B will forward the packets on link 16A to the primary next-hop neighbor node 12A, in accordance with FIB 114 (156). Upon detecting that a failure condition has occurred for the primary next-hop (158), source node 12B begins forwarding the received packets destined for destination node 12E using one of the installed alternate next-hops associated with destination node 12G (160). In cases where network device 100 can accurately determine the type of failure experienced (link, node, etc.), the network device 100 can select the most appropriate alternate next-hops to use. In some aspects, for example, the forwarding component 105 may be able to intelligently select an appropriate alternate next hop depending on the type of failure experienced.

Also upon detecting the failure condition, route selection module 112 applies the shortest path tree (SPT) to the new network topology, and begins calculating a new primary next-hop (170). MRT module 120 and LFA module 122 also compute new MRT and LFA alternate next-hops, respectively, based on the changed network topology (170). After the new primary next-hop and alternate next-hops are calculated, source node 12B installs the primary next-hop and alternate next-hops in FIB 114 (174), but not the MRT alternate next-hops. After calculation of the primary and alternate next-hops is completed (176), source node 12B will handle other messages received from neighbor devices (178), e.g., routing updates. Source node 12B begins forwarding subsequently received packets using the new primary next-hop (180). Once source node 12B determines that the network has converged (e.g., based on signaling or a time-out), and so it can reasonably be assumed that the network traffic is no longer being carried on the MRT, then source node 12B installs the new MRT next-hops.

After a failure, MRT detours using the MRT next-hops can help packets reach their intended destination while the IGP has not reconverged onto the new topology. As link-state updates reach the routers, the IGP process calculates the new shortest paths. In addition, messages from neighbors can be received and handled at any time. If an additional failure or topology change is detected, then source node 12B may just revert to step 150, terminating the special organization for the installation.

When a failure event happens, traffic is put by the points of local repair (PLRs) onto the MRT topologies. After that, each router recomputes its shortest path tree (SPT) and moves traffic over to that. Only after all the PLRs have switched to using their SPTs and traffic has drained from the MRT topologies should each router install the recomputed MRTs into the FIBs. At each router, therefore, the sequence may proceed as follows: 1. Receive failure notification; 2. Recompute SPT; 3. Install new SPT; 4. Recompute MRTs; 5. Wait configured period for all routers to be using their SPTs and traffic to drain from the MRTs. 6. Install new MRTs. While the recomputed MRTs are not installed in the FIB, protection coverage is lowered. Therefore, it is important to recalculate the MRTs and install them as quickly as possible. MRT re-calculation may also be possible in an incremental fashion, such that the sections of the MRT in use after a failure are not changed.

Figure 7:
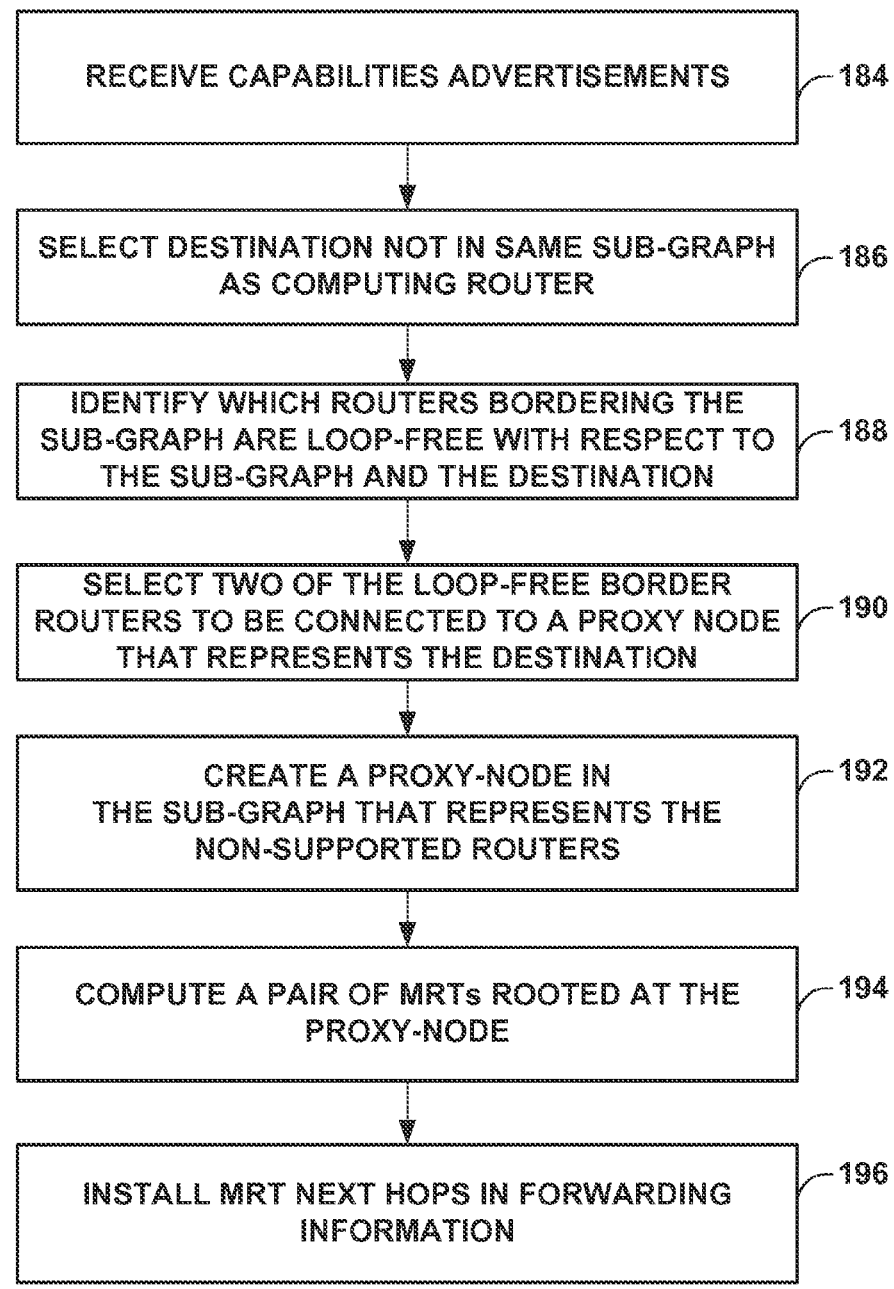
FIG. 7 is a flowchart illustrating example operation of network devices in setting up MRT fast reroute protection in a network in which not all network devices may be using any MRT fast reroute techniques or the same MRT fast reroute algorithms.

FIG. 7 is a flowchart illustrating example operation of network devices in setting up MRT fast reroute protection in a network in which not all network devices may be using any MRT fast reroute techniques or the same MRT fast reroute algorithms. The techniques of FIG. 7 illustrate one example of how partial deployment of the MRT fast reroute techniques in a network may be treated. FIG. 7 is described for purposes of example with respect to FIGS. 8A-8C and network device 100 of FIG. 5. The following example is described in terms of node 202S is the source node, i.e., the calculating node (router). Node 202S receives capabilities advertisements from other nodes 202 indicating, for example, one or more of: (1) MRT Fast Reroute Algorithm Support; (2) Multi-topology forwarding Support; and (3) MRT Island Selection (184).

Figure 8A:
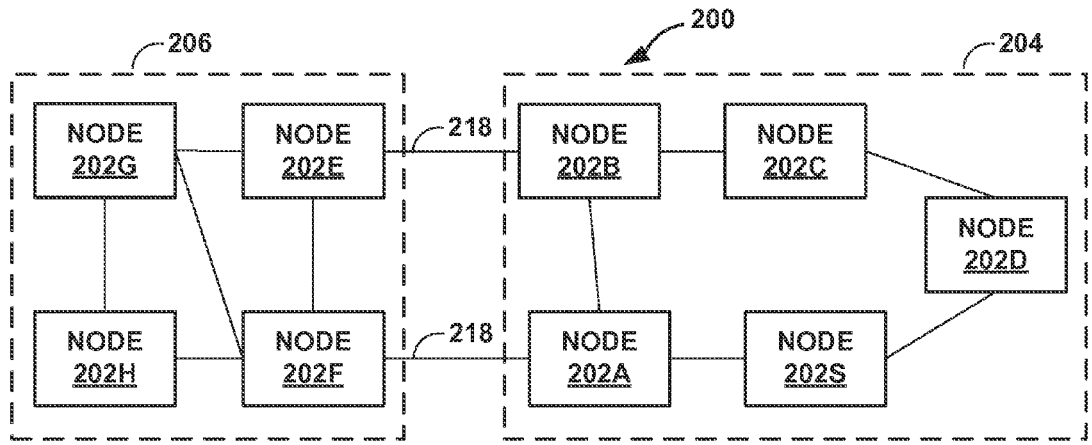
FIGS. 8A-8C are block diagrams illustrating example conceptual arrangements of network devices for implementing phased deployment of MRT fast reroute within network devices of a network.
Figure 8B:
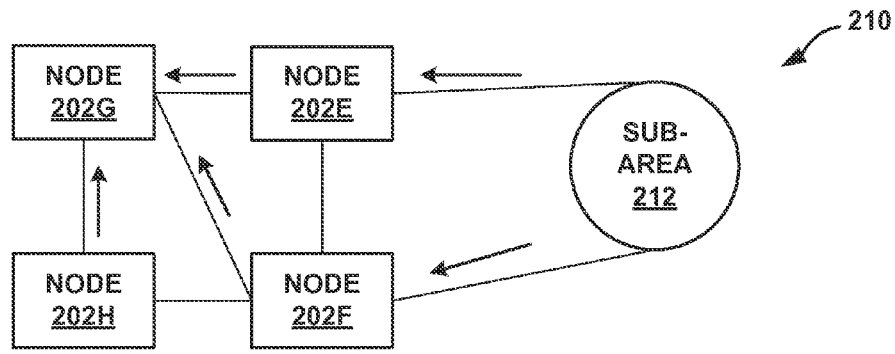
Figure 8C:
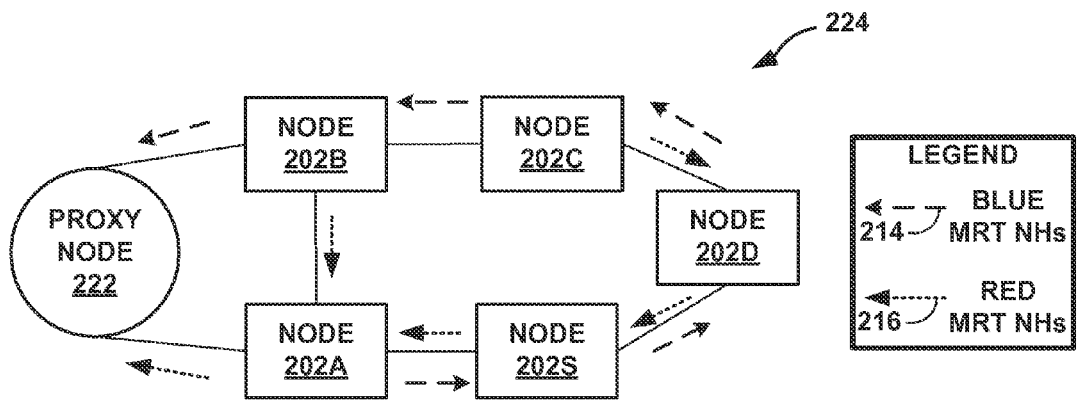

FIGS. 8A-8C are block diagrams illustrating example conceptual arrangements of network devices for implementing phased deployment of MRT fast reroute within network devices of a network. FIG. 8A is a block diagram illustrating a system 200 that is a network graph that includes nodes 202A-202S ("nodes 202") that are all present in a single IGP area. One or more of nodes 202 may be network devices such as network device 100 of FIG. 5. Nodes 202 may also be referred to herein as routers 202. In the example of FIG. 8A, a first sub-graph 204 of nodes 202 support MRT fast reroute techniques using the same algorithm, while a second sub-graph 206 of nodes 202 do not support the MRT fast reroute techniques using that algorithm. When an entire IGP area does not support MRT fast reroute with the same algorithm, a router, such as node 202S of the first sub-graph 204, may determine the sub-graph of other nodes 202 in the same sub-graph node 202S is in, and compute MRTs on nodes that sub-graph. Node 202S may construct a network graph in which the node 202S and each of the other network devices corresponding to nodes 202 are represented by a different node in the network graph. Node 202S may determine the sub-graph of other routers 12 that support MRT fast reroute with the same algorithm based upon advertised capabilities from the routers 202 in the area. In the example of FIG. 8A, node 202S may determine that nodes 202A-202D are in the same sub-graph 204 as node 202S. That is, node 202S identifies the first sub-graph 204 of other network devices (nodes) that support the same MRT fast reroute capabilities as node 202S. Sub-graphs 204, 206 may also be referred to as "sub-areas." Node 202S may also identify the second sub-graph 206 of nodes that do not support the same MRT fast reroute capabilities as node 202S.

FIG. 8B is a block diagram illustrating an example shortest path tree 210 to destination node 202G, where a single sub-area node 212 in shortest path tree 210 represents the sub-graph 204 of FIG. 8A. For a given destination, say node 202G as the destination, if the destination node is not in the same sub-graph 204 as node 202S for purposes of MRT computations (186), the computing node 202S identifies which nodes bordering the sub-graph 204 are loop-free with regard to the sub-graph 204 and the destination node 202G (188), as traffic from sub-graph 204 can only go to adjacent loop-free nodes.

FIG. 8C is a block diagram illustrating an example view of the network graph of FIG. 8A that node 202S may take when computing MRTs. Node 202S selects two of the loop-free border routers from shortest path tree 220 that are closest to the destination node 202G, e.g., node 202E and node 202F, to be connected to a "proxy-node" 222 that represents the destination node 202G (190) and the other network devices in sub-graph 206. Node 202S creates proxy-node 222 connected to sub-graph (sub-area) 204 by the links 218 of the two selected loop-free nodes (192), and adds the proxy-node 222 to the network graph.

Finally, node 202S computes a pair of MRTs rooted at the proxy-node 222 using the graph 224 of FIG. 8C (194), and uses the pair of MRTs for identifying and installing the pair of MRT alternate next-hop(s) to use for sending traffic to destination node 202G (196). The MRT next hops are positioned along the respective computed MRTs. FIG. 8C shows blue MRT next-hops 214 and red MRT next-hops 216 for the computed blue and red MRTs, respectively. Node 202S selects, as an alternate next-hop for forwarding packets to destination node 202G, one of the pair of MRT next-hops that would survive a failure of a given link or node associated with a primary next-hop, and installs the selected alternate next-hop in the FIB. When using an MRT alternate next-hop for fast reroute of packets in the system 200 of FIG. 8A, node 202S will send MRT encapsulated packets to one of MRT next-hops 214 or 216, and then nodes 202A and 202B will send non-MRT encapsulated packets to nodes 202E and 202F, respectively. The same basic mechanism can be used when there is a sub-graph of 100% coverage and destinations outside that.

Node 202S also selects and installs a primary next-hop for forwarding packets to destination node 202G. When packets are received by node 202S destined for node 202G, and no failure is detected, node 202S forwards the packets to the primary next-hop. When a failure of a network resource (e.g., a node or a link) associated with the primary next-hop is detected by node 202S, however, node 202S will use MRT fast reroute to forward the packets to the alternate next-hop that avoids the failure.

The following describes example capabilities that routers such as nodes 202, or network device 110, may advertise to their IGP neighbors. In some examples, some or all of routers 202 may advertise capabilities including one or more of: (1) MRT Fast Reroute Algorithm Support; (2) Multi-topology forwarding Support; and (3) MRT Island Selection. An "island," is the maximal graph of connected routers that share the same decision process, algorithm, and forwarding mechanism. Routers 202 may advertise these capabilities in IGP capabilities advertisements sent to IGP peer routers. For example, the capabilities may be carried in a Router Capability TLV for IS-IS, or in a Router Information Opaque link state advertisement (LSA) for OSPF. For more detail on advertising router capabilities, see RFC 4970, "Extensions to OSPF for Advertising Optional Router Capabilities," July 2007; and RFC 4971, "Intermediate System to Intermediate System (IS-IS) Extensions for Advertising Router Information," July 2007, the entire contents of each of which are incorporated by reference herein. Upon receiving the capabilities advertisements, routers 202 may compare the advertised capabilities of their neighbors with their own capabilities to determine whether common algorithms and capabilities are supported.

For MRT Fast Reroute Algorithm Support, node 202S indicates that node 202S can support MRT fast reroute and the Algorithm ID of the algorithm that node 202S supports. Node 202S may select more than one algorithm as being supported. The Algorithm ID will indicate which particular algorithm is supported for computing MRTs. Examples of such algorithms include "Common GADAG constructed with Low-point Inheritance and SPFs to find MRTs" (i.e., Low-Point Inheritance GADAG) and "Common GADAG constructed with SPFs and SPFs to find MRTs" (i.e., an SPF-based a GADAG), both of which are described in detail below. This also opens up the possibility to proprietary algorithms and to routing mechanisms that require forwarding support for multiple topologies.

For Multi-topology forwarding Support, node 202S indicates which types of forwarding mechanisms node 202S can support for IP (IPv4 and IPv6) and for LDP. Multi-topology forwarding Support capabilities advertisement may include the ability to indicate future forwarding mechanisms, in addition to existing forwarding mechanisms. For MRT Island Selection, each node 202 advertises the decision process used for determining the set of nodes 202 in the local IGP area that have compatible algorithms and forwarding support. This decision process may be consistent across all the nodes 202 and yet allow for the decision process to be changed in the future. Each node 202 selects the algorithm to use and the forwarding mechanism to be used.

It can be seen that there are two perspectives from which the MRTs are computed in the phased deployment scenario. From the first perspective, alternates using an MRT to destinations outside the set X must eventually leave the set X and encounter the normal shortest-path tree. Thus, it is necessary to determine for each neighbor NX_i of the set X whether that neighbor is a loop-free alternate with respect to the set X. This can be done by computation similar to that used for LFA computation. One example computation that may be used is as follows. First, compute the SPT from each NX_i to learn the distance from each NX_i to every destination. Second, consolidate the set X into a single node and compute the reverse SPT to learn the distance from each NX_i to set X. Third, compute the SPT from the consolidated set X to all destinations. Now, for each destination, it is possible to determine whether a particular neighbor NX_i is loop-free with respect to the set X. This gives a more restrictive answer than might be required, since it ignores the costs inside set X.

From the second perspective, the set X must compute its MRTs for each destination. For a given destination D, determine the two loop-free neighbors whose distance to D is the shortest and which are connected to different nodes inside set X; these two will be referred to as NX__1 and NX__2. If and only if there are not two loop-free neighbors connected to different nodes inside set X, then select the two loop-free neighbors whose distance to D is the shortest, even though they connect to the same node, referred to as A, in set X. In this latter case, protection against node A failing cannot be provided by the MRTs. Now, to compute the MRTs to destination D, create a temporary node Y (called a proxy-node) that is connected to the routers in the set X that connect to NX__1 and NX__2. Compute the MRTs. In this case, the MRTs must include the outgoing interface to NX__1 and NX__2; a router with such an interface will remove the MRT indication from the packet but forward it out the required interface to NX__1 or NX__2.

All such temporary or proxy nodes must be added to the network graph after the initial GADAG has been computed—including adding all the links To handle destinations that can only be reached via proxy-nodes, each proxy-node should be added into the network graph after Add_Directed_Links( ) (which is described below) has been run once. A proxy-node P is connected to two routers, X and Y, which have been found to offer the best cost. In one example, if X.topo_order<Y.topo_order, then the proxy-node P is added along with a link X→P and a link P→Y. In another example, in the inter-area case the proxy-node P may be ordered with X and Y based upon the ordering of border routers X and Y in the other IGP area/level. Once all the proxy-nodes have been added in this fashion, Run_Topological_Sort_GADAG( ) should be rerun so that the topological order includes the proxy-nodes as well. This is needed for determining which MRT can offer alternates.

Each attaching router must remove the MRT marking and then forward the traffic outside of the island of MRT-fast-reroute-supporting routers. If there are topology-id labels, then no more is necessary.

A similar method with proxy-nodes may be used for multi-homed prefixes. A multi-homed prefix is a prefix that is announced into an area by more than one router. A multi-homed prefix could be an out-of-area prefix announced by ABR or set of ABRs, an AS-External route announced by 2 or more ASBRs, or prefixes with iBGP multipath to different ASBRs.

One advantage of LFAs that is necessary to preserve is the ability to protect multi-homed prefixes against ABR failure. For instance, if a prefix from the backbone is available via both ABR A and ABR B, if A fails, then the traffic should be redirected to B. This can also be done for backups via MRT.

For each prefix, the two lowest total cost ABRs or ASBRs (e.g., ASBR 1 and ASBR 2) are selected and a proxy-node is created connected to those two ABRs/ASBRs. If there exist multiple multi-homed prefixes that share the same two best connectivity, then a single proxy-node can be used to represent the set. Ties are broken based upon lowest cost. The proxy-nodes and associated links are added to the network topology connected to the ASRs/ASBRs after all real links have been assigned to a direction and before the actual MRTs are computed. Proxy-nodes cannot be transited when computing the MRTs. In addition to computing the pair of MRTs associated with each router destination D in the area, a pair of MRTs can be computed rooted at each such proxy-node to fully protect against ABR failure. ASBR 1 and ASBR 2 will determine the directly connected interface towards that prefix and force the outgoing interface for a packet based upon its MRT.

When directing traffic along an MRT towards a multi-homed prefix, if a topology-identifier label is not used, then the proxy-node must be named and either additional LDP labels or IP addresses associated with it. ASBRs may advertise an LDP FEC labels for the MRT Proxy, e.g., loopback addresses representing (ASBR 1, ASBR 2, blue MRT) and (ASBR 1, ASBR 2, red MRT). MRT Proxy requires a fixed set of ASBRs, and so configuration is likely the easiest approach. The introduction of MRT Proxy node requires IGP extensions.

Figure 9:
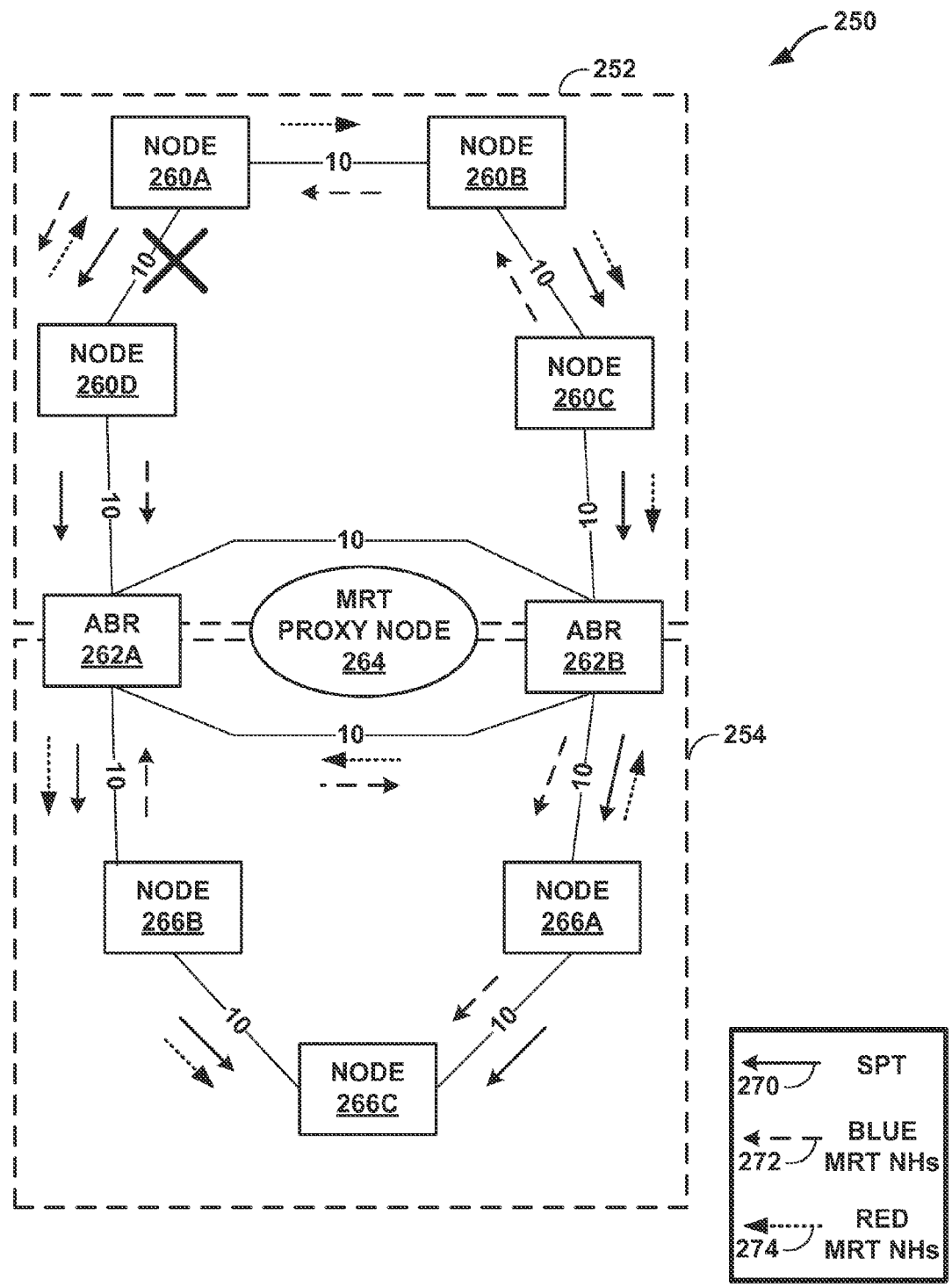
FIG. 9 is a block diagram illustrating an inter-area system having network devices configured for MRT fast reroute operations.

FIG. 9 is a block diagram illustrating an inter-area system 250 having network devices configured for MRT fast reroute operations. Although described for purposes of example with respect to areas, similar techniques may be used with multiple levels. When considering using MRTs in an IGP, the issue of multiple areas must be considered. In the example of FIG. 9, nodes 260A-260D ("nodes 260") are in a backbone area 252, and nodes 266A-266C ("nodes 266") are in a different non-backbone area 254. The arrows correspond to the shortest path tree (SPT) primary next-hops 270, blue MRT next-hops 272, and red MRT next-hops 274. From the point of view of a node 260 such as 260D of backbone area 252, area 254 is seen simply as an MRT proxy node 264. Similarly, from the point of view of nodes 266, area 252 is seen as the MRT proxy node 264.

In regular forwarding, packets destined outside the area 252 arrive at area border router (ABR) 262A and ABR 262A forwards them into the other area 254 because the next-hops from the area 254 with the best route (according to tie-breaking rules) are used by ABR 262A. The question is then what to do with packets marked with an MRT that are received by ABR 262A. An option that does not require forwarding based upon incoming interface is to forward an MRT marked packet in the area 254 with the best route along its associated MRT. If the packet came from that area 254, this correctly avoids the failure. If the packet came from a different area 252, at least this gets the packet to the destination (e.g., node 266C) even though it is along an MRT rather than the shortest-path.

The issue of multiple areas has at least three aspects. First, for the MRT pair rooted at the proxy-node P, it is necessary for the MRTs to include the outgoing interface to the other area (or the loop-free neighbor for the island inside an area case) or from the ASBR to the router outside the IGP announcing the prefix. Basically, the last hop of the MRT is outside the area/island and directed out a particular interface, which may not be a next-hop computed based on shortest-path first routing.

Second, an ABR may be in multiple areas in OSPF, or in two levels in IS-IS. An ABR may follow a few simple rules. For example, when the ABR receives a packet on an MRT, the ABR may, in some examples, forward the packet according to that MRT in the same area to which the ABR would normally forward a packet with the same destination, were it not on an MRT. That is, the ABR may forward the packet received on an MRT to the same area that won the tiebreaking for the primary next-hop. In addition, on the MRT, the router prior to the ABR may determine that the ABR will forward the packet out of the area/level—and therefore forward the packet to the ABR without MRT marking Third, it may be desirable that when a packet on an MRT leaves an area/level, the packet returns to the SPT. This is because the MRTs would result in sub-optimal but loop-free forwarding.

To avoid using an out-of-area MRT, special action can be taken by the penultimate router along the in-local-area MRT immediately before the ABR is reached. The penultimate router can determine that the ABR will forward the packet out of area and, in that case, the penultimate router can remove the MRT marking but still forward the packet along the MRT next-hop to reach the ABR. For instance, in FIG. 9, if the link between node 260A and node 260D fails, node 260A has to put traffic towards destination node 266C onto the red MRT. But since penultimate node 260C knows that ABR 262B will use a best path from area 252, it is safe for penultimate node 260C to remove the MRT marking from a received packet and just send the packet to ABR 262B still on the red MRT but unmarked. ABR 262B will use the shortest path in Area 254 to send the packet to node 266C.

Three example options are discussed below for forwarding packets from an MRT out of the area. In the first example (option 1), the penultimate router sends packets to the ABR without MRT markings (unmarked), and the ABR then forwards the packets on the SPT path. In option 1, the ABR receives an unmarked packet along the MRT in the first area, and forwards unmarked packet along SPT in the second area. This option requires penultimate hop popping by the penultimate router to clear marking from the packet if the packet is to be forwarded out of area. When the forwarding technique involves Option A (described above), the ABR can determine whether to request that packets be unmarked and, if so, can send the same LDP label to its neighbor in the first area for the FEC and for the FEC plus MRT-marking. Since the forwarding is done based upon the label value, this allows the ABR to have complete control of whether the PHP is done. When the forwarding technique used is not Option A, then the PHP router can typically determine if the packet is leaving the area and decide to do PHP.

As described above, the ABR normally selects the MRT in the same area to which the ABR would normally forward a packet with the same destination, were it not on an MRT. However, there is at least one case where the ABR should instead use the MRT from a different area. Consider the example where in area 10, destination D is an inter-area route advertised by both ABR-1 and ABR-2. It is possible that ABR-1's shortest path to D is via ABR-2 and that ABR-1's shortest path to ABR-2 is in area 10. In a scenario where an ABR is announcing an inter-area route for D into an area (e.g., area 10) and that ABR is connected to a proxy-node representing D in that area, the ABR can determine if its preferred route is into that area and, if so, then use the MRT next-hops from the other area. This avoids going through the other ABR in that area which might have been the failure point.

In the above scenario or other cases, such as for multicast live-live, where traffic needs to cross from one area or level to another while remaining on an MRT forwarding topology, the concern is how to provide node-protection for the border routers (BRs). This is simplest to explain when there are two BRs. Cases with more than 2 BRs can be poorly reduced to 2 BRs by removing all but 2 BRs, computing the GADAG, and then attaching in the proxy-nodes and finally the removed BRs; the next-hops to the removed BRs can only be used for traffic to that BR. If a BR can't be removed because it is a cut-vertex, then it should be left in; potentially if removing a BR would cause a new cut-vertex, there may be situations where it is desirable to leave the BR in. This may not be ideal, but can work; the full problem for multi-area node protection is likely to be similar to that for general shared risk link groups (SRLG).

Once there are only two BRs, then the first BR (e.g. BR-1) determines whether the Blue or the Red forwarding topology reaches the destination D in the second area without going through BR-2. This computation can be done in a similar method to that used to compute alternates—the difference is that none of BR-1, D and BR-2 need be adjacent. From this computation, BR-1 determines whether the Red or Blue topology should be used in the next area. If the topology color is different in the next area/level from the forwarding topology to BR-1 towards the proxy in the previous area/level, then BR-1 needs to swap from the Blue topology to the Red or vice versa.

For unicast traffic, the way to do this change of forwarding topology depends on the mechanism for marking packets as going on the MRT topology. If Option A described above is used, then a single MPLS describes both the FEC and MRT color. The BR-1 can advertise to its neighbors in the previous area/level a label L100 to mean (FEC, Blue) while advertising the same label L100 to neighbors in the next area indicating it means (FEC, Red). BR-1 would install the Red next-hops from the next area for L100. This avoids the need for BR-1 to do area-specific forwarding or have other complications.

For multicast live-live, the BR-1 would have to update the multi-topology ID requested in the control messages. In addition, traffic from the next area/level sent to the previous area/level might need to have its (S,G) updated, for the case where PIM is the signaling protocol and different G or S are used for the Blue and Red MRT topologies.

Another approach to inter-area node-protection works for multicast live-live, where each BR joins both the Blue and Red multicast trees in the upstream area; regardless of a single link or node failure in that upstream area, the BR will receive at least one stream. Then the BR selects which of the two streams to forward on and, for PIM, may need to update the traffic to indicate the desired (S,G) in the downstream area. This area-piecewise approach provides inter-area node protection for cases with more than one border router—but it requires live-live traffic flow.

As mentioned above, nodes should be able to compute for an arbitrary S, D and X in a network graph whether the Blue or the Red MRT from S to D definitely avoids X. For S to do this for an arbitrary D and X, S must know how each node is ordered with regard to S. If the graph were 2-connected, then the SPF and reverse-SPF that are already done as described below with respect to computing redundant tree next-hops in a 2-connected graph would be sufficient to provide the ordering information. However, to accommodate non-2-connected graphs, instead of terminating the SPF or reverse-SPF when a different block or local-root is reached, the SPF or reverse-SPF is continued, but links back into the most recent block (for that node's path) can no longer be explored. It suffices to store only the most recent block to avoid for each node since it is known that a graph of blocks will be a DAG. With this change to these SPF and reverse-SPF, the ordering of all nodes with regard to S can be determined.

Once the ordering is known, the following logic applies:
D>>S:
if (X>>S) {
  if (X.topo_order>=D.topo_order) {
    use Blue
  } else {
    use Red
  }
} else if (X<<S) {
  use Blue
} else { /* X and S are unordered. */
  /* only nodes in SI are used to reach D on Blue & X isn't in SI */
  use Blue
}
D<<S:
if (X<<S) {
  if (X.topo_order<=D.topo_order) {
    use Blue
  } else {
    use Red
  }
} else if (X>>S) {
  use Red
} else { /* X and S are unordered. */
  /* only nodes in SD are used to reach D on Red & X isn't in SD */
  use Red
}
D??S: /* D is unordered with respect to S */
if (X<<S) {
  use Red
} else if (X>>S) {
  use Blue
} else {
  if (X.topo_order>=D.topo_order) {
    use Blue
  } else {
    use Red
  }
}

The reasoning behind the above logic starts with the assumption that each link and node is in one of the following 4 groups. This assumes that links are uni-directional as far as the marking goes. (1) SI: Increasing from S: Compute an SPF from S where it cannot transit the GADAG root. This reaches the set of nodes N where N>>S. Do not mark the GADAG root as SI. (2) SD: Decreasing from S: Compute a rSPF from S where it cannot transit the GADAG root. This reaches the set of nodes N where N<<S. (3) RISI: Increasing from R up to SI: Compute a BFS from the GADAG root. Do not explore links that are already in SI or SD. Do not mark links or nodes that are already in SI or SD. (4) RDSD: Decreasing from R down to SD: Compute a reverse BFS from the GADAG root. Do not explore links that are already in SI or SD. Do not mark links or nodes that are already in SI or SD.

Each node MUST be in one of SI, SD, RISI, or RDSD. Because of the way the cases work for a node in RISI or RDSD, it is not actually necessary to compute either the RISI or RDSD; a node in either results in the same comparison based on topological order being made. Table 1 shows how the topologies relate to the ordering of D and S.

TABLE 1

| Relationship of D and S | Blue Topology can use | Red Topology can use |
|---|---|---|
| D >> S | Increase to D<br>SI<br>(nodes.topo_order <= D.topo_order) | Decrease to root & then decrease to D<br>Anything else<br>SD, RISI, RDSD,<br>SI (nodes.topo_order >= D.topo_order) |
| D << S | Increase to Root & then increase to D<br>Anything else<br>SI, RISI, RDSD,<br>SD (nodes.topo_order <= D.topo_order) | Decrease to D<br>SD<br>Nodes.topo_order >= D.topo_order |
| D ?? S (unordered) | Decrease toward Root & then Increase to D<br>SD (any node)<br>RISI (nodes.topo_order <= D.topo_order) | Increase toward Root-1 & then Decrease to D<br>SI (any node but root)<br>RDSD (nodes.topo_order >= D.topo_order) |

In the second example (option 2), the ABR receives a marked packet along an MRT in a first area, and forwards a marked packet along the MRT in the second area. This may use sub-optimal forwarding in the second area, despite SPT already providing loop-free forwarding. This option is appropriate for live-live traffic, such as multicast or unicast.

In the third example (option 3), the ABR receives marked packet along MRT in a first area, and forwards unmarked packet along the SPT in the second area. This approach requires the ABR to use different markings for a specific destination based on the packet source. If the packet source is in a different area, the packet is sent unmarked on SPT. If the packet source is in the same area, the packet is sent marked MRT on the area MRTs to ensure loop-free forwarding.

In all cases for ISIS and most cases for OSPF, the penultimate router can determine what decision the adjacent ABR will make. One case where it cannot be determined is when two ASBRs are in different non-backbone areas attached to the same ABR, then the ASBR's Area ID may be needed for tie-breaking (prefer the route with the largest OPSF area ID) and the Area ID is not announced as part of the ASBR link-state advertisement (LSA). In this one case, suboptimal forwarding along the MRT in the other area would happen. If this is a realistic deployment scenario, OSPF extensions could be considered.

To make option 2 work, where packets are forwarded between areas on an MRT, knowledge of the ordering of the border routers in the other areas is needed. This allows proper specification of the directed links connecting to and from proxy-node. The rule is simply that if, for example, ABR 262A<<ABR 262 B in area 252, then in area 254, ABR 262B<<proxy 264<<ABR 262A. That is, a loop is needed between the border routers in one area and the same border routers and proxy in the other area. This may help for live-live forwarding across areas. In some cases, ABR 262A and ABR 262B might not be ordered with respect to each other. This situation may require different orderings per prefix.

MRT fast-reroute provides complete coverage in an area that is 2-connected. Where a failure would partition the network, of course, no alternate can protect against that failure. Similarly, there are ways of connecting multi-homed prefixes that make it impractical to protect them without excessive complexity.

Consider a topology having AS external prefixes in different areas, where the same prefix is announced by ASBR X and ASBR Y which are in different non-backbone areas. The cost from the prefix to ASBR X is 5, and the cost from the prefix to ASBR Y is 50. If the link from router A to ASBR X fails, then an MRT alternate could forward the packet to an ABR 1 associated with a second area, and ABR 1 could forward it to router D in its area, but then D would find that the shortest route to the prefix is back via ABR 1 to the area in which router A resides. The way to get it from router A to ASBR Y is to explicitly tunnel it to ASBR Y, the backup ASBR.

The previously proposed PHP approach needs to have an exception if BGP policies (e.g. BGP local preference) determines which ASBR to use. The following is an example of failure of path towards ASBR preferred by BGP. A router A in a first area 20 prefers border router ASBR X to reach prefix p. If the link between a router A and ASBR X fails, router A can put the packets destined prefix p onto an MRT alternate, even tunnel it towards ASBR Y, another ASBR in a second area 0 that can be used to reach p. Router B, the penultimate router in Area 20 before the ABR that couples the Area 20 and Area 0, must not remove the MRT marking in this case, as nodes in Area 0, including ASBR Y itself would not know that their preferred ASBR is down.

For OSPF, a router can be in multiple areas at the same time. If two ASBRs are in different non-backbone areas attached to the same ABR, then the ASBR's Area ID may be needed for tie-breaking and is not announced as part of the ASBR LSA. If this proves to be a realistic deployment scenario and staying on the MRT in a different area is a concern, then an Opaque LSA announcing the area for an ASBR could be defined. Link costs may be referred to as type 1 costs and type 2 costs. The type of cost indicates whether the costs are comparable to internal link metrics. Type 1 costs can be added and compared to internal costs. Type 2 costs cannot be compared, so any type 2 external route is considered, by definition, more expensive than any internal route or type 1 external route. Several OSPF tie-breaking rules may be used, such as: (1) Prefer intra-area and inter-area routes to AS-external routes. (2) Prefer type 1 external routes over type 2 external routes. (3) For type 2 external routes, prefer the lowest type 2 cost. (4) Prefer lowest-cost route (cost to ASBR+type 1 cost or, for type 2 of equal type 2 cost, cost to ASBR). (5) Prefer intra-area routes using non-backbone areas. (6) Prefer the route with the largest OSPF area ID. More on OSPF tie-breaking may be found in Moy, J., "OSPF Version 2," RFC 2328, April 1998, incorporated by reference above.

Figure 10:
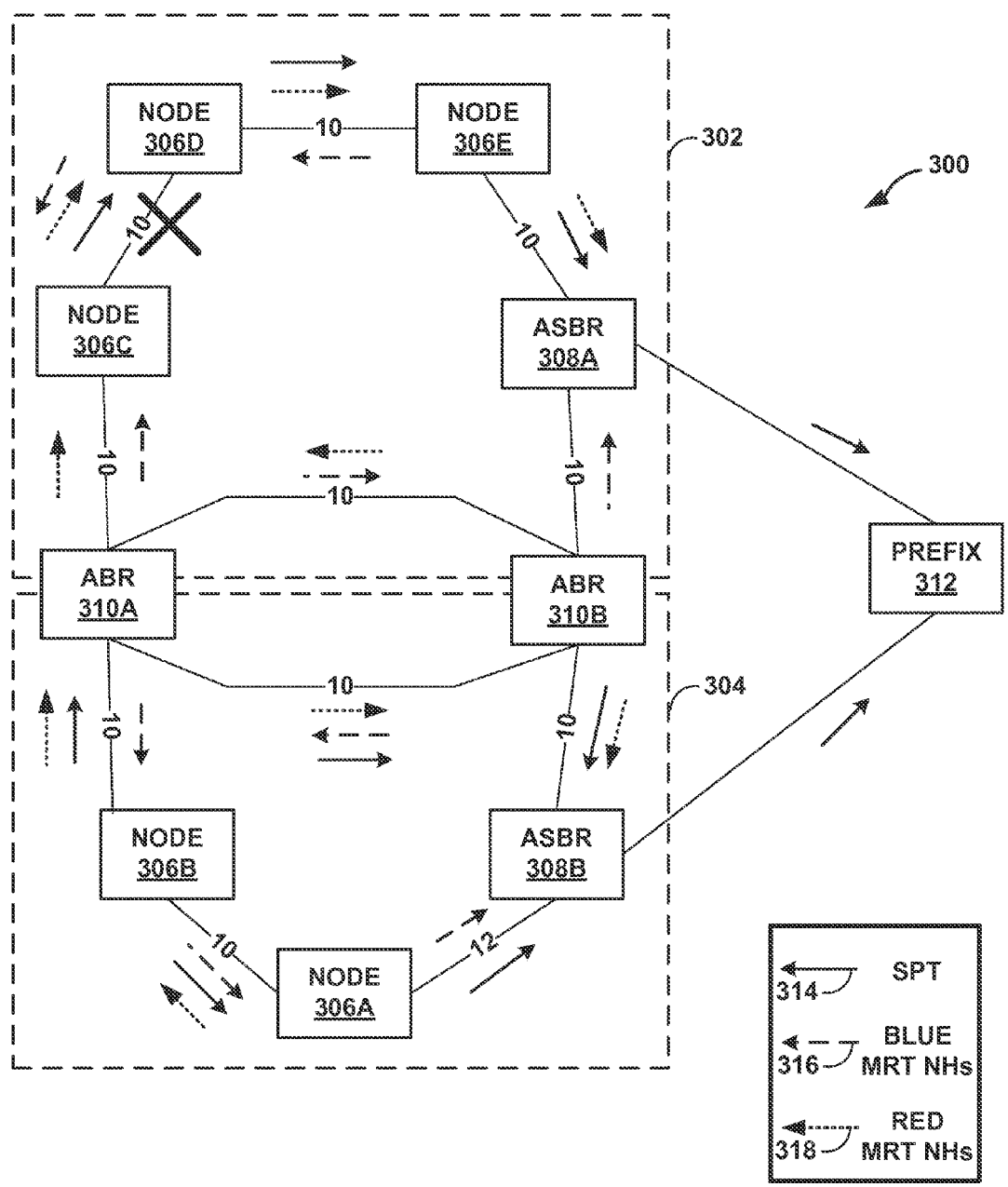
FIG. 10 is a block diagram illustrating an example inter-area system having network devices configured for MRT fast reroute operations.

FIG. 10 is a block diagram illustrating an example inter-area system 300 having network devices configured for MRT fast reroute operations. Although described for purposes of example with respect to areas, similar techniques may be used with multiple levels. In the example of FIG. 10, nodes 306C-306E are in a backbone area 302, and nodes 306A and 306B are in a non-backbone area 304. The arrows correspond to the shortest path tree (SPT) primary next-hops 314, blue MRT next-hops 316, and red MRT next-hops 318. ABRs 310A and 310B are positioned on a boundary of areas 302 and 304. Autonomous system border routers (ASBRs) 308A and 308B are positioned on edges of an autonomous system, and can send traffic toward prefix 312.

If the link from node 306C to node 306D fails, then node 306C would select the blue MRT in area 302 to send traffic destined to prefix 312. An IP packet that is just tagged to go on the blue MRT would still have a destination inside prefix 312. When ABR 310A receives this blue MRT packet, we consider what ABR 310A should do. First, it seems reasonable for ABR 310A to forward the packet into Area 304 instead of area 302; this is what would occur after convergence in area 302 when node 306C sends IP packets on the SPT towards ABR 310A. Second, ABR 310A has to decide whether to forward the packet along the blue MRT or along the SPT in area 304. Without knowing the area that a packet was received on, e.g. per-area FIB information, ABR 310A cannot determine whether it is safe to forward the traffic on to the SPT.

Thus, the question is whether node 306C could know that ABR 310A would send the traffic into area 304. If node 306C could tell, then node 306C could just send an untagged IP packet destined to prefix 312 towards ABR 310A. Because in OSPF, the AS-external routes have AS-wide scope, node 306C knows that ASBR 308B is also advertising prefix 312. ABR 310A and ABR 310B also need to advertise a type-3 summary LSA for ASBR 308B into area 302. So, in this case where node 306C is in area 302, node 306C could infer that ABR 310A is advertising a summary LSA for ASBR 308B and ASBR 308B is advertising prefix 312, the associated costs for all routes, and therefore, the route of ABR 310A route will be out of area 302. Therefore, node 306C could decide to direct the traffic to ABR 310A and remove the blue MRT tag. This works for routers in the backbone area 302.

However, if instead of the backbone area 302, say that node 306C was in another area M. If M had an associated address larger than the address of area 304, then ABR 310A would be sending the traffic inside area M to reach ASBR 308A. If the address of M were smaller than the address of area 304, then ABR 310A would be sending the traffic inside area 304 to reach ASBR 308B. Since node 306C cannot tell, node 306C must leave the packet in the blue MRT and ABR 310A will also leave the packet in the blue MRT forwarding the packet into whichever area ABR 310A prefers.

To improve this behavior, ABR 310A could also originate an Opaque LSA that reported the source area of the ASBRs. This would allow the router forwarding along an MRT to an ABR to make an informed decision about whether to tell the ABR to use the SPT or the MRT.

Table 2 is a table showing the FIB entries at each router of FIG. 10 for prefix 314 on the SPT, the blue MRT, and the red MRT.

TABLE 2

|  | ABR 308A | ABR 308B | Node 306A | Node 306B | Node 306C | Node 306D | Node 306E |
|---|---|---|---|---|---|---|---|
| SPT | ABR 308B | ASBR 310B | ASBR 310B | Node 306A | Node 306D | Node 306E | ASBR 310A |
| Blue MRT | Node 306B | ABR 308A | ASBR 310B | Node 306A | ABR 308A | Node 306C | Node 306D |
| Red MRT | ABR 308B | ASBR 310B | Node 306B | ABR 308A | Node 306D | Node 306E | ASBR 310A |

Figure 11:
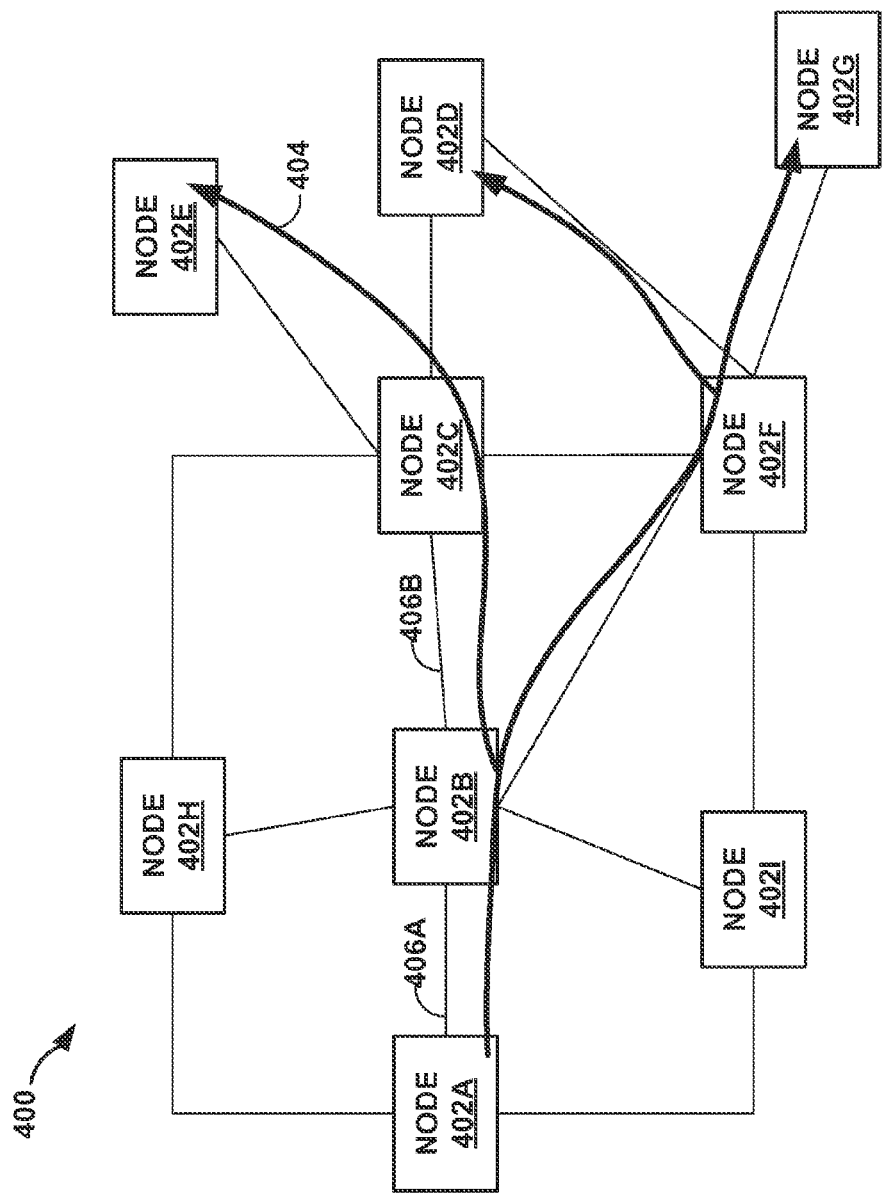
FIG. 11 is a block diagram illustrating an example system in which a plurality of network nodes send and receive multicast traffic in accordance with the techniques of this disclosure.

FIG. 11 is a block diagram illustrating an example system 400 in which a plurality of network nodes 402A-402I ("nodes 402") send and receive multicast traffic in accordance with the techniques of this disclosure. This disclosure describes an architecture for fast-reroute that provides protection for IP and LDP multicast traffic, as well as live-live multicast traffic.

Nodes 402 may be network devices, such as routers or other network devices having routing functionality. For example, one or more of nodes 402 may be a network device such as network device 100 of FIG. 5. Node 402A may be a source of multicast traffic for one or more multicast groups, and nodes 402E, 402D, and 402G may be receivers that request multicast traffic for the multicast groups from source node 402A. Node 402A sends multicast traffic for the multicast group to the receivers using a primary multicast tree 404 associated with the multicast group. In some examples, node 402A may not itself be the source of the multicast traffic, but may be communicatively coupled to the multicast source and may send multicast traffic received from the multicast source to the receivers using primary multicast tree 404.

Nodes 402 may be configured with alternate multicast trees to provide fast reroute link protection and node protection. The alternate multicast trees may be pairs of MRT multicast trees rooted at the source device, where the MRT multicast trees are computed according to the techniques of this disclosure. For example, node 402B may be a point of local repair (PLR) router for fast reroute link protection of link 406B. Next hops for a pair of MRT alternate multicast trees may be installed on nodes 402 for protecting link 406B such that if link 406B should fail, node 402B may send the multicast traffic on one or more of the MRT alternate multicast trees that follow paths that avoid link 406B. For example, one alternate path that avoids link 406B is from node 402B to node 402H to node 402C. In this example, node 402C may be a merge point that merges the multicast traffic received on the MRT alternate multicast tree back onto the primary multicast tree 404.

As another example, node 402A may be the PLR for fast reroute node protection of node 402B. In addition, next hops for a pair of MRT alternate multicast trees may be installed on nodes 402 for protecting node 402B such that if node 402B should fail, node 402A may send the multicast traffic on one or more of the MRT alternate multicast trees that follow paths that avoid node 402B. Node 402C may be the merge point for the MRT alternate multicast tree used to avoid node 402B, and as the merge point, node 402C may merge multicast traffic back onto primary multicast tree 404. Node 402A may also be a PLR for providing link protection to link 406A. Node 402F would also be a merge point to reach nodes 402D and 402G. Node 402A would replicate the traffic to send the replicated traffic to node 402C, 402F and 402B, in case there were receivers local to 402B and there was a link failure but not a node failure.

In another example, for a merge point network device, such as node 402B, node 402B may receive a request to join a multicast group and may join the group, for receiving multicast data traffic on an alternate multicast tree, wherein the alternate multicast tree is a maximally redundant tree rooted at the point of local repair network device 402A. The alternate multicast tree avoids a protected resource that is positioned along a primary multicast tree (such as link 406A or, in a node protection case, a node). As a merge point, node 402B merges multicast traffic received on the alternate multicast tree back onto a primary multicast tree 404 that extends between the multicast source and a multicast receiver. For example, upon receiving a data packet at an upstream interface of the network device on the alternate multicast tree, the merge point determines whether to accept or discard the data packet received on the alternate multicast tree based on a state of one or more primary upstream multicast interfaces of the merge point network device. When the state of each of the primary upstream multicast interfaces is down, the merge point can accept the data packet on the alternate multicast tree as primary traffic for the multicast source, and forward the data packet to a next hop along the primary multicast tree.

In addition, more generally, a merge point can receive alternate multicast traffic associated with a multicast source and a multicast group at an upstream interface of a network device, and, when the state of each of the primary upstream multicast interfaces of the network device is down, forwarding the alternate multicast traffic to a next hop along a primary multicast tree as primary multicast traffic for the multicast source and the multicast group. In this example, the alternate multicast traffic may be received on an MRT alternate multicast tree, or may be received via another mechanism, such as a unicast tunnel.

There are several basic issues that arise with doing Fast-Reroute for multicast traffic, whether the alternates used are LFA or MRT. For example, the PLR, such as node 402B, does not know the set of next-next-hops in the multicast tree. In addition, a potential Merge Point (MP), such as node 402C, does not know its previous-previous-hop in the multicast tree, including the PLR. For multicast LDP (mLDP), the PLR does not know the appropriate labels to use for the next-next-hops in the multicast tree. Also, the MP does not know upon what interface to expect backup traffic. For LFAs, this is a particular issue since the LFA selected by a PLR is known only to that PLR.

Additionally, fast-reroute is to protect against a link failure, a node failure, or even local Shared Link Risk Group (SRLG) or general SRLG failures, but the mechanisms for such detection mean that a network device, such as PLR node 402A, cannot distinguish easily between a link failure and a node failure, much less more complicated failures. In unicast forwarding, the assumption can be made that any failure is a node failure, unless the destination is the next-hop, and traffic is simply forwarded to the final destination avoiding the next-hop. For multicast, the final destination is not useful. Rather, what matters is the set of next-hop routers and the set of next-next-hop routers reached via each of the next-hop routers on the relevant multicast tree.

In multicast, it is possible that traffic is required by the next-hop as well as the next-next-hop and beyond. Therefore, in accordance with the techniques of this disclosure, whenever a local failure is detected and node protection is configured, a router may send traffic to both the affected next-hop routers and the set of next-next-hops reached via those next-hop routers. For example, a router may inform its upstream neighbor on a multicast tree about the router's downstream neighbors on the same tree, and their associated mLDP labels via extensions to PIM or mLDP. Those labels might be same as used for regular traffic or might be allocated specifically for backup protection.

When the PLR detects a failure, it forwards the multicast traffic on the link-protecting alternates. In some examples, the PLR on a locally detected failure may replicate and send multicast traffic on both the link-protecting alternates and the node-protecting alternates since the PLR cannot determine if the failure is the downstream link or router. The PLR may send the multicast traffic on the alternates for a configurable duration, since potential merge points cannot easily communicate when to stop sending multicast traffic on the alternate next-hops. After the duration has elapsed, the PLR may resume sending the multicast traffic on the primary multicast tree.

The potential Merge Point, such as node 402C, is configured to independently determine whether to accept alternate traffic, i.e., multicast traffic received on an alternate multicast tree. For example, if node 402C determines that the primary upstream link(s) have failed, then the potential Merge Point node 402C accepts and forwards the alternate traffic. Node 402C may, for example, determine whether to accept and forward traffic on alternates based upon the state of the upstream PIM adjacency or mLDP adjacency as represented by the upstream link(s) at the data plane. This MP behavior involves a new action on detecting a local failure. When the local failure is detected, if that was the last primary upstream link, then route selection module 112 (FIG. 5) of node 402C updates the associated entry of FIB 114 for the alternate traffic from discard to forward. When node 402C later receives multicast traffic on a new primary upstream link, node 402C stops accepting and forwarding alternate traffic, and again updates the entry of FIB 114 to ignore and discard the alternate traffic received on the alternate multicast trees. There may be issues with traffic missed due to different latencies along new primary and alternate/old primary trees.

Various methods may be used for creating alternates to be used for fast-reroute for multicast traffic. One option is to use PLR-replication with tunneling. Another option is to use an alternate tree. In the PLR-replication with tunneling option, the PLR selects the appropriate unicast alternate to use to each potential MP, replicates the multicast traffic, and tunnels it to each potential MP using whatever route is used in the data plane, whether an alternate next-hop or the new primary next-hop. It is important to move traffic rapidly off of the MRT topologies during network convergence so that the new MRT next-hops can be programmed into the FIB. The MP recognizes the traffic as coming on an alternate explicitly because it is tunneled and, potentially, because the associated label is for an alternate. Explicit NULL or a known label for LDP can be used.

The disadvantages of tunneling unicast traffic do not fully translate to those for multicast. With MRT fast-reroute, IP unicast traffic is tunneled. With mLDP, with the suggested extensions, along with learning the next-next-hops on the multicast tree, the associated labels can be learned so there is no need for targeted sessions. If multicast traffic were not tunneled, then multicast state would need to be created ahead of the failure along the alternate paths.

In this approach, the PLR replicates and tunnels multicast traffic to each particular MP. This is simply PLR-replication. The PLR tunnels the multicast traffic in unicast (either IP or LDP), where the outer IP address or LDP label indicates that MP and the appropriate topology (SPT, blue MRT or red MRT), as selected at the FIB for that MP. For node-protection, the PLR learns of the MPs and their labels via protocol extensions, as discussed below. One potential downside of the PLR replication approach is that the same packets may appear multiple times on a link if they are tunneled to different destinations. A potential advantage of the PLR replication approach is that PLR replication avoids creating alternate multicast state in the network.

To minimize replication of packets, it is possible to create alternate-trees. Each alternate-tree would be for a given PLR network device and protected neighbor network device, i.e., the alternate-tree would be failure-specific. It may not be possible to merge alternate-trees for different PLRs or for different neighbors. Backup Joins can be used to create the per-failure-point alternate trees. A Backup Join would indicate the PLR and the node to avoid. Each router that receives the Backup Join would determine which of the Blue MRT or Red MRT could offer an acceptable path and forward the traffic that way.

In the alternate tree option, each MP is configured to explicitly signal Backup Join messages that go hop-by-hop along a path towards the PLR. The MP indicates the PLR, the destination node D, and the failure-candidate node to avoid, F, in the backup join message. The MP determines its unicast alternate to the PLR, that avoids the failure-candidate node to avoid F. The MP sends a backup join to that alternate's next hop. Each router along the path, including the originating router, determines which of an LFA, the Blue MRT or the Red MRT to use for its next-hops. When a router receives a backup join and is not the destination PLR, the router identifies a unicast alternate to the PLR that avoids the failure-candidate node, creates local multicast group state, and forwards the backup join to that alternate's next-hop. Backup Joins to the same PLR with the same failure-node F are merged together into a multicast tree. Alternate trees from different PLRs may not be merged.

Traffic for each Alternate-Tree requires its own label to ensure correct behavior if Alternate-Trees for different PLRs but the same (S,G) or P2MP FEC overlap. For PIM, a label associated with the PLR could give context for the IP lookup. Alternate-Tree creation assumes each router can quickly look-up which PLR-rooted MRT to use that avoids an arbitrary PLR-neighbor failure-candidate node. Selection of MRT color for unicast alternates does not depend upon the PLR and failure-candidate being adjacent and may be able to extend for arbitrary failure-candidates.

MPs may determine the unicast alternate to the PLR and send a Backup Join to the next-hop for that alternate. The Backup Join indicates PLR and failure-candidate. These are processed and resent hop-by-hop until the PLR or existing alternate-tree is reached. Alternates used are towards the PLR, so these are PLR-rooted MRTs as well as LFAs. The backup tree may be the merged set of unicast alternates. It is also possible to create an alternate tree for (PLR, failure-point, S) so that the alternate-tree acts like a bypass tunnel in that there is only one set of multicast state regardless of the number of G considered. That is, multiple multicast (S, G) pairs may be associated with a single alternate-tree. For PIM, this can be done by forwarding based upon the label (instead of just using the label for the context). For mLDP, upstream label assignment would be needed. Alternatively, an alternate-tree may be a dedicated alternate tree associated with only one multicast (S, G).

As one example, to determine the next-hops, the following checks may be made by a router X:
1. A neighbor N offers a LFA if:
   D_opt(N,PLR)<D_opt(N,F)+D_opt(F,PLR)
   (N's path to PLR avoids F so avoids failure-node)
   D_opt(N,PLR)<D_opt(N,X)+D_opt(X,PLR)
   (N's path to PLR avoids X so loop-free)
   D_opt(N,PLR)<D_opt(X,PLR)
   (so a downstream neighbor)
2. Since F is a neighbor of PLR, it is known that either F<<PLR or F>>PLR.
   If F<<PLR
     if N>>PLR
       use MRT_RED (decrease)
     else if N<<PLR
     if N.topo_order<F.topo_order
       use MRT_RED (decrease around root)
     else
       use MRT_BLUE (N above F so can increase to PLR)
     else // (N and PLR aren't ordered)
       use MRT_BLUE
   else (F>>PLR)
     if N<<PLR
       use MRT_BLUE (increase)
     else if N>>PLR
       if N.topo_order<F.topo_order
         use MRT_RED
       else
         use MRT_BLUE
     else (N and PLR aren't ordered)
       use MRT_RED Traffic sent by a PLR onto the alternate-tree may be explicitly marked as to PLR/failure-point alternate (either via an LDP label or an IP option) to avoid accidental merging with the primary multicast tree or other alternate trees. This is an issue for native IP (e.g. signaled with PIM) traffic. A merge point receiving a multicast data packet on an alternate multicast tree can determine whether to accept or discard the packet based on the state of the upstream interface on which the packet is received.

To create alternates from the potential Merge Points to the PLR and provide the MP and PLR with sufficient information, the following protocol extensions may be used. PIM and mLDP may be extended to signal Backup Joins: A backup Join can be sent from the MP towards the PLR going hop-by-hop. PIM and mLDP may be extended to send Join Confirmations with upstream router information. This provides the MP with information about the PLR for node protection scenarios. mLDP 116E and PIM 116N of network device 100 may be extended to include these features.

For node-protection, the merge points would be the next-next-hops in the tree. For a PLR to learn them, additional PIM Join Attributes may be defined to specify the set of next-hops from which the sending node has received Joins. PIM and mLDP can therefore be extended to send the next-hops in the join message, and for mLDP, the associated labels. For link-protection, a PLR knows the address of the neighbor. PIM currently sends its JoinPrune messages periodically (e.g., 60 seconds by default). Upon a change to the next-next hop list, a router such as network device 100 can send a triggered JoinPrune with the updated Join Attribute, or it can wait for the next periodic refresh. It would be a trade-off of increased control messages against a window of being unprotected. Once the failure is detected, the PLR will send the traffic encapsulated to the list of downstream MPs. The PLR will send the encapsulated traffic for the duration of the protection-timeout. The protection-timer starts when the PLR detects a local failure. Once the timeout expires, the PLR can then prune upstream if there are no longer any receivers after the failure.

The MP will forward traffic received on its normal incoming interface. If that interface fails, the MP will forward traffic if it is received with the correct encapsulation. After the incoming interface changes and new traffic arrives on the new incoming interface, received encapsulated traffic will not be forwarded until the protection-timer expires. This reduces sending of duplicate traffic at the cost of being briefly unprotected after a failure event.

Additional extensions to PIM 114E may include the following. In the example of PIM Sparse mode, a new Hello Option Capabilities may be defined to indicate the ability to understand the new Join Attributes. A new Join Attribute may also be defined to send the next-hops and the type of acceptable encapsulation to the PLR. More information on PIM Join Attribute format may be found in Network Working Group, "The Protocol Independent Multicast (PIM) Join Attribute Format," RFC 5384, November 2008, the entire contents of which are incorporated by reference herein.

As in PIM, in mLDP a mechanism may be added so that the PLR can learn the next-next-hops. The PLR also needs to learn the associated label-bindings. This can be done via a new P2MP Child Data Object. This object would include the primary loopback of an LSR that has provided labels for the FEC to the sending LSR along with the label specified. Multiple P2MP Child Data Objects could be included in a P2MP Label Mapping. In some examples, only those specified in the most recently received P2MP Label Mapping should be stored and used by mLDP 116E of network device 100. This will provide the PLR with the MPs and their associated labels. The MPs will accept traffic received with that label from any interface, so no signaling is required before the alternates are used. Traffic sent out each alternate will be tunneled with a destination of the MP.

Maximally Redundant Trees may also be used for live-live multicast. For a variety of networks, including dual-planed networks and other networks, it may be desirable to have two disjoint multicast trees and allow a receiver to join both and make its own decision about what to do. Using MRTs gives the ability to guarantee that the two trees are as disjoint as possible and to dynamically recompute the two MRTs whenever changes to the topology of the network are detected. Unlike for fast-reroute, where the MRTs are rooted at the destination, with Live-Live Multicast, the MRTs would be routed at the multicast group source S.

Figure 12A:
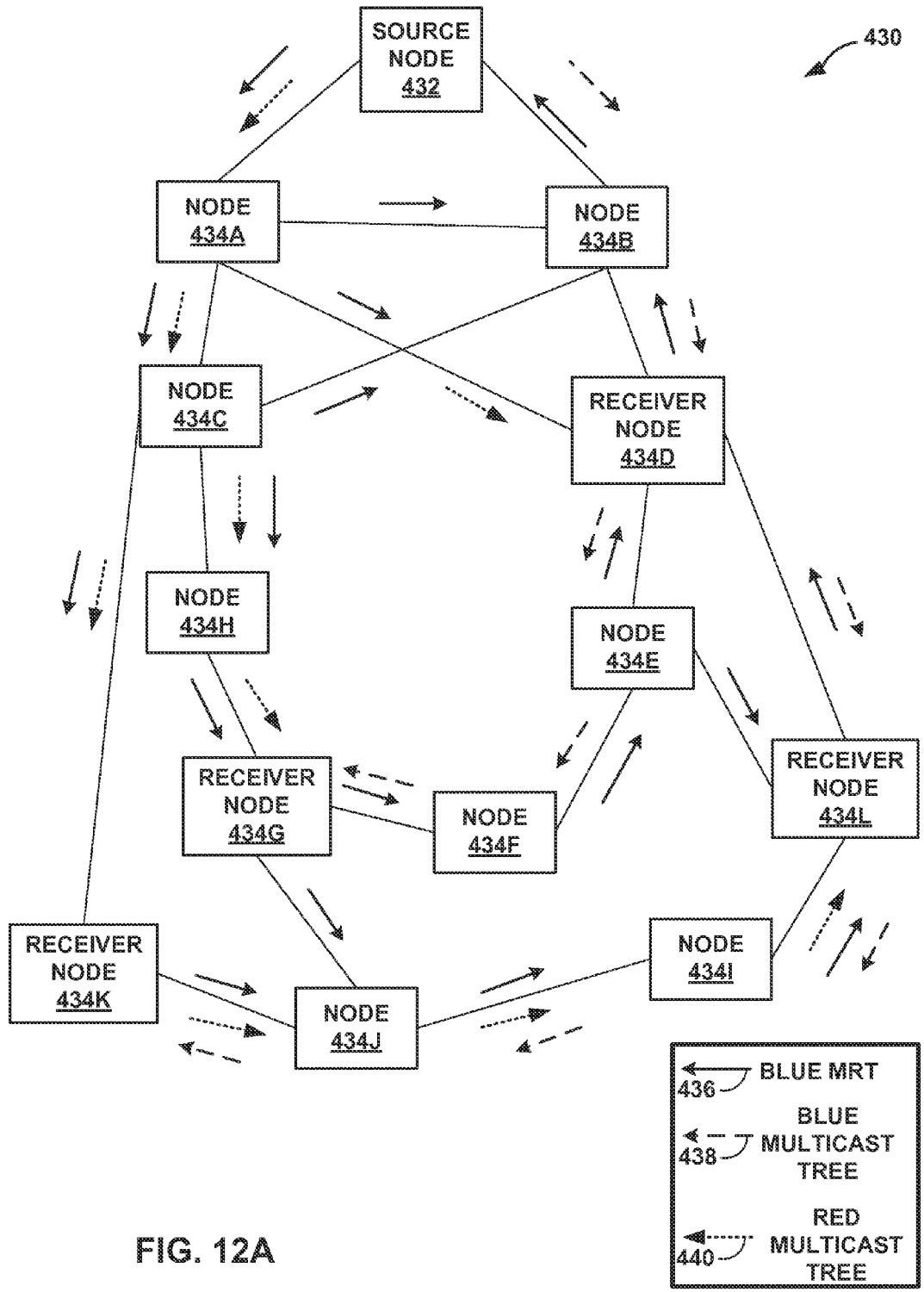
FIGS. 12A-12B are block diagrams illustrating example multicast live-live network topologies and multicast trees before and after a failure of a node in the network.
Figure 12B:
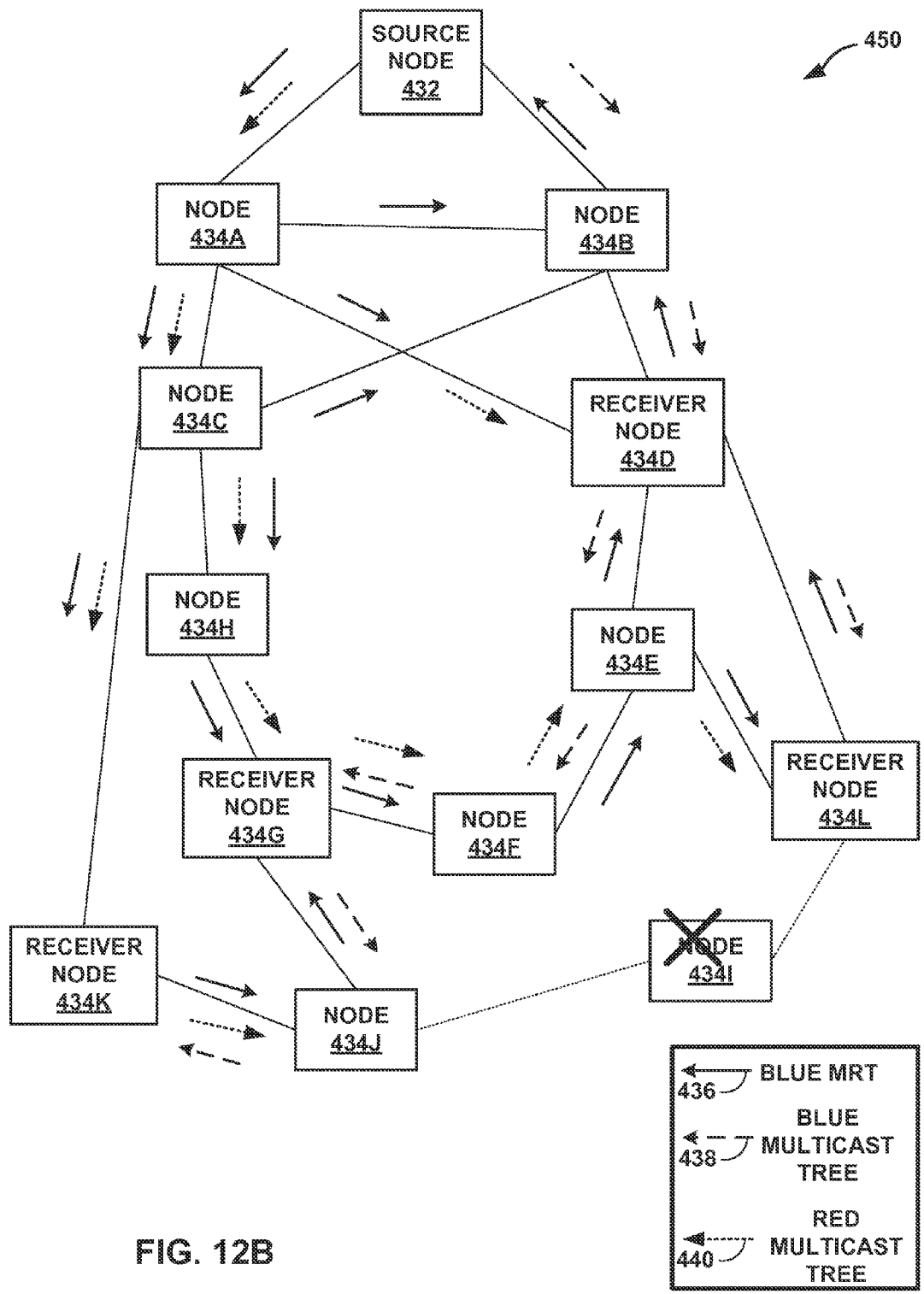

FIGS. 12A-12B are block diagrams illustrating example multicast live-live network topologies and multicast trees before and after a failure of a node in the network. The network topologies show an example of how the network converges in the multicast live-live situation. In live-live, the multicast trees built upon the MRTs are not alternate trees, but rather they are used to carry the traffic always and not only upon failure. Multicast traffic is sent simultaneously on both the Blue-MRT-based multicast tree and on the Red-MRT-based multicast tree. The first stream of data packets received on the Blue-MRT-based multicast tree and the second stream of data packets received on the Red-MRT-based multicast tree are redundant data streams from the multicast source.

When a network device receives multicast streams of data packets on the Blue-MRT-based multicast tree and on the Red-MRT-based multicast tree, the network device can determine whether to accept the first stream of data packets received on the first multicast tree (Blue-MRT-based) or the second stream of data packets received on the second multicast tree (Red-MRT-based) based on at least one of a health of the first stream of data packets and a health of the second stream of data packets. For example, the network device may determine that a packet of the first stream of data packets has not been received within a time period on the first multicast tree, and so may accept the second stream of data packets received on the second multicast tree and may subsequently drop any other packets received on the first multicast tree. As another example, the network device may compare packets received on the first stream of data packets received on the first multicast tree with packets received on the second stream of data packets received on the second multicast tree to determine which packets are first received by the network device, and forward the first packets received regardless of an interface of the network device on which the packets are received.

FIG. 12A is a block diagram illustrating an example multicast live-live network topology 430 prior to failure of a node 434I. Node 432 is a source node that may be a source of multicast traffic for a multicast group G. If the actual multicast source is in a different area than nodes 434A-434I ("nodes 434"), node 432 may be a proxy-node that represents the source. Receiver nodes 434D, 434G, 434K and 434L are receivers that join both the blue and red multicast trees for receiving multicast traffic from multicast group G from source node 432. In this manner, if a node in topology 430 fails, the receivers can still receive the multicast traffic via one of the MRT-based multicast trees. The red and blue multicast trees may be set up in the network to be associated with different multicast groups, G-red and G-blue. Thus, the multicast trees are (S, G-blue) and (S, G-red), where S is the source node 432.

The arrows represent Blue MRT next-hops 436 on a Blue MRT, and next-hops 438 on a Blue-MRT-based multicast tree, and next-hops 440 on a Red-MRT-based multicast tree. The blue MRT reaches from source node 432 to all nodes. The Blue MRT-based multicast tree only connects to source node 432 those nodes 434 that have joined the tree. The traffic may flow through other nodes as midpoints, but need not go to all and is not consumed there. FIG. 12B is a block diagram illustrating an example multicast live-live network topology 450 as it has converged after failure of node 434I has occurred.

For nodes 434 to join the blue and red MRT-based trees, the nodes 434 must, in response to receiving a join request that specifies a multicast group and a multicast source, determine which forwarding topology to use—whether that be the default SPT topology, the Blue MRT topology, or the Red MRT topology, and then send the join request(s) to a next hop for the source associated with that forwarding topology. If a join request already indicates the forwarding topology, then the nodes 434 may use that to guide the determination of the forwarding topology to use. If a join request does not indicate a topology, then in one version where the same multicast group G is used, the nodes 434 may determine to send two join requests—one on the Blue MRT topology and one on the Red MRT topology and in another version where there are two multicast groups G-blue and G-red, the nodes 434 may determine the forwarding topology to use based upon the group number and configuration.

For multicast live-live to provide the desired protection, a safe way is needed of converging from the pair of MRTs computed on the old topology to the pair of MRTs computed on the new topology. Because the two MRTs are computed simultaneously, both can change after a topology change. After a failure (FIG. 12B), both the Blue MRT and the Red MRT may be needed to reach all of the multicast receivers, so it may not be acceptable to simply update the Blue MRT, wait for stability and convergence, and then update the Red MRT. However, multicast state, whether created by PIM or mLDP, is pinned in place once it is created and needs to be expressly changed. Therefore, it is possible to simply do make-before-break based upon received traffic. In one example, this may proceed as follows: Before the change, blue and red multicast trees are (S,G-blue) and (S,G-red) are set up in the network. The topology change happens and nodes 434 dynamically recompute new red and blue MRTs and install new next hops. The techniques used for computing the MRTs may be, for example, any of the techniques discussed herein. Any of nodes 432, 434 may be a network device such as network device 100 of FIG. 5, for example.

There is another method for safely converging from the pair of MRTs computed on the old topology to the pair of MRTs computed on the new topology. This method depends on the ability of a router M to compute whether a topology change broke the Red MRT or the Blue MRT to a particular multicast source S. Assume that the topology change means that node X has failed; a link failure is handled similarly. M can determine if, on the old MRTs, the Blue or the Red avoided X; that MRT color is unbroken and the other is assumed to be broken. To converge, first all routers in the area update the broken MRT color for each multicast source (or unicast destination). Then, once all routers in the area are known to have updated the broken MRT color, whether that is determined by a timer, signaling or some other mechanism, all of the routers update the unbroken MRT color. Once all routers in the area have also updated their unbroken MRT color, the multicast trees are using the new MRTs and are prepared for another single failure.

Each node 432 whose upstream device, whether Blue or Red, has changed, sends a new PIM Join or mLDP message to the new upstream device, whether Blue or Red. Traffic continues to flow on the existing trees. When a node 432 detects incoming traffic for the multicast group (e.g. (S,G-blue)), the node 432 changes its expected incoming interface to that new upstream device. The router then sends a PIM withdraw message (or Label withdraw for mLDP) to the old upstream device. In this fashion, traffic continues to flow on the multicast trees which gradually move from using the old MRTs to using a hybrid to using the new MRTs. This works because the old multicast state does not change as a result of the unicast FIB being updated and because each router only changes its old multicast state to the new (per group) when the router has confirmed that traffic is being received on the new upstream.

If asymmetric link costs are not a concern, then the same set of next-hops (previous-hops in this case) could be used for multicast live-live as is used for MRT fast-reroute. A mechanism to indicate the forwarding topology in the P2MP FEC would be necessary; among various possibilities is that of having one or more address family values that indicate both the address family and whether a forwarding topology is included; then the forwarding topology identifier would be found in the corresponding address sub-field. If the multicast traffic is PIM, then nodes 432, 434 may mark packets so that the packets self-identify the P2MP tree to which the traffic belongs, i.e., identify which blue/red MRT P2MP tree the packets are part of. This can be done via an LDP label, an IP option, etc. There must be a way to distinguish packets on the blue-MRT from the red-MRT. This marking is needed in case the two MRTs are not fully disjoint (since the topology is not 2-link connected or 2-node-connected).

For example, for PIM, the existing PIM MT-ID Join Attribute could be used to specify which MRT to use (blue or red). For PIM, a different group could be used on the Blue MRT than on the Red MRT. Similarly, a different address plus multi-topology ID (MTID) could be used in mLDP for the Blue MRT and the Red MRT. Receiving nodes 434 would join both the blue MRT group and the red MRT group to receive traffic. Alternately, two different groups can be used for PIM—so that (S, G-1) is signaled on Blue MRT and (S, G-2) is signaled on Red MRT. For mLDP, different labels will have been distributed for the MTID-blue and for the MTID-red. This gives a way of distinguishing the traffic.

Reverse path forwarding (RPF) checks may be enabled by the control plane of network device 100 for detecting failure on the primary path to determine when to switch to the alternate multicast next hop. See A. Karan, "Multicast Only Fast Re-Route," Internet-Draft, draft-karan-mofrr-01, March 2011, the entire contents of which are incorporated by reference herein. Upon detecting a failure of a network resource on the primary multicast tree, the network device may modify a primary multicast upstream interface (e.g., an RPF interface) of the network device to be a secondary RPF interface. As one example, upon determining that a packet has not been received on a primary RPF interface of the network device within a time period, the network device may modify the primary RPF interface of the network device to be a secondary RPF interface.

The control plane, e.g., route selection module 112, can program different forwarding entries of FIB 114 on the G-blue incoming interface and on the G-red incoming interface. The outgoing interface list may stay the same. A primary RPF interface may be associated with an upstream interface for one of the MRT multicast trees (e.g., the blue MRT multicast tree), as well as a secondary RPF interface associated with a second upstream interface for the other one of the MRT multicast trees (e.g., the red MRT multicast tree). The forwarding plane checks the RPF interface of the upstream interface on which a packet is received, and accepts the packet based on the state of the upstream interface. For example, the forwarding plane accepts and forwards the packet if the RPF interface is the primary RPF interface, and discards the packet if the RPF interface is not the primary RPF interface. A receiving router may be located at the end of the PIM or mLDP multicast tree, and may use IMGP or the like to determine its outgoing interfaces. The receiving router then terminates the multicast live-live forwarding by selecting a single stream to forward and discarding packets received on the other stream.

For example, a network device may receive a data packet on one of the red or blue multicast trees, and determine by checking the RPF interface whether to discard or forward the data packet received on the red or blue multicast tree. The network device may forward the packet when a RPF interface of the network device on which the data packet is received is a primary RPF interface, and discard the packet when an RPF interface on which the data packet is received is a secondary RPF interface.

Redundant data packets are received from the primary and backup paths, i.e., on the blue multicast tree, and the red multicast trees. Redundant packets (G-red traffic) received on the secondary RPF interfaces are discarded because of an RPF failure. When the router detects a forwarding failure in the blue path, it changes RPF to the red path and immediately has packets available to forward out each outgoing interface. A receiver would detect failures and handle traffic discarding, such as using the techniques specified in A. Karan, "Multicast Only Fast Re-Route," referenced above.

Example algorithms for carrying out the techniques of this disclosure are discussed below. Some background information may be found in G. Enyedi, "Novel Algorithms for IP Fast Reroute," Department of Telecommunications and Media Informatics, Budapest University of Technology and Economics, February 2011, the entire contents of which are incorporated by reference herein.

MRT Fast-Reroute requires that packets can be forwarded not only on the shortest-path tree, but also on two Maximally Redundant Trees (MRTs), referred to as the Blue MRT and the Red MRT. A router which experiences a local failure must also have pre-determined which alternate to use. This disclosure describes examples of how to compute these three things and the algorithm design decisions and rationale.

Just as packets routed on a hop-by-hop basis require that each router compute a shortest-path tree which is consistent, each router should compute the Blue MRT and Red MRT in a consistent fashion. A router's FIB will contain primary next-hops for the current shortest-path tree for forwarding traffic. In addition, in accordance with the techniques of this disclosure, a router's FIB will contain primary next-hops for the Blue MRT for forwarding received traffic on the Blue MRT and primary next-hops for the Red MRT for forwarding received traffic on the Red MRT. What alternate next-hops a point-of-local-repair (PLR) selects need not be consistent, but loops must be prevented. To reduce congestion, it is possible for multiple alternate next-hops to be selected; in the context of MRT alternates, each of those alternate next-hops may be equal-cost paths. If instead of doing an SPF to find the MRT next-hops to a destination, a BFS (breadth first search) were done, then the MRT next-hops might not be equal-cost but would still avoid looping. This disclosure provides an example algorithm for selecting an appropriate MRT alternate for consideration.

Algorithms for computing MRTs can handle arbitrary network topologies where the whole network graph is not 2-connected, as in FIG. 3, as well as the easier case where the network graph is 2-connected, as in FIG. 1. Each MRT is a spanning tree. The pair of MRTs provide two paths from every node X to the root of the MRTs. Those paths share the minimum number of nodes and the minimum number of links. Each such shared node is a cut-vertex. Any shared links are cut-links.

Some additional terminology is defined as follows. A spanning tree is defined as a tree containing links that connects all nodes in the network graph. In the context of a spanning tree computed via a depth-first search, a "back-edge" is a link that connects a descendant of a node x with an ancestor of x. A "2-connected cluster" is a maximal set of nodes that are 2-connected. The term "2-edge-connected" refers to a network graph where at least two links must be removed to partition the network. In a network graph with at least one cut-vertex, there will be multiple 2-connected clusters. The term "block" refers to a 2-connected cluster, a cut-edge, or an isolated vertex. A Directed Acyclic Graph (DAG) is a graph where all links are directed and there are no cycles in it. An Almost Directed Acyclic Graph (ADAG) is a graph that, if all links incoming to the root were removed, would be a DAG. A Generalized ADAG (GADAG) is a graph that is the combination of the ADAGs of all blocks.

A Depth-First Search (DFS) ancestor is defined as a node n is a DFS ancestor of x if n is on the DFS-tree path from the DFS root to x. A node n is a DFS descendant of x if x is on the DFS-tree path from the DFS root to n. An "ear" is defined as a path along not-yet-included-in-the-GADAG nodes that starts at a node that is already-included-in-the-GADAG and that ends at a node that is already-included-in-the-GADAG. The starting and ending nodes may be the same node if it is a cut-vertex.

X>>Y or Y<<X: Indicates the relationship between X and Y in a partial order, such as found in a GADAG. X>>Y means that X is higher in the partial order than Y. Y<<X means that Y is lower in the partial order than X. X>Y or Y<X: Indicates the relationship between X and Y in the total order, such as found via a topological sort. X>Y means that X is higher in the total order than Y. Y<X means that Y is lower in the total order than X. A proxy-node is a node added to the network graph to represent a multi-homed prefix or routers outside the local MRT-fast-reroute-supporting island of routers. A key property of proxy-nodes is that traffic cannot transit them.

There are five key concepts that are important for understanding the algorithms for computing MRTs. The first is the idea of partially ordering the nodes in a network graph with regard to each other and to the GADAG root. The second is the idea of finding an ear of nodes and adding them in the correct direction. The third is the idea of a Low-Point value and how it can be used to identify cut-vertices and to find a second path towards the root. The fourth is the idea that a non-2-connected graph is made up of blocks, where a block is a 2-connected cluster, a cut-edge or an isolated node. The fifth is the idea of a local-root for each node; this is used to compute ADAGs in each block.

FIG. 13 is a block diagram illustrating a directed graph showing a partial order. Given any two nodes X and Y in a graph, a particular total order means that either X<Y or X>Y in that total order. An example would be a graph where the nodes are ranked based upon their IP loopback addresses. In a partial order, there may be some nodes for which it can't be determined whether X<<Y or X>>Y. A partial order can be captured in a directed graph, as shown in FIG. 13. In a graphical representation, a link directed from X to Y indicates that X is a neighbor of Y in the network graph and X<<Y.

Relationships of nodes in FIG. 13 are:
R<<A<<B<<C<<D<<E
R<<A<<B<<F<<G<<H<<D<<E

Unspecified Relationships: C and F; C and G; C and H.

FIG. 14 is a block diagram illustrating an ADAG showing a partial order with R lowest and highest. To compute MRTs, it is very useful to have the root of the MRTs be at the very bottom and the very top of the partial ordering. This means that from any node X, one can pick nodes higher in the order until the root is reached. For instance, in FIG. 14, from G the higher nodes picked can be traced by following the directed links and are H, D, E and R. Similarly, from G the lower nodes picked can be traced by reversing the directed links and are F, B, A, and R. Similarly, from any node X, one can pick nodes lower in the order until the root is reached. A graph that represents this modified partial order is no longer a DAG; it is termed an Almost DAG (ADAG) because if the links directed to the root were removed, it would be a DAG.

Relationships of nodes in FIG. 13 are:
R<<A<<B<<C<<R
R<<A<<B<<C<<D<<E<<R
R<<A<<B<<F<<G<<H<<D<<E<<R Unspecified Relationships: C and F; C and G; C and H.

Importantly, if a node Y>>X, then Y can only appear on the increasing path from X to the root and never on the decreasing path. Similarly, if a node Z<<X, then Z can only appear on the decreasing path from X to the root and never on the increasing path. Additionally, when following the increasing paths, it is possible to pick multiple higher nodes and still have the certainty that those paths will be disjoint from the decreasing paths.

For simplicity, the basic idea of creating a GADAG by adding ears is described assuming that the network graph is a single 2-connected cluster so that an ADAG is sufficient. Generalizing to multiple blocks is done by considering the block-roots instead of the GADAG root, and the algorithms given below.

In order to understand the basic idea of finding an ADAG, first suppose that we have already a partial ADAG, which does not contain all the nodes in the block yet, and we want to extend it to cover all the nodes. Suppose that we find a path from a node X to Y such that X and Y are already contained by our partial ADAG, but all the remaining nodes along the path are not added to the ADAG yet. We refer to such a path as an ear.

Recall that our ADAG is closely related to a partial order, more precisely, if we remove root R, the remaining DAG describes a partial order of the nodes. If we suppose that neither X nor Y is the root, we may be able to compare them. If one of them is definitely lesser with respect to our partial order (say X<<Y), we can add the new path to the ADAG in a direction from X to Y. As an example, consider FIG. 15A-15C.

FIG. 15A is a block diagram illustrating an example 2-connected graph. FIG. 15B is a block diagram illustrating an example partial ADAG in which node C is not yet included. However, we can find path B-C-D, where both endpoints are contained by this partial ADAG (we say those nodes are "ready" in the sequel), and the remaining node (node C) is not contained yet. FIG. 15C is a block diagram illustrating a resulting ADAG after adding path (or ear) B-C-D. If we remove root R, the remaining DAG defines a partial order, and with respect to this partial order we can say that B<<D, so we can add the path to the ADAG in the direction from B to D (arcs B→C and C→D are added). If B were strictly greater than D, we would add the same path in reverse direction.

If in the partial order where an ear's two ends are X and Y, X<<Y, then there must already be a directed path from X to Y already in the ADAG. The ear must be added in a direction such that it doesn't create a cycle; therefore the ear must go from X to Y. In the case, when X and Y are not ordered with each other, we can select either direction for the ear. We have no restriction since neither of the directions can result in a cycle. In the corner case when one of the endpoints of an ear, say X, is the root (recall that the two endpoints must be different), we could use both directions again for the ear because the root can be considered both as smaller and as greater than Y. However, we strictly pick that direction in which the root is lower than Y. The logic for this decision is explained below.

A partial ADAG is started by finding a cycle from the root R back to itself. This can be done by selecting a non-ready neighbor N of R and then finding a path from N to R that doesn't use any links between R and N. The direction of the cycle can be assigned either way since it is starting the ordering. Once a partial ADAG is already present, we can always add ears to it: just select a non-ready neighbor N of a ready node Q, such that Q is not the root, find a path from N to the root in the graph with Q removed. This path is an ear where the first node of the ear is Q, the next is N, then the path until the first ready node the path reached (that second ready node is the other endpoint of the path). Since the graph is 2-connected, there must be a path from N to R without Q.

It is always possible to select a non-ready neighbor N of a ready node Q so that Q is not the root R. Because the network is 2-connected, N must be connected to two different nodes and only one can be R. Because the initial cycle has already been added to the ADAG, there are ready nodes that are not R. Since the graph is 2-connected, while there are non-ready nodes, there must be a non-ready neighbor N of a ready node that is not R.

Example 1 below provides an example Generic Algorithm to find ears and their direction in 2-connected graph.

Example 1

Generic_Find_Ears ADAG(root)
Create an empty ADAG. Add root to the ADAG.
Mark root as IN_GADAG.
Select the shortest cycle containing root.
Add the shortest cycle to the ADAG.
Mark cycle's nodes as IN_GADAG.
Add cycle's non-root nodes to process list.
while there exists connected nodes in graph that are not IN_GADAG
   Select a new ear. Let its endpoints be X and Y.
   if (Y is root) or (Y<<X)
     add the ear towards X to the ADAG
   else // (a) X is root or (b) Y>>X or (c) X, Y not ordered
     Add the ear towards Y to the ADAG The algorithm of Example 1 merely requires that a cycle or ear be selected without specifying how. Regardless of the way of selecting the path, we will get an ADAG. The method used for finding and selecting the ears is important; shorter ears result in shorter paths along the MRTs. There are two options being considered. The Low-Point Inheritance option and the SPF-based option are described in turn below.

A basic way of computing a spanning tree on a network graph is to run a depth-first-search, such as given in Example 2 below. This tree has the important property that if there is a link (x, n), then either n is a DFS ancestor of x or n is a DFS descendant of x. In other words, either n is on the path from the root to x or x is on the path from the root to n.

Example 2 is a Basic Depth-First Search algorithm.

Example 2

```
global_variable: dfs_number
DFS_Visit(node x, node parent)
    D(x)=dfs_number
    dfs_number+=1
    x.dfs_parent=parent
    for each link (x, w)
        if D(w) is not set
            DFS_Visit(w, x)
Run_DFS(node root)
    dfs_number=0
    DFS_Visit(root, NONE)
```

Given a node x, one can compute the minimal DFS number of the neighbors of x, i.e., min(D(w) if (x,w) is a link). This gives the highest attachment point neighboring x. What is interesting, though, is what is the highest attachment point from x and x's descendants. This is what is determined by computing the Low-Point value, as given in the Algorithm of Example 3 and illustrated on a graph in FIG. 16A.

Figure 16A:
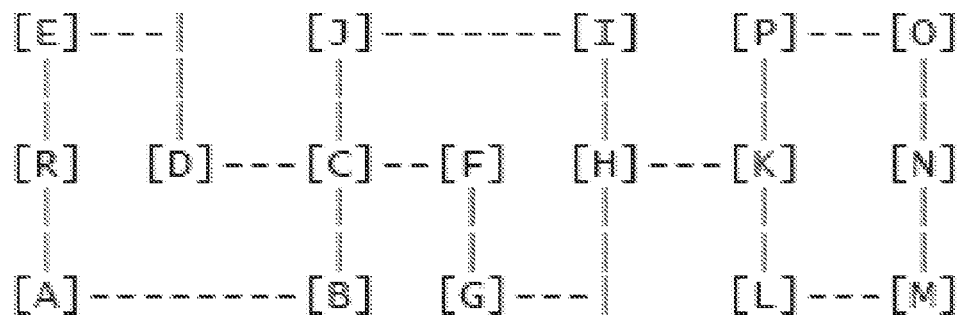
FIG. 16A is a block diagram illustrating an example non-2-connected graph.
Figure 16B:
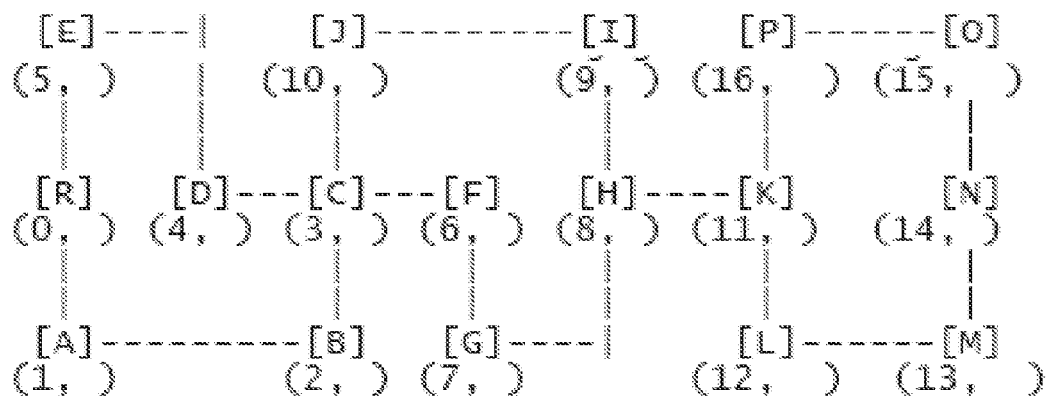
FIG. 16B is a block diagram illustrating the example non-2-connected graph of FIG. 16A with DFS values assigned.
Figure 16C:
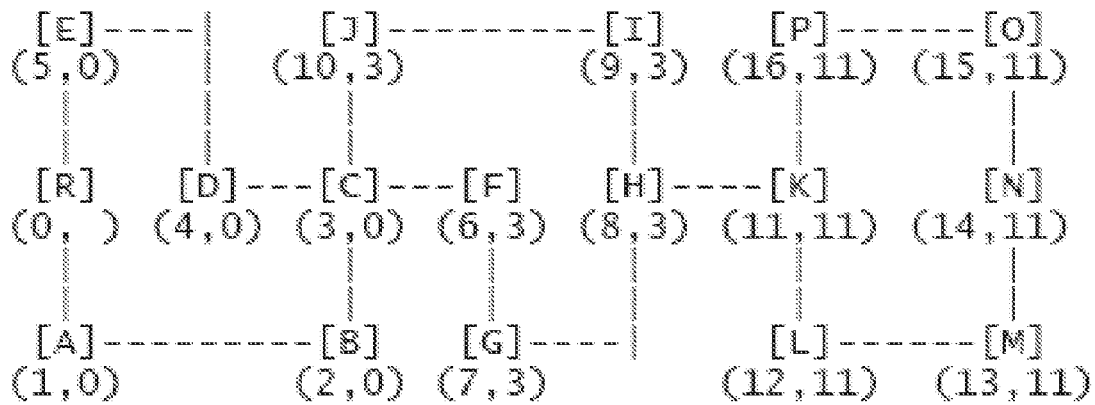
FIG. 16C is a block diagram illustrating the example non-2-connected graph of FIG. 16A with low-point values assigned.

FIG. 16A is a block diagram illustrating an example non-2-connected graph. FIG. 16B is a block diagram illustrating the example non-2-connected graph of FIG. 16A with DFS values assigned (D(x), L(x)). FIG. 16C is a block diagram illustrating the example non-2-connected graph of FIG. 16A with low-point values assigned (D(x), L(x)).

Example 3 is an example algorithm for computing Low-Point value.

Example 3

```
global_variable: dfs_number
Lowpoint_Visit(node x, node parent, interface p_to_x)
D(x)=dfs_number
L(x)=D(x)
dfs_number+=1
x.dfs_parent=parent
x.dfs_parent_intf=p_to_x
x.lowpoint_parent=NONE
for each interface intf of x:
    if D(intf.remote_node) is not set
        Lowpoint_Visit(intf.remote_node, x, intf)
        if L(intf.remote_node)<L(x)
            L(x)=L(intf.remote_node)
            x.lowpoint_parent=intf.remote_node
            x.lowpoint_parent_intf=intf
    else if intf.remote_node is not parent
        if D(intf.remote_node)<L(x)
            L(x)=D(intf.remote)
            x.lowpoint_parent=intf.remote_node
            x.lowpoint_parent_intf=intf
Run_Lowpoint(node root)
dfs_number=0
Lowpoint_Visit(root, NONE, NONE)
```

From the low-point value and lowpoint parent, there are two very useful things which motivate our computation. First, if there is a child c of x such that L(c)>=D(x), then there are no paths in the network graph that go from c or its descendants to an ancestor of x—and therefore x is a cut-vertex. This is useful because it allows identification of the cut-vertices and thus the blocks. As seen in FIGS. 16A-16C, even if L(x)<D(x), there may be a block that contains both the root and a DFS-child of a node while other DFS-children might be in different blocks. In this example, C's child D is in the same block as R while F is not. Second, by repeatedly following the path given by lowpoint_parent, there is a path from x back to an ancestor of x that does not use the link [x, x.dfs_parent] in either direction. The full path need not be taken, but this gives a way of finding an initial cycle and then ears.

A key idea for the MRT algorithm is that any non-2-connected graph is made up by blocks (e.g. 2-connected clusters, cut-links, and/or isolated nodes). To compute GADAGs and thus MRTs, computation is done in each block to compute ADAGs or Redundant Trees and then those ADAGs or Redundant Trees are combined into a GADAG or MRT.

Figure 17A:
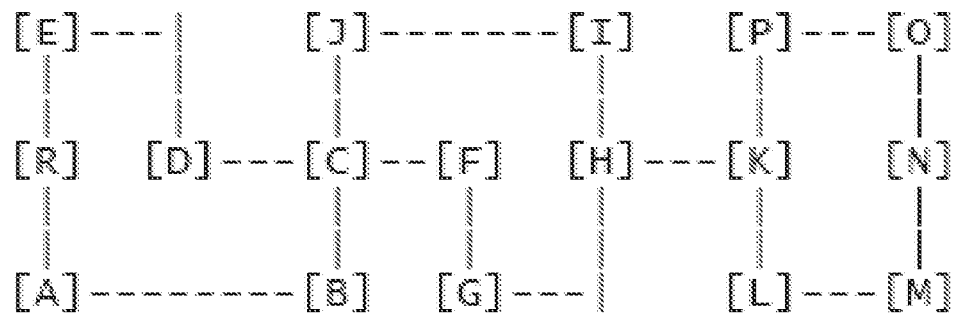
FIG. 17A is a block diagram illustrating an example graph with four blocks that are three 2-connected clusters and a cut-link.

Consider the example depicted in FIG. 17A. FIG. 17A is a block diagram illustrating an example graph with four blocks that are three 2-connected clusters and a cut-link. In this figure, a special graph is presented, showing us all the ways 2-connected clusters can be connected. It has four blocks: block 1 contains R, A, B, C, D, E, block 2 contains C, F, G, H, I, J, block 3 contains K, L, M, N, O, P, and block 4 is a cut-edge containing H and K. As can be observed, the first two blocks have one common node (node C) and blocks 2 and 3 do not have any common node, but they are connected through a cut-edge that is block 4. No two blocks can have more than one common node, since two blocks with at least 2 common nodes would qualify as a single 2-connected cluster.

Figure 17B:
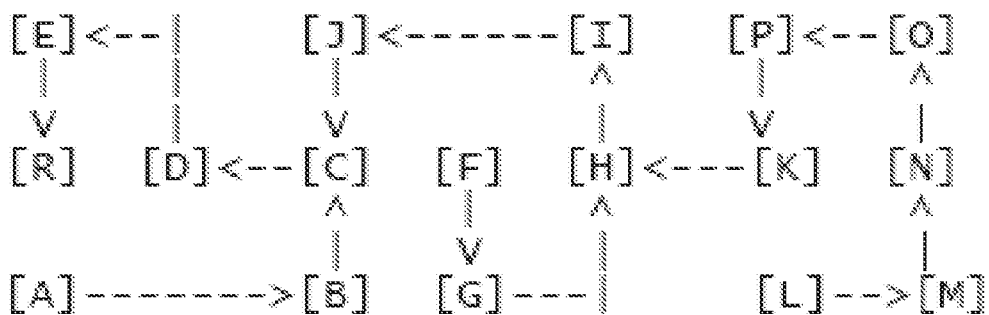
FIG. 17B is a block diagram illustrating an example Blue MRT on the graph of FIG. 17A.
Figure 17C:
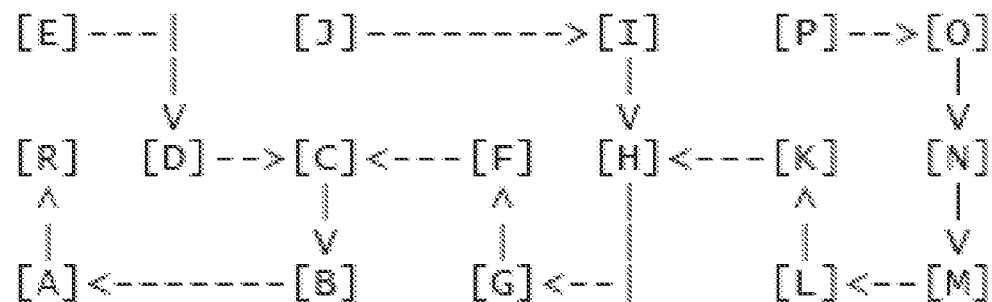
FIG. 17C is a block diagram illustrating an example Red MRT on the graph of FIG. 17A.

Moreover, observe that if we want to get from one block to another, we must use a cut-vertex (the cut-vertices in this graph are C, H, K), regardless of the path selected, so we can say that all the paths from block 3 along the MRTs rooted at R will cross K first. This observation means that if we want to find a pair of MRTs rooted at R, then we need to build up a pair of RTs in block 3 with K as a root. Similarly, we need to find another one in block 2 with C as a root, and finally, we need the last one in block 1 with R as a root. When all the trees are selected, we can simply combine them; when a block is a cut-edge (as in block 4), that cut-edge is added in the same direction to both of the trees. The resulting trees are depicted in FIGS. 17C and 17B. FIG. 17B is a block diagram illustrating an example Blue MRT on the graph of FIG. 17A, and FIG. 17C is a block diagram illustrating an example Red MRT on the graph of FIG. 17A.

Similarly, to create a GADAG it is sufficient to compute ADAGs in each block and connect them. It is necessary, therefore, to identify the cut-vertices, the blocks and identify the appropriate local-root to use for each block. Each node in a network graph has a local-root, which is the cut-vertex (or root) in the same block that is closest to the root. The local-root is used to determine whether two nodes share a common block.

Example 4 provides an example method for computing local-roots.

Example 4

```
Compute_Localroot(node x, node localroot)
    x.localroot=localroot
    for each DFS child c
        if L(c)<D(x) //x is not a cut-vertex
            Compute_Localroot(c, x.localroot)
        else
            mark x as cut-vertex
            Compute_Localroot(c, x)
Compute_Localroot(root, root)
```

There are two different ways of computing the local-root for each node. The stand-alone method is given in Example 4 and better illustrates the concept. It is used in the second option for computing a GADAG using SPFs. The other method is used in the first option for computing a GADAG using Low-Point inheritance and the essence of it is given in Example 5, an ear-based method for computing local-roots.

Example 5

Get the current node, s.
Compute an ear from s to a child c
   and then via lowpoint inheritance, e.g.
     (n=c
       while n is not ready:
          n=n.lowpoint_parent
     e=n
   )
   to a ready node e.
if s is e
   s is a cut-vertex
   x.localroot=s
else
   for each node x in the ear that is not s or e
     x.localroot=s.localroot Once the local-roots are known, two nodes X and Y are in a common block if and only if one of the following three conditions apply. (1) Y's local-root is X's local-root: They are in the same block and neither is the cut-vertex closest to the root. (2) Y's local-root is X: X is the cut-vertex closest to the root for Y's block. (3) Y is X's local-root: Y is the cut-vertex closest to the root for X's block This algorithm computes one GADAG that is then used by a router to determine its blue MRT and red MRT next-hops to all destinations. Finally, based upon that information, alternates are selected for each next-hop to each destination. The different parts of this algorithm are described below. These work on a network graph after, for instance, its interfaces are ordered as per Example 6 below. The different parts of this algorithm are as follows:

1. Select the root to use for the GADAG.
2. Initialize all interfaces to UNDIRECTED.
3. Compute the DFS value, e.g. D(x), and lowpoint value, L(x). (see example 3 above)
4. Construct the GADAG. [See Option 1 below using Lowpoint Inheritance and Option 2 below using SPFs.]
5. Assign directions to all interfaces that are still UNDIRECTED.
6. From the computing router x, compute the next-hops for the blue MRT and red MRT.
7. Identify alternates for each next-hop to each destination by determining which one of the blue MRT and the red MRT the computing router x should select.

To ensure consistency in computation, all routers should order interfaces identically. This is needed for the DFS, where the selection order of the interfaces to explore results in different trees, and for computing the GADAG, where the selection order of the interfaces to use to form ears can result in different GADAGs. The recommended ordering between two interfaces from the same router x is given in Example 6, which shows example rules for ranking multiple interfaces. The order is from low to high.

Example 6

Interface_Compare(interface a, interface b)
if a.metric<b.metric
   return A_LESS_THAN_B
if b.metric<a.metric
   return B_LESS_THAN_A
if a.neighbor.loopback_addr<b.neighbor.loopback_addr
   return A_LESS_THAN_B
if b.neighbor.loopback_addr<a.neighbor.loopback_addr
   return B_LESS_THAN_A
// Same metric to same node, so the order doesn't matter anymore.
// To have a unique, consistent total order,
// tie-break based on ifindex.
if a.ifindex<b.ifindex
   return A_LESS_THAN_B
return B_LESS_THAN_A The precise mechanism by which routers advertise a priority for the GADAG root is not described in this document. Nor is the algorithm for selecting routers based upon priority described in this document.

A network may be partitioned or there may be islands of routers that support MRT fast-reroute. Therefore, the root selected for use in a GADAG must be consistent only across each connected island of MRT fast-reroute support. Before beginning computation, the network graph is reduced to contain only the set of routers that support a compatible MRT fast-reroute. The selection of a GADAG root is done among only those routers in the same MRT fast-reroute island as the computing router x. Additionally, only routers that are not marked as unusable or overloaded (e.g., ISIS overload or OSPF stub router advertisement) are eligible for selection as root.

Before running the algorithm, there is the standard type of initialization to be done, such as clearing any computed DFS-values, lowpoint-values, DFS-parents, lowpoint-parents, any MRT-computed next-hops, and flags associated with algorithm. It is assumed that a regular SPF computation has been run so that the primary next-hops from the computing router to each destination are known. This is required for determining alternates at the last step. Initially, all interfaces must be initialized to UNDIRECTED. Whether they are OUTGOING, INCOMING or both is determined when the GADAG is constructed and augmented. It is possible that some links and nodes will be marked as unusable, whether because of configuration, overload, or due to a transient cause such as OSPF stub router advertisement. In the algorithm description, it is assumed that such links and nodes will not be explored or used and no more discussion is given of this restriction.

The basic idea of Option 1: Computing GADAG using lowpoint inheritance is to find ears from a node x that is already in the GADAG (known as IN_GADAG). There are two methods to find ears; both are required. The first is by going to a not IN_GADAG DFS-child and then following the chain of low-point parents until an IN_GADAG node is found. The second is by going to a not IN_GADAG neighbor and then following the chain of DFS parents until an IN_GADAG node is found. As an ear is found, the associated interfaces are marked based on the direction taken. The nodes in the ear are marked as IN_GADAG. In the algorithm, first the ears via DFS-children are found and then the ears via DFS-neighbors are found.

By adding both types of ears when an IN_GADAG node is processed, all ears that connect to that node are found. The order in which the IN_GADAG nodes is processed is, of course, key to the algorithm. The order is a stack of ears so the most recent ear is found at the top of the stack. Of course, the stack stores nodes and not ears, so an ordered list of nodes, from the first node in the ear to the last node in the ear, is created as the ear is explored and then that list is pushed onto the stack.

Each ear represents a partial order (see FIG. 14) and processing the nodes in order along each ear ensures that all ears connecting to a node are found before a node higher in the partial order has its ears explored. This means that the direction of the links in the ear is always from the node x being processed towards the other end of the ear. Additionally, by using a stack of ears, this means that any unprocessed nodes in previous ears can only be ordered higher than nodes in the ears below it on the stack.

In this algorithm that depends upon Low-Point inheritance, it is necessary that every node have a low-point parent that is not itself. If a node is a cut-vertex, that will not yet be the case. Therefore, any nodes without a low-point parent will have their low-point parent set to their DFS parent and their low-point value set to the DFS-value of their parent. This assignment also properly allows an ear to a cut-vertex to start and end at the same node.

Finally, the algorithm simultaneously computes each node's local-root, as described in Example 5 above. The local-root can be inherited from the node x being processed to the nodes in the ear unless the child of x is a cut-vertex in which case the rest of the nodes in the ear are in a different block than x and have the child of x as their local-root.

Example 7 is a Low-point Inheritance GADAG algorithm.

Example 7

```
Construct_GADAG_via_Lowpoint(topology, root)
rootIN_GADAG=true
Initialize Stack to empty
push root onto Stack
while (Stack is not empty)
   x=pop(Stack)
   foreach interface intf of x
      if ((intf.remote_nodeIN_GADAG==false) and
         (intf.remote_node.dfs_parent is x))
         Construct_Ear(x, Stack, intf, CHILD)
   foreach interface intf of x
      if ((intf.remote_nodeIN_GADAG==false) and
         (intf.remote_node.dfs_parent is not x))
         Construct_Ear(x, Stack, intf, NEIGHBOR)
Construct_Ear(x, Stack, intf, type)
ear_list=empty
cur_node=intf.remote_node
cur_intf=intf
while cur_nodeIN_GADAG is false
   cur_intf.UNDIRECTED=false
   cur_intf.OUTGOING=true
   cur_intf.remote_intf.UNDIRECTED=false
   cur_intf.remote_intf.INCOMING=true
   cur_nodeIN_GADAG=true
   add_to_list_end(ear_list, cur_node)
   if type is CHILD
      cur_intf=cur_node.lowpoint_parent_intf
   else type must be NEIGHBOR
      cur_intf=cur_node.dfs_parent_intf
   cur_node=cur_intf.remote_node
if (type is CHILD) and (cur_node is x)
   localroot=x
else
   localroot=x.localroot
while ear_list is not empty
   y=remove_end_item_from_list(ear_list)
   push(Stack, y)
Construct_GADAG_via_Lowpoint(topology, root)
```

A second option (Option 2) is Computing GADAG using SPFs. The basic idea in this option is to use slightly-modified SPF computations to find ADAGs in each block. In each block, an SPF computation is first done to find a cycle from the local root and then SPF computations find ears until there are no more interfaces to be explored. The used result from the SPF computation is the path of interfaces indicated by following the previous hops from the minimized IN_GADAG node back to the SPF root. To do this, first all cut-vertices must be identified and local-roots assigned as specified in Example 4 above.

The slight modifications to the SPF are as follows. The root of the block is referred to as the block-root; it is either the GADAG root or a cut-vertex. (a) The SPF is rooted at a neighbor x of an IN_GADAG node y. All links between y and x are marked as TEMP_UNUSABLE. They should not be used during the SPF computation. (b) If y is not the block-root, then it is marked TEMP_UNUSABLE. It should not be used during the SPF computation. This prevents ears from starting and ending at the same node and avoids cycles; the exception is because cycles to/from the block-root are acceptable and expected. (c) Do not explore links to nodes whose local-root is not the block-root. This keeps the SPF confined to the particular block. (d) Terminate when the first IN_GADAG node z is minimized. (e) Respect the existing directions (e.g. INCOMING, OUTGOING, UNDIRECTED) already specified for each interface.

Example 8 is a Modified SPF for GADAG computation.

Example 8

```
Mod_SPF(spf_root, block_root)
Initialize spf_heap to empty
Initialize nodes' spf_metric to infinity
spf_root.spf_metric=0
insert(spf_heap, spf_root)
found_in_gadag=false
while (spf_heap is not empty) and (found_in_gadag is
      false)
   min_node=remove_lowest(spf_heap)
   if min_nodeIN_GADAG is true
      found_in_gadag=true
   else
      foreach interface intf of min_node
         if ((intf.OUTGOING or intf.UNDIRECTED) and
            (intf.remote_node.localroot is block_root) and
            (intf.remote_node is not TEMP_UNUSABLE))
            path_metric=min_node.spf_metric+intf.metric
            if path_metric<intf.remote_node.spf_metric
               intf.remote_node.spf_metric=path_metric
               intf.remote_node.spf_prev_intf=intf
               insert_or_update(spf_heap, intf.remote_node)
return min_node
SPF_for_Ear(spf_root, block_root, ear_list, cut_vertex_
list)
   end_ear=Mod_SPF(spf_root, block_root)
   y=end_ear.spf_prev_hop
   while y.local_node is not spf_root
      add_to_list_start(cut_vertex_list, y)
      if y.local_node is a cut-vertex
         add_to_list_end(cut_vertex_list, y.local_node)
      y=y.local_node.spf_prev_intf
```

In Example 8, while the path is determined, any non-end node in the path that is a cut-vertex is added to the list of cut-vertices. This ensures that there is a path from the GADAG root to that cut-vertex before adding it to the list of nodes. All such cut-vertices will be treated as the root of a block and the ADAG in that block will be computed.

Assume that an ear is found by going from y to x and then running an SPF that terminates by minimizing z (e.g. y<->x ... q<->z). Now it is necessary to determine the direction of the ear; if y<<z, then the path should be y→x ... q→z but if y>>z, then the path should be y←x ... q→z. In Option 1, the same problem was handled by finding all ears that started at a node before looking at ears starting at nodes higher in the partial order. In this algorithm, using that approach could mean that new ears aren't added in order of their total cost since all ears connected to a node would need to be found before additional nodes could be found.

The alternative is to track the order relationship of each node with respect to every other node. This can be accomplished by maintaining two sets of nodes at each node. The first set, Higher_Nodes, contains all nodes that are known to be ordered above the node. The second set, Lower_Nodes, contains all nodes that are known to be ordered below the node. This is the approach used in the following example algorithm to assign links of an ear direction. Example 9 is an example algorithm to assign links of an ear direction.

Example 9

```
Set_Ear_Direction(ear_list, end_a, end_b, block_root)
// Default of A_TO_B for the following cases:
// (a) end_a and end_b are the same (root)
// or (b) end_a is in end_b's Lower Nodes
// or (c) end_a and end_b were unordered with respect to
    each
// other
direction=A_TO_B
if (end_b is block_root) and (end_a is not end_b)
    direction=B_TO_A
else if end_a is in end_b.Higher_Nodes
    direction=B_TO_A
if direction is B_TO_A
    foreach interface i in ear_list
        i.UNDIRECTED=false
        i.ONCOMING=true
        i.remote_intf.UNDIRECTED=false
        i.remote_intf.OUTGOING=true
else
    foreach interface i in ear_list
        i.UNDIRECTED=false
        i.OUTGOING=true
        i.remote_intf.UNDIRECTED=false
        i.remote_intf.INCOMING=true
if end_a is end_b
    return
// Next, update all nodes' Lower_Nodes and Higher_Nodes
if (end_a is in end_b.Higher_Nodes)
    foreach node x where x.localroot is block_root
        if end_a is in x.Lower_Nodes
            foreach interface i in ear_list
                add i.remote_node to x.Lower_Nodes
        if end_b is in x.Higher_Nodes
            foreach interface i in ear_list
                add i.local_node to x.Higher_Nodes
else
    foreach node x where x.localroot is block_root
        if end_b is in x.Lower_Nodes
            foreach interface i in ear_list
                add i.local_node to x.Lower_Nodes
        if end_a is in x.Higher_Nodes
            foreach interface i in ear_list
                add i.remote_node to x.Higher_Nodes
```

A goal of the algorithm of example 9 is to find the shortest cycles and ears. An ear is started by going to a neighbor x of an IN_GADAG node y. The path from x to an IN_GADAG node is minimal, since it is computed via SPF. Since a shortest path is made of shortest paths, to find the shortest ears requires reaching from the set of IN_GADAG nodes to the closest node that is not IN_GADAG. Therefore, an ordered tree is maintained of interfaces that could be explored from the IN_GADAG nodes. The interfaces are ordered by their characteristics of metric, local loopback address, remote loopback address, and ifindex, as in the algorithm previously described in Example 6.

Finally, cut-edges are a special case because there is no point in doing an SPF on a block of 2 nodes. The algorithm identifies cut-edges simply as links where both ends of the link are cut-vertices. Cut-edges can simply be added to the GADAG with both OUTGOING and INCOMING specified on their interfaces.

Example 10 sets forth an example SPF-based GADAG algorithm.

Example 10

```
Construct_GADAG_via_SPF(topology, root)
Compute_Localroot(root, root)
if root has multiple DFS-children
    mark root as a cut-vertex
Initialize cut_vertex_list to empty
Initialize ordered_intfs_tree to empty
add_to_list_end(cut_vertex_list, root)
while cut_vertex_list is not empty
    v=remove_start_item_from_list(cut_vertex_list)
    foreach interface intf of v
        if intf.remote_node is a cut-vertex
            // Special case for cut-edges
            intf.UNDIRECTED=false
            intf.remote_intf.UNDIRECTED=false
            intf.OUTGOING=true
            intf.INCOMING=true
            intf.remote_intf.OUTGOING=true
            intf.remote_intf.INCOMING=true
        else if intf.remote_node.localroot is v
            insert(ordered_intfs_tree, intf)
    vIN_GADAG=true
    while ordered_intfs_trees is not empty
        cand_intf=remove_lowest(ordered_intfs_tree)
        if cand_intf.remote_nodeIN_GADAG is false
            Mark all interfaces between cand_intf.remote_node
                and cand_intf.local_node as TEMP_UNUSABLE
            if cand_intf.local_node is not v
                Mark cand_intf.local_node as TEMP_UNUSABLE
            Initialize ear_list to empty
            ear_end=SPF_for_Ear(cand_intf.remote_node, v,
                ear_list,
                cut_vertex_list)
            add_to_list_start(ear_list, cand_intf)
            Set_Ear_Direction(ear_list, cand_intf.remote,
                ear_end, v)
            Clear TEMP_UNUSABLE from all interfaces between
                cand_intf.remote_node and cand_intf.local_node
            Clear TEMP_UNUSABLE from cand_intf.local_node
```

The GADAG may be augmented by directing all links The GADAG, whether constructed via Low-Point Inheritance or with SPFs, at this point could be used to find MRTs but the topology does not include all links in the network graph. That has two impacts. First, there might be shorter paths that respect the GADAG partial ordering and so the alternate paths would not be as short as possible. Second, there may be additional paths between a router x and the root that are not included in the GADAG. Including those provides potentially more bandwidth to traffic flowing on the alternates and may reduce congestion compared to just using the GADAG as currently constructed.

The goal is thus to assign direction to every remaining link marked as UNDIRECTED to improve the paths and number of paths found when the MRTs are computed. To do this, we need to establish a total order that respects the partial order described by the GADAG. This can be done using Kahn's topological sort, which essentially assigns a number to a node x only after all nodes before it (e.g. with a link incoming to x) have had their numbers assigned. See Kahn, A., "Topological sorting of large networks", Communications of the ACM, Volume 5, Issue 11, November 1962, the entire contents of which are incorporated herein by reference. The only issue with the topological sort is that it works on DAGs and not ADAGs or GADAGs.

To convert a GADAG to a DAG, all links are removed that point to a root of block from within that block. That provides the conversion to a DAG and then a topological sort can be done. Finally, all UNDIRECTED links are assigned a direction based upon the partial ordering. Any UNDIRECTED links that connect to a root of a block from within that block are assigned a direction INCOMING to that root. Example details of a process for Assigning direction to UNDIRECTED links are set forth below. Example 11 is an example algorithm for Assigning direction to UNDIRECTED links.

Example 11

```
Set_Block_Root_Incoming_Links(topo, root, mark_or_clear)
    foreach node x in topo
        if node x is a cut-vertex or root
            foreach interface i of x
                if (i.remote_node.localroot is x)
                    if i.UNDIRECTED
                        i.OUTGOING=true
                        i.remote_intf.INCOMING=true
                        i.UNDIRECTED=false
                        i.remote_intf.UNDIRECTED=false
                    if ONCOMING
                        if mark_or_clear is mark
                            if i.OUTGOING // a cut-edge
                                i.STORE_INCOMING=true
                                i.INCOMING=false
                                i.remote_intf.STORE_OUTGOING=true
                                i.remote_intf.OUTGOING=false
                                i.TEMP_UNUSABLE=true
                                i.remote_intf.TEMP_UNUSABLE=true
                            else
                                i.TEMP_UNUSABLE=false
                                i.remote_intf.TEMP_UNUSABLE=false
                        if i.STORE_INCOMING and (mark_or_clear is clear)
                            i.INCOMING=true
                            i.STORE_INCOMING=false
                            i.remote_intf.OUTGOING=true
                            i.remote_intf.STORE_OUTGOING=false Run_Topological_Sort_GADAG(topo, root)
    Set_Block_Root_Incoming_Links(topo, root, MARK)
    foreach node x
        set x.unvisited to the count of x's incoming interfaces
            that aren't marked TEMP_UNUSABLE
    Initialize working_list to empty
    Initialize topo_order_list to empty
    add_to_list_end(working_list, root)
    while working_list is not empty
        y=remove_start_item_from_list(working_list)
        add_to_list_end(topo_order_list, y)
        foreach interface i of y
            if (i.OUTGOING) and (not i.TEMP_UNUSABLE)
                i.remote_node.unvisited-=1
                if i.remote_node.unvisited is 0
                    add_to_list_end(working_list, i.remote_node)
    next_topo_order=1
    while topo_order_list is not empty
        y=remove_start_item_from_list(topo_order_list)
        y.topo_order=next_topo_order
        next_topo_order+=1
    Set_Block_Root_Incoming_Links(topo, root, CLEAR)

Add_Undirected_Links(topo, root)
    Run_Topological_Sort_GADAG(topo, root)
    foreach node x in topo
        foreach interface i of x
            if i.UNDIRECTED
                if x.topo_order<i.remote_node.topo_order
                    i.OUTGOING=true
                    i.UNDIRECTED=false
                    i.remote_intf.INCOMING=true
                    i.remote_intf.UNDIRECTED=false
                else
                    i.INCOMING=true
                    i.UNDIRECTED=false
                    i.remote_intf.OUTGOING=true
                    i.remote_intf.UNDIRECTED=false
    Add_Undirected_Links(topo, root)
```

Proxy-nodes are used to represent multi-homed prefixes and routers that do not support MRT Fast-Reroute. Until now, the network graph has not included proxy-nodes because the computation for a GADAG assumes that the nodes can be transited.

To handle destinations that can only be reached via proxy-nodes, each proxy-node should be added into the network graph after Add_Directed_Links( ) has been run once. A proxy-node P is connected to two routers, X and Y, which have been found to offer the best cost. If X.topo_order<Y.topo_order, then the proxy-node P is added along with a link X→P and a link P→Y. Once all the proxy-nodes have been added in this fashion, Run_Topological_Sort_GADAG( ) should be rerun so that the topological order includes the proxy-nodes as well. This is needed for determining which MRT can offer alternates, as is explained below.

Compute MRT next-hops is now addressed. As was discussed above, once a ADAG is found, it is straightforward to find the next-hops from any node X to the ADAG root. However, in this algorithm, we want to reuse the common GADAG and find not only one pair of redundant trees with it, but a pair rooted at each node. This is ideal, since it is faster and it results packet forwarding easier to trace and/or debug. The method for doing that is based on two basic ideas. First, if two nodes X and Y are ordered with respect to each other in the partial order, then the same SPF and reverse-SPF can be used to find the increasing and decreasing paths. Second, if two nodes X and Y aren't ordered with respect to each other in the partial order, then intermediary nodes can be used to create the paths by increasing/decreasing to the intermediary and then decreasing/increasing to reach Y.

As usual, the two basic ideas will be discussed assuming the network is two-connected. The generalization to multiple blocks, and the full algorithm, are given below.

Figure 18:
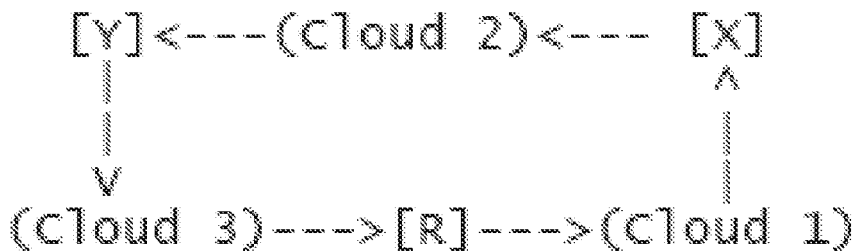
FIG. 18 is a block diagram illustrating an example network graph in which Y>>X.

MRT next-hops to all nodes partially ordered with respect to the computing node are now discussed. To find two node-disjoint paths from the computing router X to any node Y, depends upon whether Y>>X or Y<<X. FIG. 18 is a block diagram illustrating an example network graph in which Y>>X. The Blue MRT path is: X→Cloud 2→Y, and the Red MRT path is X→Cloud 1→R→Cloud 3→Y. As shown in FIG. 18, if Y>>X, then there is an increasing path that goes from X to Y without crossing R; this contains nodes in the interval [X,Y]. There is also a decreasing path that decreases towards R and then decreases from R to Y; this contains nodes in the interval [X,R-small] or [R-great,Y]. The two paths cannot have common nodes other than X and Y.

Figure 19:
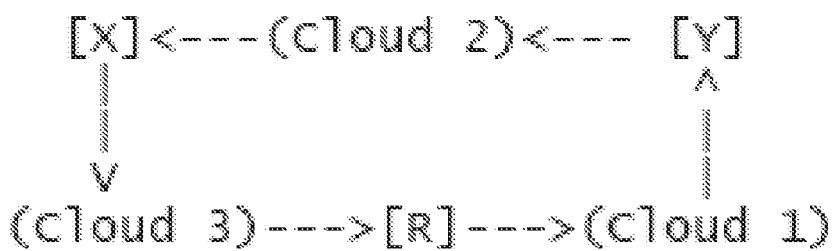
FIG. 19 is a block diagram illustrating an example network graph in which Y<<X.

Similar logic applies if Y<<X, as shown in FIG. 19. FIG. 19 is a block diagram illustrating an example network graph in which Y<<X. The Blue MRT path is: X→Cloud R→Cloud 1→Y, and the Red MRT path is X→Cloud 2→Y. In this case, the increasing path from X increases to R and then increases from R to Y to use nodes in the intervals [X,R-great] and [R-small, Y]. The decreasing path from X reaches Y without crossing R and uses nodes in the interval [Y,X].

Figure 20:
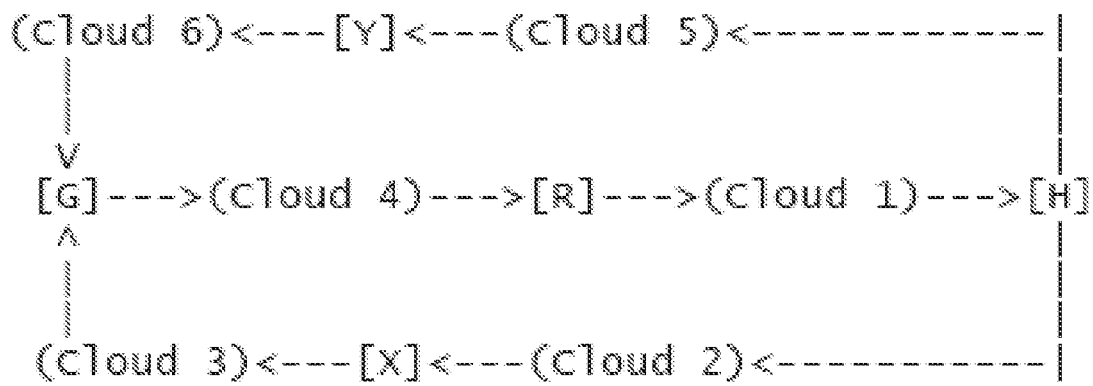
FIG. 20 is a block diagram illustrating an example network graph in which X and Y are unordered.

MRT next-hops to all nodes not partially ordered with respect to the computing node are now discussed. When X and Y are not ordered, the first path should increase until we get to a node G, where G>>Y. At G, we need to decrease to Y. The other path should be just the opposite: we must decrease until we get to a node H, where H<<Y, and then increase. Since R is smaller and greater than Y, such G and H must exist. It is also easy to see that these two paths must be node disjoint: the first path contains nodes in interval [X,G] and [Y,G], while the second path contains nodes in interval [H,X] and [H,Y]. This is illustrated in FIG. 20. FIG. 20 is a block diagram illustrating an example network graph in which X and Y are unordered. It is necessary to decrease and then increase for the Blue MRT and increase and then decrease for the Red MRT; if one simply increased for one and decreased for the other, then both paths would go through the root R. Blue MRT path: decrease to H and increase to Y along the path X→Cloud 2→H→Cloud 5→Y. Red MRT path: increase to G and decrease to Y along the path X→Cloud 3→G→Cloud 6→Y This gives disjoint paths as long as G and H are not the same node. Since G>>Y and H<<Y, if G and H could be the same node, that would have to be the root R. This is not possible because there is only one out-going interface from the root R which is created when the initial cycle is found. Recall from Example 1 that whenever an ear was found to have an end that was the root R, the ear was directed towards R so that the associated interface on R is incoming and not outgoing. Therefore, there must be exactly one node M which is the smallest one after R, so the Blue MRT path will never reach R; it will turn at M and increase to Y.

Computing Redundant Tree next-hops in a 2-connected Graph is now discussed. The basic ideas for computing RT next-hops in a 2-connected graph were given in sections above. If some node X only wants to find the next-hops (which is usually the case for IP networks), it is enough to find which nodes are greater and less than X, and which are not ordered; this can be done by running an SPF and a reverse-SPF rooted at X and not exploring any links from the ADAG root. (Other traversal algorithms could safely be used instead where one traversal takes the links in their given directions and the other reverses the links' directions.)

An SPF rooted at X and not exploring links from the root will find the increasing next-hops to all Y>>X. Those increasing next-hops are X's next-hops on the Blue MRT to reach Y. A reverse-SPF rooted at X and not exploring links from the root will find the decreasing next-hops to all Z<<X. Those decreasing next-hops are X's next-hops on the Red MRT to reach Z. Since the root R is both greater than and less than X, after this SPF and reverse-SPF, X's next-hops on the Blue MRT and on the Red MRT to reach R are known. For every node Y>>X, X's next-hops on the Red MRT to reach Y are set to those on the Red MRT to reach R. For every node Z<<X, X's next-hops on the Blue MRT to reach Z are set to those on the Blue MRT to reach R.

For those nodes, which were not reached, we have the next-hops as well. The increasing Blue MRT next-hop for a node, which is not ordered, is the next-hop along the decreasing Red MRT towards R and the decreasing Red MRT next-hop is the next-hop along the increasing Blue MRT towards R. Naturally, since R is ordered with respect to all the nodes, there will always be an increasing and a decreasing path towards it. This algorithm does not provide the specific path taken but only the appropriate next-hops to use. The identity of G and H is not determined.

The final case to considered is when the root R computes its own next-hops. Since the root R is <<all other nodes, running an SPF rooted at R will reach all other nodes; the Blue MRT next-hops are those found with this SPF. Similarly, since the root R is >>all other nodes, running a reverse-SPF rooted at R will reach all other nodes; the Red MRT next-hops are those found with this reverse-SPF.

As an example consider the situation depicted in FIGS. 15A and 15C. There node C runs an SPF and a reverse-SPF. The SPF reaches D, E and R and the reverse SPF reaches B, A and R. So we immediately get that e.g., towards E the increasing next-hop is D (it was reached though D), and the decreasing next-hop is B (since R was reached though B). Since both D and B, A and R will compute the next hops similarly, the packets will reach E.

We have the next-hops towards F as well: since F is not ordered with respect to C, the increasing next-hop is the decreasing one towards R (which is B) and the decreasing next-hop is the increasing one towards R (which is D). Since B is ordered with F, it will find a real increasing next-hop, so packet forwarded to B will get to F on path C-B-F. Similarly, D will have a real decreasing next-hop, and packet will use path C-D-F.

If a graph isn't 2-connected, then the basic approach given in above may need some extensions to determine the appropriate MRT next-hops to use for destinations outside the computing router X's blocks. In order to find a pair of maximally redundant trees in that graph we need to find a pair of RTs in each of the blocks (the root of these trees will be discussed later), and combine them.

When computing the MRT next-hops from a router X, there are three basic differences: 1. Only nodes in a common block with X should be explored in the SPF and reverse-SPF. 2. Instead of using the GADAG root, X's local-root should be used. This has the following implications: (A) The links from X's local-root should not be explored. (B) If a node is explored in the increasing SPF so Y>>X, then X's Red MRT next-hops to reach Y uses X's Red MRT next-hops to reach X's local-root and if Z<<, then X's Blue MRT next-hops to reach Z uses X's Blue MRT next-hops to reach X's local-root. (C) If a node W in a common block with X was not reached in the SPF or reverse-SPF, then W is unordered with respect to X. X's Blue MRT next-hops to W are X's decreasing aka Red MRT next-hops to X's local-root. X's Red MRT next-hops to W are X's increasing aka Blue MRT next-hops to X's localroot. 3. For nodes in different blocks, the next-hops must be inherited via the relevant cut-vertex. These are all captured in the detailed algorithm given below.

The complete algorithm to compute MRT Next-Hops for a particular router X is given in Example 12. In addition to computing the Blue MRT next-hops and Red MRT next-hops used by X to reach each node Y, the algorithm also stores an "order_proxy", which is the proper cut-vertex to reach Y if it is outside the block, and which is used later in deciding whether the Blue MRT or the Red MRT can provide an acceptable alternate for a particular primary next-hop.

Example 12

```
global_var: max_block_id
Assign_Block_ID(x, cur_block_id)
x.block_id=cur_block_id
foreach DFS child c of x
    if (c.local_root is x)
        max_block_id+=1
        Assign_Block_ID(c, max_block_id)
    else
        Assign_Block_ID(c, cur_block_id)
In_Common_Block(x, y)
if ((x.localroot is y.localroot) or (x is y.localroot) or
    (y is x.localroot))
    return true
return false
Store_Results(y, direction, spf_root)
if direction is FORWARD
    y.higher=true
    y.blue_next_hops=y.next_hops
if direction is REVERSE
    y.lower=true
    y.red_next_hops=y.next_hops
SPF_No_Traverse_Root(spf_root, block_root, direction)
Initialize spf_heap to empty
Initialize nodes' spf_metric to infinity and next hops to
    empty
spf_root.spf_metric=0
insert(spf_heap, spf_root)
while (spf_heap is not empty)
    min_node=remove_lowest(spf_heap)
    Store_Results(min_node, direction, spf_root)
    if ((min_node is spf_root) or
        ((min_node is not block_root) and
        (min_node is not a proxy_node)))
        foreach interface intf of min_node
            if (((direction is FORWARD) and intf.OUTGOING)
                or
                ((direction is REVERSE) and intf.INCOMING)
                and
                In_Common_Block(spf_root, intf.remote_node))
                if direction is FORWARD
                    path_metric=min_node.spf_metric+intf.metric
                else
                    path_metric=min_node.spf_metric+intf.re-
                        mote_intf.metric
                if path_metric<intf.remote_node.spf_metric
                    intf.remote_node.spf_metric=path_metric
                    if min_node is spf_root
                        intf.remote_node.next_hops=make_list(intf)
                    else
                        intf.remote_node.next_hops=min_node.next_
                            hops
                    insert_or_update(spf_heap, intf.remote_node)
                else if path_metric is intf.remote_node.spf_metric
                    if min_node is spf_root
                        add_to_list(intf.remote_node.next_hops, intf)
                    else
                        add_list_to_list(intf.remote_node.next_hops,
                            min_node.next_hops)
SetEdge(y)
if y.blue_next_hops is empty and y.red_next_hops is empty
    SetEdge(y.localroot)
    y.blue_next_hops=y.localroot.blue_next_hops
    y.red_next_hops=y.localroot.red_next_hops
    y.order_proxy=y.localroot.order_proxy
Compute_MRT_NextHops(x, root)
foreach node y
    y.higher=y.lower=false
    clear y.red_next_hops and y.blue_next_hops
    y.order_proxy=y
SPF_No_Traverse_Root(x, x.localroot, FORWARD)
SPF_No_Traverse_Root(x, x.localroot, REVERSE)
// red and blue next-hops are stored to x.localroot as differ-
    ent
// paths are found via the SPF and reverse-SPF.
// Similarly any nodes whose local-root is x will have their
// red_next_hops and blue_next_hops already set.
// Handle nodes in the same block that aren't the local-root
foreach node y
    if ((y is not x) and (y.localroot is x.localroot) and
        ((y is x.localroot) or (y.block_id is x.block_id))
        if y.higher
            y.red_next_hops=x.localroot.red_next_hops
        else if y.lower
            y.blue_next_hops=x.localroot.blue_next hops
        else
            y.blue_next_hops=x.localroot.red_next_hops
            y.red_next_hops=x.localroot.blue_next_hops
// Inherit next-hops and order_proxies to other components
if x is not root
    root.blue_next_hops=x.localroot.blue_next_hops
    root.red_next_hops=x.localroot.red_next_hops
    root.order_proxy=x.localroot
foreach node y
    if (y is not root) and (y is not x)
        SetEdge(y)
max_block_id=0
Assign_Block_ID(root, max_block_id)
Compute_MRT_NextHops(x, root)
```

A computing router will also identify MRT alternates. At this point, a computing router S knows its Blue MRT next-hops and Red MRT next-hops for each destination. The primary next-hops along the SPT are also known. It remains to determine for each primary next-hop to a destination D, which of the MRTs avoids the primary next-hop node F. This computation depends upon data set in Compute_MRT_NextHops such as each node y's y.blue_next_hops, y.red_next_hops, y.order_proxy, y.higher, y.lower and topo_orders. Recall that any router knows only which are nodes greater and lesser than itself, but it cannot decide the relation between any two given nodes easily; that is why we need topological ordering.

For each primary next-hop node F to each destination D, S can call Select_Alternates(S, D, F) to determine whether to use the Blue MRT next-hops as the alternate next-hop(s) for that primary next-hop or to use the Red MRT next-hops. An example algorithm for this determination is given below in Example 13 and discussed afterwards.

Example 13

```
Select_Alternates(S, D, F, primary_intf)
if D.order_proxy is not D
    D_lower=D.order_proxy.lower
    D_higher=D.order_proxy.higher
    D_topo_order=D.order_proxy.topo_order
else
    D_lower=D.lower
    D_higher=D.higher
    D_topo_order=D.topo_order
if ((D is F) or (D.order_proxy is F))
    if an MRT doesn't use primary_intf
        indicate alternate is not node-protecting
        return that MRT color
    else // parallel links are cut-edge
        return AVOID_LINK_ON_BLUE
if (D_lower and D_higher and F.lower and F.higher)
    if F.topo_order<D_topo_order
        return USE_RED
    else
        return USE_BLUE
if (D_lower and D_higher)
    if F.higher
        return USE_RED
    else
        return USE_BLUE
if (F.lower and F.higher)
    if D_lower
        return USE_RED
    else if D_higher
        return USE_BLUE
    else
        if primary_intf.OUTGOING and primary_intf.IN-
            COMING
            return AVOID_LINK_ON_BLUE
        if primary_intf.OUTGOING is true
            return USE_BLUE
        if primary_intf.INCOMING is true
            return USE_RED
if D_higher
    if F.higher
        if F.topo_order<D_topo_order
            return USE_RED
        else
            return USE_BLUE
    else if F.lower
        return USE_BLUE
    else
        // F and S are neighbors so either F<<S or F>>S
else if D_lower
    if F.higher
        return USE_RED
    else if F.lower
        if F.topo_order<D_topo_order
            return USE_RED
        else
            return USE_BLUE
    else
        // F and S are neighbors so either F<<S or F>>S
else // D and S not ordered
    if F.lower
        return USE_RED
    else if F.upper
        return USE_BLUE
    else
        // F and S are neighbors so either F<<S or F>>S
```

If either D>>S>>F or D<<S<<F holds true, the situation is simple: in the first case we should choose the increasing Blue next-hop, in the second case, the decreasing Red next-hop is the right choice. However, when both D and F are greater than S the situation is not so simple, there can be three possibilities: (i) F>>D (ii) F<<D or (iii) F and D are not ordered. In the first case, we should choose the path towards D along the Blue tree. In contrast, in case (ii) the Red path towards the root and then to D would be the solution. Finally, in case (iii) both paths would be acceptable. However, observe that if, e.g., F.topo_order>D.topo_order, either case (i) or case (iii) holds true, which means that selecting the Blue next-hop is safe. Similarly, if F.topo_order<D.topo_order, we should select the Red next-hop. The situation is almost the same if both F and D are less than S.

Recall that we have added each link to the GADAG in some direction, so that is impossible that S and F are not ordered. But it is possible that S and D are not ordered, so we need to deal with this case as well. If F<<S, we can use the Red next-hop, because that path is first increasing until a node definitely greater than D is reached, than decreasing; this path must avoid using F. Similarly, if F>>S, we should use the Blue next-hop.

Additionally, the cases where either F or D is ordered both higher and lower must be considered; this can happen when one is a block-root or inherits its order_proxy is. If D is both higher and lower than S, then the MRT to use is the one that avoids F so if F is higher, then the Red MRT should be used and if F is lower, then the Blue MRT should be used; F and S must be ordered because they are neighbors. If F is both higher and lower, then if D is lower, using the Red MRT to decrease reaches D and if D is higher, using the Blue MRT to increase reaches D; if D is unordered compared to S, then the situation is a bit more complicated.

In the case where F<<S<<F and D and S are unordered, the direction of the link in the GADAG between S and F should be examined. If the link is directed S→F, then use the Blue MRT (decrease to avoid that link and then increase). If the link is directed S←F, then use the Red MRT (increase to avoid that link and then decrease). If the link is S<->F, then the link must be a cut-link and there is no node-protecting alternate. If there are multiple links between S and F, then they can protect against each other; of course, in this situation, they are probably already ECMP.

Finally, there is the case where D is also F. In this case, only link protection is possible. The MRT that doesn't use the indicated primary next-hop is used. If both MRTs use the primary next-hop, then the primary next-hop must be a cut-edge so either MRT could be used but the set of MRT next-hops must be pruned to avoid that primary next-hop. To indicate this case, Select_Alternates returns AVOID_LINK_ON_BLUE.

Figure 21:
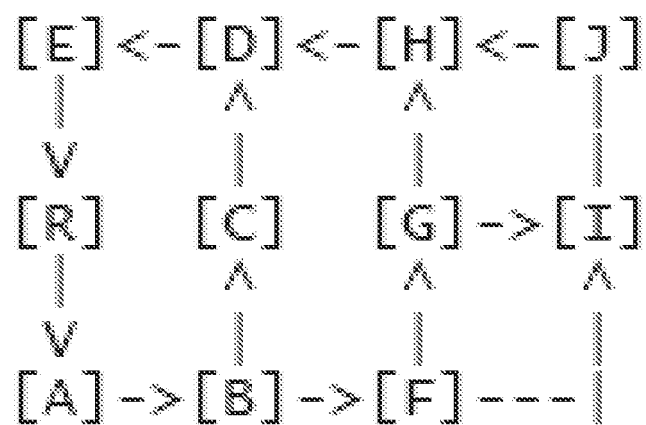
FIG. 21 is a block diagram illustrating an example 2-connected graph.

FIG. 21 is a block diagram illustrating an example 2-connected graph. As an example, consider the ADAG depicted in FIG. 21 and first suppose that G is the source, D is the destination and H is the failed next-hop. Since D>>G, we need to compare H.topo_order and D.topo_order. Since D.topo_order>H.topo_order D must be not smaller than H, so we should select the decreasing path towards the root. If, however, the destination were instead J, we must find that H.topo_order>J.topo_order, so we must choose the increasing Blue next-hop to J, which is I. In the case, when instead the destination is C, we find that we need first decrease to avoid using H, so the Blue, first decreasing then increasing, path is selected.

The above description of the example algorithm assumes a particular approach that is believed to be a reasonable compromise between complexity and computation. There are two example options given for constructing the GADAG as both are reasonable and promising. One example is SPF-based GADAG. Compute the common GADAG using Option 2 of SPF-based inheritance. This considers metrics when constructing the GADAG, which is important for path length and operational control. It has higher computational complexity than the Low-Point Inheritance GADAG.

Another example is Low-Point Inheritance GADAG. Compute the common GADAG using Option 1 of Low-Point Inheritance. This ignores metrics when constructing the GADAG, but its computational complexity is O(links) which is attractive. It is possible that augmenting the GADAG by assigning directions to all links in the network graph and adding them to the GADAG will make the difference between this and the SPF-based GADAG minimal.

In addition, it is possible to calculate Destination-Rooted GADAG, where for each destination, a GADAG rooted at that destination is computed. The GADAG can be computed using either Low-Point Inheritance or SPF-based. Then a router would need to compute the blue MRT and red MRT next-hops to that destination. Building GADAGs per destination is computationally more expensive, but may give somewhat shorter alternate paths. It may be useful for live-live multicast along MRTs.

When evaluating different algorithms and methods for IP Fast Reroute, there are three important points to consider. Coverage: For every Point of Local Repair (PLR) and local failure, is there an alternate to reach every destination? Those destinations include not only routers in the IGP area, but also prefixes outside the IGP area. Alternate Length: What is the length of the alternate path offered compared to the optimal alternate route in the network? This is computed as the total length of the alternate path divided by the length of an optimal alternate path. The optimal alternate path is computed by removing the failed node and running an SPF to find the shortest path from the PLR to the destination. Alternate Bandwidth: What percentage of the traffic sent to the failed point can be sent on the alternates? This is computed as the sum of the bandwidths along the alternate paths divided by the bandwidth of the primary paths that go through the failure point.

The algorithm assumes that broadcast interfaces are already represented as pseudo-nodes in the network graph. The exact rules for extending the set of next-hops and ensuring that the neighboring node is avoided need to be fully specified. The algorithmic extensions to handle local Shared Link Risk Groups (SRLGs), where each member of the SRLG shares a common router end, need to be fully specified. MRTs may also be created that consider protection for general SRLGs.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable medium encoded with instructions. Instructions embedded or encoded in an article of manufacture including a computer-readable medium encoded, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage media may include non-transitory media. The term "non-transitory" may indicate that the storage medium is not embodied in a carrier wave or a propagated signal. In certain examples, a non-transitory storage medium may store data that can, over time, change (e.g., in RAM or cache).

Various aspects of this disclosure have been described. These and other aspects are within the scope of the following claims.

The invention claimed is:
1. A method comprising:
by a network device, computing a pair of maximally redundant trees rooted at a destination network device, wherein a path from the network device to the destination network device on a first maximally redundant tree of the pair of maximally redundant trees is as disjoint as possible from a path from the network device to the destination network device on a second maximally redundant tree of the pair of maximally redundant trees;
in response to determining that the path from the network device to the destination network device on the first maximally redundant tree avoids a protected network resource:
selecting the first maximally redundant tree; and
installing, as an alternate next-hop for forwarding packets to the destination device, a next-hop positioned along the selected first maximally redundant tree;
receiving, by the network device, a packet destined for the destination network device;
after installing the next-hop positioned along the first maximally redundant tree and in response to detecting a failure of the protected network resource associated with a primary next-hop for forwarding packets on a shortest path tree to the destination network device, marking the packet with an indication of the first maximally redundant tree of the pair of maximally redundant trees; and
forwarding the marked packet to the installed next-hop positioned along the first maximally redundant tree.

2. The method of claim 1, wherein marking the packet with an indication of the first maximally redundant tree comprises pushing a topology-id label onto the packet prior to forwarding the marked packet, wherein the topology-id label identifies a forwarding topology associated with the first maximally redundant tree.

3. The method of claim 1, wherein the received packet includes a first Label Distribution Protocol (LDP) label, further comprising:
swapping the first LDP label for a second LDP label associated with the first LDP label;
wherein marking the packet with an indication of the first maximally redundant tree comprises pushing a topology-id label onto the packet, wherein the topology-id label identifies a network topology associated with the first maximally redundant tree.

4. The method of claim 1, wherein the received packet includes an outer topology-id label that identifies a network topology associated with the first maximally redundant tree, and an inner label, further comprising:
removing the outer topology-id label;
performing a lookup in forwarding information based on the inner label of the packet, wherein the lookup returns a set of next-hops; and
selecting from the set of next-hops, based on the outer topology-id label, the next-hop to which to forward the marked packet.

5. The method of claim 4, wherein the inner label of the packet comprises a Label Distribution Protocol (LDP) label, and wherein the topology-id label comprises an LDP label.

6. The method of claim 1, wherein the received packet includes an outer topology-id label that identifies a network topology associated with the first maximally redundant tree, further comprising:
removing the outer topology-id label;
performing a lookup in forwarding information based on a destination address of the packet, wherein the lookup returns a set of next-hops; and
selecting from the set of next-hops, based on the outer topology-id label, the next-hop to which to forward the marked packet.

7. The method of claim 6, wherein the destination address is an Internet Protocol (IP) address, and wherein the topology-id label comprises a Label Distribution Protocol (LDP) label.

8. The method of claim 1, wherein the received packet includes an outer LDP topology-id label that identifies a forwarding topology associated with both the destination network device and the first maximally redundant tree, further comprising:
swapping the LDP topology-id label for a corresponding LDP topology-id label associated with the destination network device.

9. The method of claim 1, further comprising advertising, to a neighboring network device, a label map message that specifies (1) a Forwarding Equivalence Class (FEC)-to-label mapping; (2) a first label associated with the first maximally redundant tree of the pair of maximally redundant trees rooted at the destination network device, and (3) a second label associated with the second maximally redundant tree of the pair of maximally redundant trees rooted at the destination network device.

10. The method of claim 1, wherein the protected network resource comprises a link in a network.

11. The method of claim 1, wherein the protected network resource comprises a node in a network.

12. The method of claim 1, wherein the destination network device is positioned within a first area, further comprising:
receiving, with an area border router positioned on a border of the first area and a second area, a packet from a penultimate router positioned in the second area, wherein the packet is destined for the destination network device, and wherein the packet is marked with an indication of the first maximally redundant tree of the pair of maximally redundant trees rooted at the destination network device;
with the area border router, clearing the marking from the received packet; and
with the area border router, forwarding the unmarked packet to a primary next-hop in the second area associated with the destination network device.

13. The method of claim 1, wherein the destination network device is positioned within a first area, further comprising:
receiving, with a penultimate router positioned in the second area, a packet destined for the destination network device, and wherein the packet is marked with an indication of the first maximally redundant tree of the pair of maximally redundant trees rooted at the destination network device;
with the penultimate router, clearing the marking from the received packet;
with the penultimate router, forwarding the unmarked packet to an area border router positioned on a border of the first area and the second area; and
with the area border router, forwarding the unmarked packet to a primary next-hop in the second area associated with the destination network device.

14. The method of claim 13, wherein the first area and the second area comprise a first level and a second level.

15. The method of claim 1, wherein the destination network device is positioned within a first area, further comprising:
receiving, with an area border router positioned on a border of the first area and a second area, a packet from a penultimate router positioned in the second area, wherein the packet is destined for the destination network device, and wherein the packet is marked with an indication of the first maximally redundant tree of the pair of maximally redundant trees rooted at the destination network device;
with the area border router, forwarding the marked packet to a secondary next-hop associated with the destination network device in the second area along the first maximally redundant tree.

16. The method of claim 1, wherein marking the packet with an indication of the first maximally redundant tree comprises marking the packet using an Internet Protocol (IP) option to indicate that the packet is associated with the first maximally redundant tree.

17. The method of claim 16, wherein the IP option comprises one of an IP version four (IPv4) option and an IP version six (IPv6) option.

18. The method of claim 16, further comprising processing the IP option in a fast path of the network device without sending the packet to a line card of the network device for processing.

19. A network device comprising:

a forwarding component;

a route selection module configured to compute a pair of maximally redundant trees rooted at a destination network device, wherein a path from the network device to the destination network device on a first maximally redundant tree of the pair of maximally redundant trees is as disjoint as possible from a path from the network device to the destination network device on a second maximally redundant tree of the pair of maximally redundant trees, wherein the route selection module is further configured to, in response to determining that the path from the network device to the destination network device on the first maximally redundant tree avoids a protected network resource:

select the first maximally redundant tree; and install, to the forwarding component as an alternate next-hop for forwarding packets to the destination device, a next-hop positioned along the selected first maximally redundant tree;

a physical interface configured to receive a packet destined for the destination network device, wherein the forwarding component is further configured to, after the installation of the next-hop positioned along the selected first maximally redundant tree and in response to detection of a failure of the protected resource associated with a primary next-hop for the destination network device, mark the packet with an indication of the first maximally redundant tree of the pair of maximally redundant trees, and forward the marked packet to the installed next-hop positioned along the first maximally redundant tree.

20. The network device of claim 19, wherein the forwarding component is configured to push a topology-id label onto the packet prior to forwarding the marked packet, wherein the topology-id label identifies a forwarding topology associated with the first maximally redundant tree.

21. The network device of claim 19, wherein the received packet includes a first Label Distribution Protocol (LDP) label, wherein the forwarding component is configured to swap the first LDP label for a second LDP label associated with the first LDP label, and push a topology-id label onto the packet, wherein the topology-id label identifies a network topology associated with the first maximally redundant tree.

22. The network device of claim 19, wherein the received packet includes an outer topology-id label that identifies a network topology associated with the first maximally redundant tree, and an inner label, wherein the forwarding component is configured to remove the outer topology-id label, perform a lookup in forwarding information based on the inner label of the packet, wherein the lookup returns a set of next-hops, and select from the set of next-hops, based on the outer topology-id label, the next-hop to which to forward the marked packet.

23. The network device of claim 22, wherein the inner label of the packet comprises a Label Distribution Protocol (LDP) label, and wherein the topology-id label comprises an LDP label.

24. The network device of claim 19, wherein the received packet includes an outer topology-id label that identifies a network topology associated with the first maximally redundant tree, wherein the forwarding component is configured to remove the outer topology-id label, perform a lookup in forwarding information based on a destination address of the packet, wherein the lookup returns a set of next-hops, and select from the set of next-hops, based on the outer topology-id label, the next-hop to which to forward the marked packet.

25. The network device of claim 24, wherein the destination address is an Internet Protocol (IP) address, and wherein the topology-id label comprises a Label Distribution Protocol (LDP) label.

26. The network device of claim 19, wherein the received packet includes an outer LDP topology-id label that identifies a forwarding topology associated with both the destination network device and the first maximally redundant tree, wherein the forwarding component is configured to swap the LDP topology-id label for a corresponding LDP topology-id label associated with the destination network device.

27. The network device of claim 19, wherein the forwarding component is configured to advertise, to a neighboring network device, a label map message that specifies (1) a Forwarding Equivalence Class (FEC)-to-label mapping; (2) a first label associated with the first maximally redundant tree of the pair of maximally redundant trees rooted at the destination network device, and (3) a second label associated with the second maximally redundant tree of the pair of maximally redundant trees rooted at the destination network device.

28. A non-transitory computer-readable storage medium comprising instructions for causing one or more programmable processors of a network device to:

compute a pair of maximally redundant trees rooted at a destination network device, wherein a path from the network device to the destination network device on a first maximally redundant tree of the pair of maximally redundant trees is as disjoint as possible from a path from the network device to the destination network device on a second maximally redundant tree of the pair of maximally redundant trees;

in response to determining that the path from the network device to the destination network device on the first maximally redundant tree avoids a protected network resource:

select the first maximally redundant tree; and install, as an alternate next-hop for forwarding packets to the destination device, a next-hop positioned along the selected first maximally redundant tree;

receive a packet destined for the destination network device;

after installing the next-hop positioned along the first maximally redundant tree and in response to detecting a failure of the protected network resource associated with a primary next-hop for forwarding packets on a shortest path tree to the destination network device, mark the packet with an indication of the first maximally redundant tree of the pair of maximally redundant trees; and forward the marked packet to the installed next-hop positioned along the first maximally redundant tree.

* * * * *